(12) United States Patent
Day et al.

(10) Patent No.: US 7,778,271 B2
(45) Date of Patent: Aug. 17, 2010

(54) METHOD FOR COMMUNICATING INSTRUCTIONS AND DATA BETWEEN A PROCESSOR AND EXTERNAL DEVICES

(75) Inventors: Michael N. Day, Round Rock, TX (US); Charles R. Johns, Austin, TX (US); John S. Liberty, Round Rock, TX (US); Todd E. Swanson, Round Rock, TX (US); Thuong Q. Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1390 days.

(21) Appl. No.: 11/207,970

(22) Filed: Aug. 19, 2005

(65) Prior Publication Data

US 2007/0041403 A1  Feb. 22, 2007

(51) Int. Cl.
*H04J 3/00* (2006.01)
*G06F 3/00* (2006.01)
*G06F 9/00* (2006.01)

(52) U.S. Cl. .............................. 370/464; 710/5; 710/39; 712/225

(58) Field of Classification Search ................ 370/464, 370/465, 469; 710/5, 36, 39, 46, 52, 220; 712/200, 201, 220, 225
See application file for complete search history.

(56) References Cited

U.S. PATENT DOCUMENTS

| 5,870,627 | A | 2/1999 | O'Toole et al. |
| 6,363,438 | B1 | 3/2002 | Williams et al. |
| 6,453,365 | B1 | 9/2002 | Habot |
| 6,496,925 | B1 | 12/2002 | Rodgers et al. |
| 6,662,242 | B2 | 12/2003 | Holm et al. |
| 7,010,626 | B2 | 3/2006 | Kahle |

(Continued)

FOREIGN PATENT DOCUMENTS

EP  1 026 596 A2  8/2000

(Continued)

OTHER PUBLICATIONS

U.S. Appl. No. 11/207,986, Day et al.

(Continued)

*Primary Examiner*—Aung S Moe
*Assistant Examiner*—Kerri M Rose
(74) *Attorney, Agent, or Firm*—Stephen J. Walder, Jr.; Matthew B. Talpis

(57) ABSTRACT

A method for communicating instructions and data between a processor and external devices are provided. The method makes use of a channel interface as the primary mechanism for communicating between the processor and a memory flow controller. The channel interface provides channels for communicating with processor facilities, memory flow control facilities, machine state registers, and external processor interrupt facilities, for example. These channels may be designated as blocking or non-blocking. With blocking channels, when no data is available to be read from the corresponding registers, or there is no space available to write to the corresponding registers, the processor is placed in a low power "stall" state. The processor is automatically awakened, via communication across the blocking channel, when data becomes available or space is freed. Thus, the channels of the present invention permit the processor to stay in a low power state.

1 Claim, 51 Drawing Sheets

U.S. PATENT DOCUMENTS

| | | |
|---|---|---|
| 7,111,089 B2 | 9/2006 | Karam et al. |
| 7,500,039 B2 | 3/2009 | Day et al. |
| 2003/0099254 A1 | 5/2003 | Richter |
| 2004/0158664 A1 | 8/2004 | Zilavy |
| 2004/0193754 A1 | 9/2004 | Kahle |
| 2004/0264445 A1 | 12/2004 | Day et al. |
| 2006/0010264 A1 | 1/2006 | Rader et al. |
| 2006/0059302 A1 | 3/2006 | Tsuruta |
| 2007/0043936 A1 | 2/2007 | Day et al. |
| 2007/0079018 A1 | 4/2007 | Day et al. |
| 2008/0244200 A1 | 10/2008 | Day et al. |
| 2008/0288757 A1 | 11/2008 | Day et al. |

FOREIGN PATENT DOCUMENTS

| | | |
|---|---|---|
| JP | S62-280956 A | 5/1987 |
| JP | H01-048166 A | 2/1989 |
| JP | 2000-267987 | 9/2000 |
| JP | 02-342165 A | 11/2002 |
| JP | 2005-056401 A | 3/2005 |
| WO | WO/0196979 A2 | 12/2001 |

OTHER PUBLICATIONS

U.S. Appl. No. 11/207,971, Day et al.
USPTO U.S. Appl. No. 11/207,971, Image File Wrapper printed Mar. 24, 2010, 2 pages.
USPTO U.S. Appl. No. 11/207,986, Image File Wrapper printed Mar. 24, 2010, 2 pages.
USPTO U.S. Appl. No. 12/106,483, Image File Wrapper printed Mar. 24, 2010, 2 pages.
USPTO U.S. Appl. No. 12/129,114, Image File Wrapper printed Mar. 24, 2010, 1 page.
USPTO U.S. Appl. No. 12/361,907, Image File Wrapper printed Mar. 25, 2010, 2 pages.
Office Action mailed May 6, 2010 for U.S. Appl. No. 12/129,114.
Response to Office Action filed with the USPTO on Mar. 30, 2010 for U.S. Appl. No. 12/361,907, 14 pages.

| PARAMETER | PARAMETER NAME | REGISTER NAME | SEE NOTE |
|---|---|---|---|
| CL | MFC CLASS ID | MFC_ClassID | |
| TG | MFC COMMAND TAG IDENTIFICATION | MFC_TagID | |
| TS | MFC TRANSFER SIZE | MFC_Size | 1 |
| LSZ | MFC LIST SIZE | MFC_Size | 1 |
| LSA | MFC LOCAL STORAGE ADDRESS | MFC_LSA | |
| EAH | MFC EFFECTIVE ADDRESS HIGH | MFC_EAH | 4 |
| EAL | MFC EFFECTIVE ADDRESS LOW | MFC_EAL | 2 |
| LA | MFC LIST LOCAL STORAGE ADDRESS | MFC_EAL | 2 |
| LTS | LIST ELEMENT TRANSFER SIZE | | 3 |
| LEAL | LIST ELEMENT EFFECTIVE ADDRESS LOW | | 3 |

1. TS AND LSZ SHARE THE SAME REGISTER OFFSET
2. EAL AND LA SHARE THE SAME REGISTER OFFSET
3. NO ASSOCIATED REGISTERS. THESE PARAMETERS ARE LOCATED IN LOCAL STORAGE AND ARE REFERENCED BY THE LIST ADDRESS (LA) PARAMETER
4. THIS PARAMETER IS OPTIONAL

| CHANNEL NUMBER (HEXADECIMAL) | CHANNEL NAME | DESCRIPTION | ACCESS TYPE |
|---|---|---|---|
| SPU EVENT CHANNELS | | | |
| X'0' | SPU_RdEventStat | SPU READ EVENT STATUS CHANNEL READ EVENT STATUS (WITH MASK APPLIED) | READ-BLOCKING |
| X'1' | SPU_WrEventMask | SPU WRITE EVENT MASK CHANNEL WRITE EVENT-STATUS MASK | WRITE |
| X'2' | SPU_WrEventAck | SPU WRITE EVENT ACKNOWLEDGMENT CHANNEL WRITE END-OF-EVENT PROCESSING | WRITE |
| SPU SIGNAL NOTIFICATION CHANNELS | | | |
| X'3' | SPU_RdSigNotify1 | SPU SIGNAL NOTIFICATION 1 CHANNEL | READ-BLOCKING |
| X'4' | SPU_RdSigNotify2 | SPU SIGNAL NOTIFICATION 2 CHANNEL | READ-BLOCKING |
| X'5' | CHANNEL 5 | RESERVED | |
| X'6' | CHANNEL 6 | RESERVED | |
| SPU DECREMENTER CHANNELS | | | |
| X'7' | SPU_WrDec | SPU WRITE DECREMENTER CHANNEL | WRITE |
| X'8' | SPU_RdDec | SPU READ DECREMENTER CHANNEL | READ |
| MFC MULTISOURCE SYNCHRONIZATION CHANNELS | | | |
| X'9' | MFC_WrMSSyncReq | MFC WRITE MULTISOURCE SYNCHRONIZATION REQUEST CHANNEL (MFC_WrMSSyncReq) | WRITE-BLOCKING |

FROM FIG. 6B

| | | | |
|---|---|---|---|
| SPU RESERVED CHANNEL | | | |
| 658 | X'A' | CHANNEL 10 | RESERVED | |
| MASKED READ CHANNELS | | | |
| 660 | X'B' | SPU_RdEventMask | SPU READ EVENT MASK CHANNEL | READ |
| | X'C' | MFC_RdTagMask | MFC READ TAG-GROUP QUERY MASK CHANNEL | READ |
| SPU STATE MANAGEMENT CHANNELS | | | |
| 662 | X'D' | SPU_RdMachStat | SPU READ MACHINE STATUS CHANNEL | READ |
| | X'E' | SPU_WrSRR0 | SPU WRITE STATE SAVE-AND-RESTORE CHANNEL | WRITE |
| | X'F' | SPU_RdSRR0 | SPU READ STATE SAVE-AND-RESTORE CHANNEL | READ |
| MFC COMMAND PARAMETER CHANNELS | | | |
| 664 | X'10' | MFC_LSA | MFC LOCAL STORAGE ADDRESS CHANNEL<br>WRITE LOCAL STORAGE ADDRESS COMMAND PARAMETER | WRITE |
| | X'11' | MFC_EAH | MFC EFFECTIVE ADDRESS HIGH CHANNEL<br>WRITE HIGH-ORDER MFC EFFECTIVE-ADDRESS COMMAND PARAMETER | WRITE |
| | X'12' | MFC_EAL | MFC EFFECTIVE ADDRESS LOW OR LIST ADDRESS CHANNEL<br>WRITE LOW-ORDER MFC EFFECTIVE-ADDRESS COMMAND PARAMETER | WRITE |
| | X'13' | MFC_Size | MFC TRANSFER SIZE OR LIST SIZE CHANNEL<br>WRITE MFC TRANSFER SIZE COMMAND PARAMETER | WRITE |

FIG. 6D

| CHANNEL NUMBER (HEXADECIMAL) | CHANNEL NAME | DESCRIPTION | ACCESS TYPE |
|---|---|---|---|
| X'14' | MFC_TagID | MFC COMMAND TAG IDENTIFICATION CHANNEL. WRITE TAG IDENTIFIER COMMAND PARAMETER | WRITE |
| X'15' | MFC_Cmd MFC_ClassID | MFC COMMAND OPCODE CHANNEL. WRITE AND ENQUEUE MFC COMMAND WITH ASSOCIATED CLASS ID. MFC CLASS ID CHANNEL. WRITE AND ENQUEUE MFC COMMAND WITH ASSOCIATED COMMAND OPCODE | WRITE-BLOCKING |
| MFC TAG STATUS CHANNELS | | | |
| X'16' | MFC_WrTagMask | MFC WRITE TAG-GROUP QUERY MASK CHANNEL. WRITE TAG MASK | WRITE |
| X'17' | MFC_WrTagUpdate | MFC WRITE TAG STATUS UPDATE REQUEST CHANNEL. WRITE REQUEST FOR CONDITIONAL OR UNCONDITIONAL TAG STATUS UPDATE | WRITE-BLOCKING |
| X'18' | MFC_RdTagStat | MFC READ TAG-GROUP STATUS CHANNEL. READ TAG STATUS (WITH MASK APPLIED) | READ-BLOCKING |
| X'19' | MFC_RdListStallStat | MFC READ LIST STALL-AND-NOTIFY TAG STATUS CHANNEL. READ MFC LIST STALL-AND-NOTIFY STATUS | READ-BLOCKING |
| X'1A' | MFC_WrListStallAck | MFC WRITE LIST STALL-AND-NOTIFY TAG ACKNOWLEDGMENT CHANNEL. WRITE MFC LIST STALL-AND-NOTIFY ACKNOWLEDGMENT | WRITE |
| X'1B' | MFC_RdAtomicStat | MFC READ ATOMIC COMMAND STATUS CHANNEL. READ ATOMIC COMMAND STATUS | READ-BLOCKING |

664 (rows X'14'–X'15')
666 (rows X'16'–X'1B')

FROM FIG. 6D

| SPU MAILBOXES | | | |
|---|---|---|---|
| X'1C' | SPU_WrOutMbox | SPU WRITE OUTBOUND MAILBOX CHANNEL WRITE OUTBOUND SPU MAILBOX CONTENTS | WRITE-BLOCKING |
| X'1D' | SPU_RdInMbox | SPU READ INBOUND MAILBOX CHANNEL READ INBOUND SPU MAILBOX CONTENTS | READ-BLOCKING |
| X'1E' | SPU_WrOutIntrMbox | SPU WRITE OUTBOUND INTERRUPT MAILBOX CHANNEL WRITE SPU OUTBOUND INTERRUPT MAILBOX CONTENTS | WRITE-BLOCKING |
| X'1F' - X'3F' | CHANNEL 31 - CHANNEL 63 | RESERVED | |

ACCESS TYPE: READ-BLOCKING
CHANNEL NUMBER: X'18'

Bit positions 0 through 31, labeled $g_{1F}, g_{1E}, g_{1D}, g_{1C}, g_{1B}, g_{1A}, g_{19}, g_{18}, g_{17}, g_{16}, g_{15}, g_{14}, g_{13}, g_{12}, g_{11}, g_{10}, g_F, g_E, g_D, g_C, g_B, g_A, g_9, g_8, g_7, g_6, g_5, g_4, g_3, g_2, g_1, g_0$

| BITS | FIELD NAME | DESCRIPTION |
|---|---|---|
| 0:31 | $g_n$ | TAG GROUP "n" STATUS<br>1 TAG GROUP HAS NO OUTSTANDING OPERATIONS (COMMANDS ARE COMPLETE), AND WAS NOT DISABLED BY THE QUERY MASK<br>0 TAG GROUP HAS OUTSTANDING OPERATIONS, OR HAS BEEN DISABLED BY THE QUERY MASK |

FIG. 7F

| ACCESS TYPE | WRITE |
|---|---|
| CHANNEL NUMBER | X'10' |

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| MFC LOCAL STORAGE ADDRESS ||||||||||||||||||||||||||||||||

| BITS | FIELD NAME | DESCRIPTION |
|---|---|---|
| 0:31 | MFC LOCAL STORAGE ADDRESS | MFC LOCAL STORAGE ADDRESS NOTE: THE 4 LEAST-SIGNIFICANT BITS OF THE LOCAL STORAGE ADDRESS MUST MATCH THE LEAST-SIGNIFICANT 4 BITS OF THE EFFECTIVE ADDRESS |

FIG. 7H

| ACCESS TYPE | WRITE |
|---|---|
| CHANNEL NUMBER | X'11' |

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| HIGH WORD OF 64-BIT EFFECTIVE ADDRESS (OPTIONAL) ||||||||||||||||||||||||||||||||

| BITS | FIELD NAME | DESCRIPTION |
|---|---|---|
| 0:31 | HIGH WORD OF 64-BIT EFFECTIVE ADDRESS | HIGH WORD OF THE 64-BIT EFFECTIVE ADDRESS ZEROS ARE USED FOR THE UPPER 32 BITS OF THE EFFECTIVE ADDRESS IF THIS PARAMETER IS OMITTED FROM THE COMMAND. IF TRANSLATION IS DISABLED (THE EFFECTIVE ADDRESS EQUALS THE REAL ADDRESS), SOME HIGHER-ORDER BITS MUST ALSO BE ZEROS, DEPENDING ON THE AMOUNT OF REAL MEMORY IN THE SYSTEM |

FIG. 7G

ACCESS TYPE         WRITE
CHANNEL NUMBER      X'12'

LOW WORD OF 64-BIT EFFECTIVE ADDRESS OR
THE LOCAL STORAGE ADDRESS OF THE MFC LIST

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|

| BITS | FIELD NAME | DESCRIPTION |
|---|---|---|
| 0:31 | LOW WORD OF 64-BIT EFFECTIVE ADDRESS OR THE LOCAL STORAGE ADDRESS OF THE MFC LIST | LOW WORD OF THE 64-BIT EFFECTIVE ADDRESS OR THE LOCAL STORAGE ADDRESS OF THE MFC LIST FOR TRANSFER SIZES LESS THAN 16 BYTES, ADDRESS BITS 28 THROUGH 31 MUST PROVIDE NATURAL ALIGNMENT BASED ON THE TRANSFER SIZE. FOR TRANSFER SIZES OF 16 BYTES OR GREATER, BITS 28 THROUGH 31 MUST BE ZERO. FOR OPTIMAL PERFORMANCE OF TRANSFERS OF 128 BYTES OR MORE, THE SOURCE AND DESTINATION TRANSFER ADDRESSES SHOULD BE 128-BYTE ALIGNED (BITS 25 THROUGH 31 SET TO ZERO) IF TRANSLATION IS DISABLED (THE EFFECTIVE ADDRESS EQUALS THE REAL ADDRESS), SOME HIGHER-ORDER BITS MUST ALSO BE ZERO, DEPENDING ON THE AMOUNT OF REAL MEMORY IN THE SYSTEM FOR MFC LIST OPERATIONS, THIS PARAMETER CONTAINS THE LOCAL STORAGE ADDRESS OF THE MFC LIST. IN THIS CASE, THE ADDRESS MUST BEGIN ON AN 8-BYTE BOUNDARY |

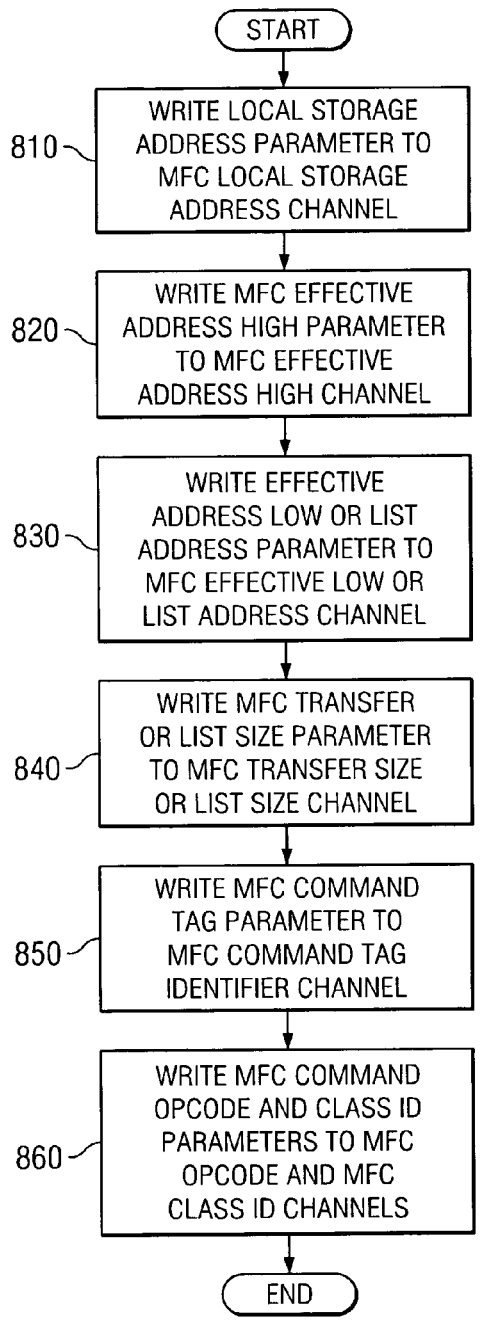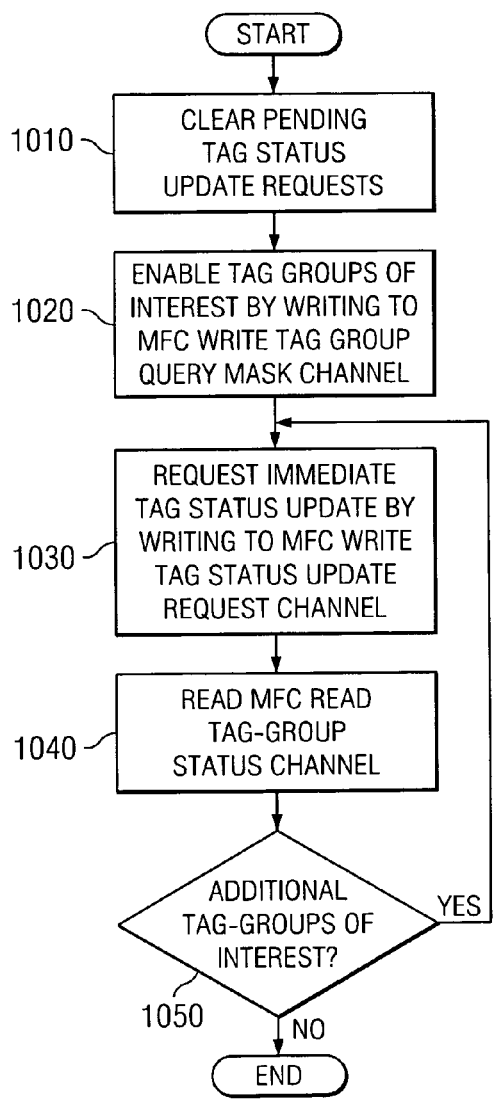

FIG. 9A

ACCESS TYPE: WRITE
CHANNEL NUMBER: X'16'

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| $g_{1F}$ | $g_{1E}$ | $g_{1D}$ | $g_{1C}$ | $g_{1B}$ | $g_{1A}$ | $g_{19}$ | $g_{18}$ | $g_{17}$ | $g_{16}$ | $g_{15}$ | $g_{14}$ | $g_{13}$ | $g_{12}$ | $g_{11}$ | $g_{10}$ | $g_F$ | $g_E$ | $g_D$ | $g_C$ | $g_B$ | $g_A$ | $g_9$ | $g_8$ | $g_7$ | $g_6$ | $g_5$ | $g_4$ | $g_3$ | $g_2$ | $g_1$ | $g_0$ |

| BITS | FIELD NAME | DESCRIPTION |
|---|---|---|
| 0:31 | $g_n$ | TAG GROUP "n" SELECT<br>0   TAG GROUP IS NOT PART OF A QUERY OR WAIT-ON-TAG-EVENT OPERATION<br>1   TAG GROUP IS PART OF A QUERY OR WAIT-ON-TAG-EVENT OPERATION |

FIG. 9B

ACCESS TYPE: READ
CHANNEL NUMBER: X'C'

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| $g_{1F}$ | $g_{1E}$ | $g_{1D}$ | $g_{1C}$ | $g_{1B}$ | $g_{1A}$ | $g_{19}$ | $g_{18}$ | $g_{17}$ | $g_{16}$ | $g_{15}$ | $g_{14}$ | $g_{13}$ | $g_{12}$ | $g_{11}$ | $g_{10}$ | $g_F$ | $g_E$ | $g_D$ | $g_C$ | $g_B$ | $g_A$ | $g_9$ | $g_8$ | $g_7$ | $g_6$ | $g_5$ | $g_4$ | $g_3$ | $g_2$ | $g_1$ | $g_0$ |

| BITS | FIELD NAME | DESCRIPTION |
|---|---|---|
| 0:31 | $g_n$ | TAG GROUP "n" SELECT<br>0   TAG GROUP IS NOT PART OF A QUERY OR WAIT-ON-TAG-EVENT OPERATION<br>1   TAG GROUP IS PART OF A QUERY OR WAIT-ON-TAG-EVENT OPERATION |

FIG. 9C

ACCESS TYPE    WRITE-BLOCKING
CHANNEL NUMBER    X'17'

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| RESERVED ||||||||||||||||||||||||||||||| TS ||

| BITS | FIELD NAME | DESCRIPTION |
|------|------------|-------------|
| 0:29 | RESERVED | RESERVED |
| 30:31 | TS | TAG-STATUS UPDATE CONDITION<br>00  UPDATE IMMEDIATELY, UNCONDITIONAL<br>01  UPDATE TAG STATUS IF OR WHEN ANY ENABLED TAG GROUP HAS "NO OUTSTANDING OPERATION" STATUS<br>10  UPDATE TAG STATUS IF OR WHEN ALL ENABLED TAG GROUPS HAVE "NO OUTSTANDING OPERATION" STATUS<br>11  RESERVED |

FIG. 9E

ACCESS TYPE     READ-BLOCKING
CHANNEL NUMBER  X'19'

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
|0|1|2|3|4|5|6|7|8|9|10|11|12|13|14|15|16|17|18|19|20|21|22|23|24|25|26|27|28|29|30|31|

Bit labels (left to right): $g_{1F}, g_{1E}, g_{1D}, g_{1C}, g_{1B}, g_{1A}, g_{19}, g_{18}, g_{17}, g_{16}, g_{15}, g_{14}, g_{13}, g_{12}, g_{11}, g_{10}, g_{F}, g_{E}, g_{D}, g_{C}, g_{B}, g_{A}, g_{9}, g_{8}, g_{7}, g_{6}, g_{5}, g_{4}, g_{3}, g_{2}, g_{1}, g_{0}$

| BITS | FIELD NAME | DESCRIPTION |
|---|---|---|
| 0:31 | $g_n$ | TAG GROUP "n" SELECT<br>1  TAG GROUP HAS AN MFC LIST COMMAND THAT HAS STALLED ON AN ELEMENT WITH THE STALL-AND-NOTIFY FLAG SET<br>0  TAG GROUP HAS NO MFC LIST COMMANDS CURRENTLY STALLED |

FIG. 9F

ACCESS TYPE     WRITE
CHANNEL NUMBER  X'1A'

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
|0|1|2|3|4|5|6|7|8|9|10|11|12|13|14|15|16|17|18|19|20|21|22|23|24|25|26|27|28|29|30|31|

Bits 0:26 = RESERVED; Bits 27:31 = MFC TAG

| BITS | FIELD NAME | DESCRIPTION |
|---|---|---|
| 0:26 | RESERVED | RESERVED |
| 27:31 | MFC TAG | THE TAG CAN BE ANY VALUE BETWEEN X'0' AND X'1F' |

FIG. 9G

ACCESS TYPE     READ-BLOCKING
CHANNEL NUMBER  X'1B'

```
                                          G → U → S →
 0 1 2 3 4 5 6 7 8 9 10 11 12 13 14 15 16 17 18 19 20 21 22 23 24 25 26 27 28 29 30 31
                              RESERVED
```

| BITS | FIELD NAME | DESCRIPTION |
|------|------------|-------------|
| 0:28 | RESERVED | RESERVED |
| 29 | G | SET IF THE GET LOCK-LINE AND RESERVE (GETLLAR) COMMAND COMPLETED |
| 30 | U | SET IF THE PUT LOCK-LINE UNCONDITIONAL (PUTLLUC) COMMAND COMPLETED |
| 31 | S | PUT LOCK-LINE CONDITIONAL COMMAND (PUTLLC)<br>1   PUT CONDITIONAL UNSUCCESSFUL. THE RESERVATION WAS LOST<br>0   PUT CONDITIONAL SUCCESSFUL |

FIG. 16

ACCESS TYPE     WRITE-BLOCKING
CHANNEL NUMBER  X'9'

```
 0 1 2 3 4 5 6 7 8 9 10 11 12 13 14 15 16 17 18 19 20 21 22 23 24 25 26 27 28 29 30 31
                              RESERVED
```

| BITS | FIELD NAME | DESCRIPTION |
|------|------------|-------------|
| 0:31 | RESERVED | RESERVED |

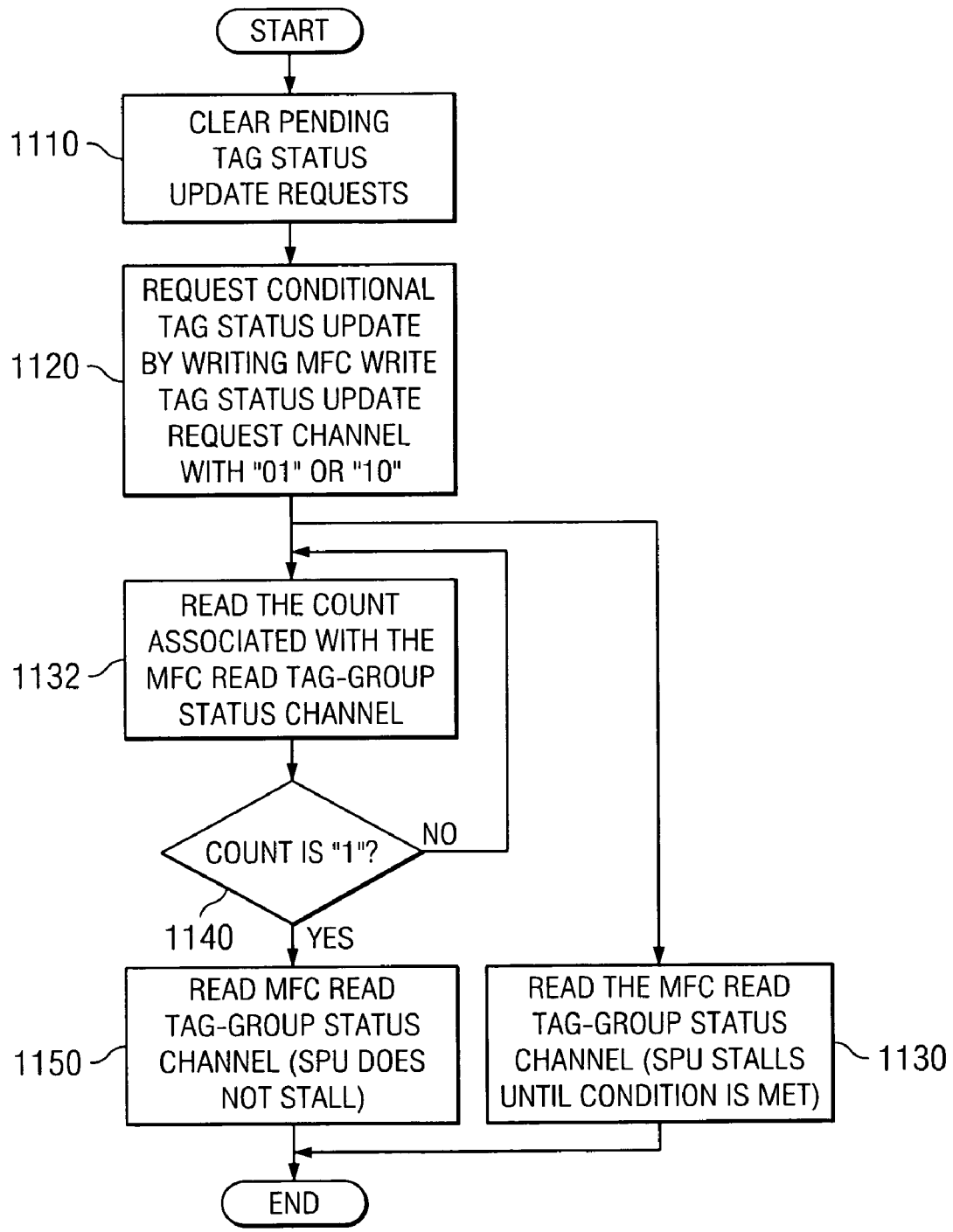

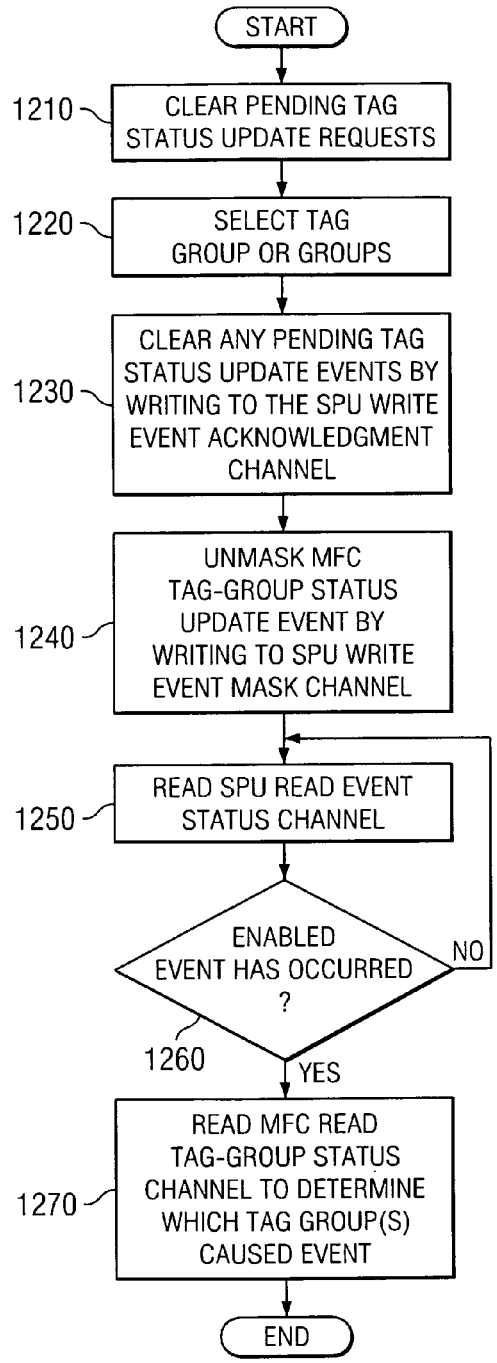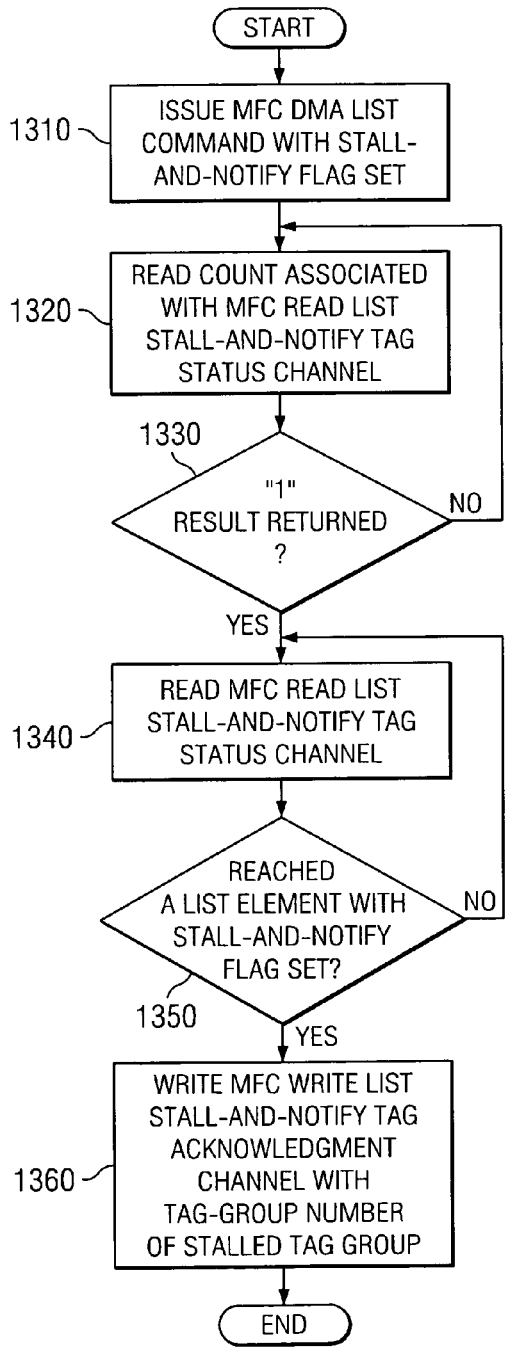

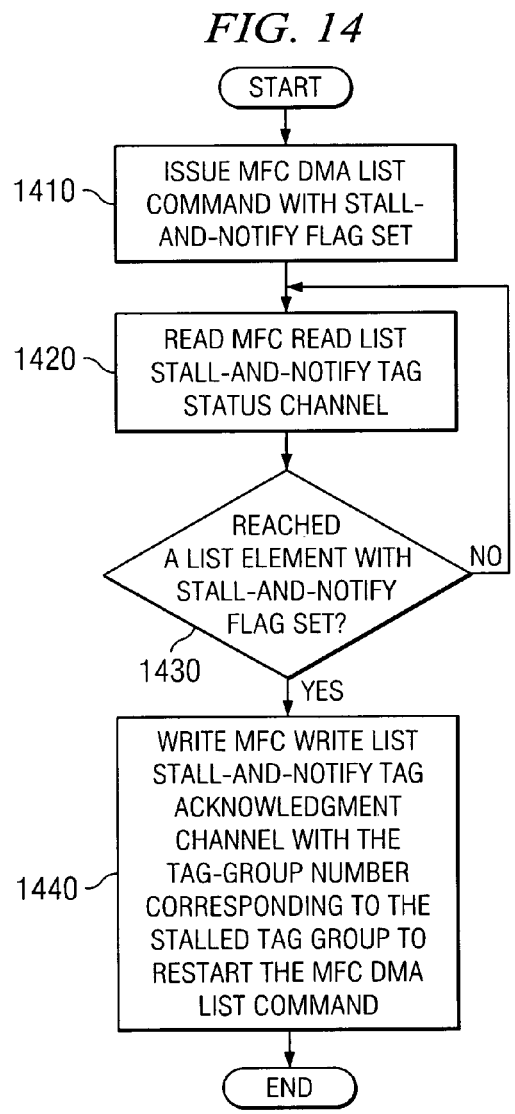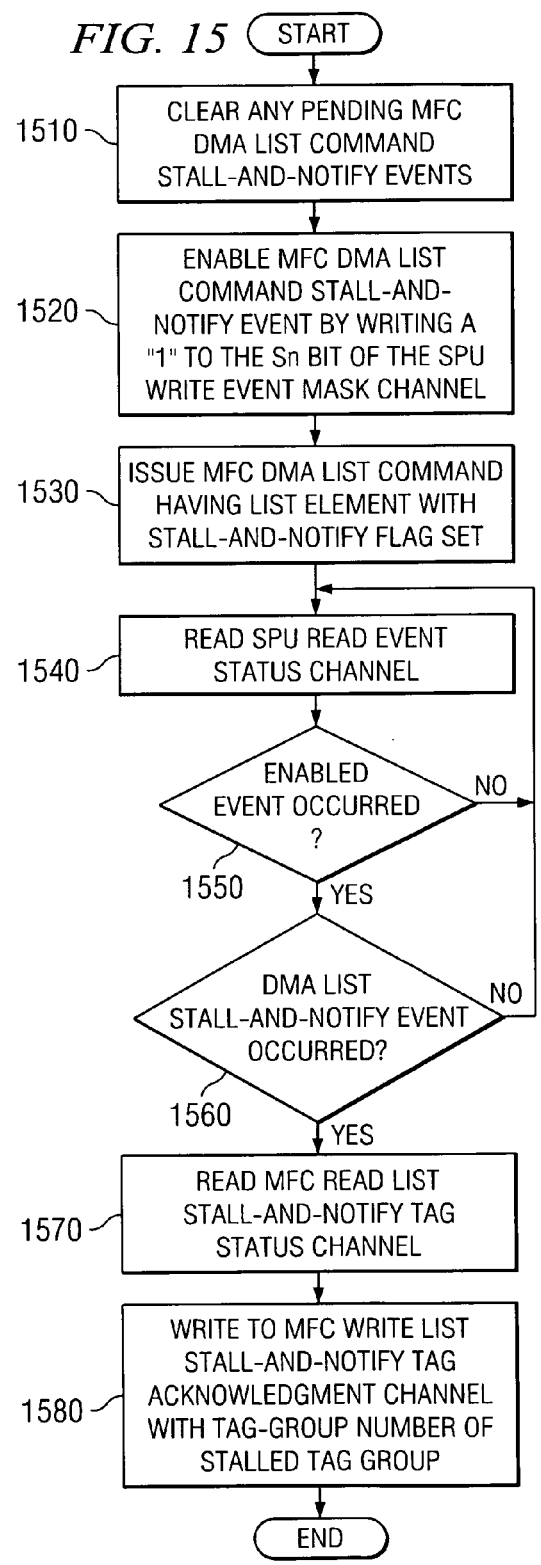

FIG. 17A

ACCESS TYPE     WRITE-BLOCKING
CHANNEL NUMBER     X'1C'

| 0 1 2 3 4 5 6 7 8 9 10 11 12 13 14 15 16 17 18 19 20 21 22 23 24 25 26 27 28 29 30 31 |
|---|
| MAILBOX DATA |

| BITS | FIELD NAME | DESCRIPTION |
|---|---|---|
| 0:31 | MAILBOX DATA | APPLICATION-SPECIFIC MAILBOX DATA. EACH APPLICATION CAN UNIQUELY DEFINE THE MAILBOX DATA |

FIG. 17B

ACCESS TYPE     WRITE-BLOCKING
CHANNEL NUMBER     X'1E'

| 0 1 2 3 4 5 6 7 8 9 10 11 12 13 14 15 16 17 18 19 20 21 22 23 24 25 26 27 28 29 30 31 |
|---|
| MAILBOX DATA |

| BITS | FIELD NAME | DESCRIPTION |
|---|---|---|
| 0:31 | MAILBOX DATA | APPLICATION-SPECIFIC MAILBOX DATA. EACH APPLICATION CAN UNIQUELY DEFINE THE MAILBOX DATA |

FIG. 17C

ACCESS TYPE         READ-BLOCKING
CHANNEL NUMBER      X'1D'

| 0 1 2 3 4 5 6 7 8 9 10 11 12 13 14 15 16 17 18 19 20 21 22 23 24 25 26 27 28 29 30 31 |
|---|
| MAILBOX DATA |

| BITS | FIELD NAME | DESCRIPTION |
|---|---|---|
| 0:31 | MAILBOX DATA | APPLICATION-SPECIFIC MAILBOX DATA. EACH APPLICATION CAN UNIQUELY DEFINE THE MAILBOX DATA |

FIG. 18

ACCESS TYPE         READ-BLOCKING
CHANNEL NUMBER      X'3'

| 0 1 2 3 4 5 6 7 8 9 10 11 12 13 14 15 16 17 18 19 20 21 22 23 24 25 26 27 28 29 30 31 |
|---|
| SigCntlWord |

| BITS | FIELD NAME | DESCRIPTION |
|---|---|---|
| 0:31 | SigCntlWord | SIGNAL-CONTROL WORD. THE DATA IS DEFINED BY THE APPLICATION. IT CAN EITHER BE ORed WITH THE PREVIOUS VALUE, OR IT CAN BE OVERWRITTEN |

FIG. 19A

ACCESS TYPE  WRITE
CHANNEL NUMBER  X'7'

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| DECREMENTER COUNT VALUE |||||||||||||||||||||||||||||||||

| BITS | FIELD NAME | DESCRIPTION |
|---|---|---|
| 0:31 | DECREMENTER COUNT VALUE | DECREMENTER COUNT VALUE |

FIG. 19B

ACCESS TYPE  READ

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| DECREMENTER COUNT VALUE |||||||||||||||||||||||||||||||||

| BITS | FIELD NAME | DESCRIPTION |
|---|---|---|
| 0:31 | DECREMENTER COUNT VALUE | DECREMENTER COUNT VALUE |

*FIG. 20A*

| ACCESS TYPE | READ |
|---|---|
| CHANNEL NUMBER | X'D' |

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| IMPLEMENTATION DEPENDENT ||||||||||||||||  RESERVED |||||||||||||| IS | IE |

| BITS | FIELD NAME | DESCRIPTION |
|---|---|---|
| 0:15 | IMPLEMENTATION DEPENDENT | |
| 16:29 | RESERVED | SET TO ZEROS |
| 30 | IS | ISOLATION STATUS<br>0 THE SPU IS OPERATING IN A NON-ISOLATED STATE<br>1 THE SPU IS OPERATING IN AN ISOLATED STATE |
| 31 | IE | SPU INTERRUPT ENABLE STATUS. INTERRUPTS CAN BE ENABLED BY SETTING THE SPU_NPC(IE) BIT TO '1' WHILE THE SPU IS STOPPED OR BY AN SPU INSTRUCTION. SEE THE SYNERGISTIC PROCESSOR UNIT INSTRUCTION SET ARCHITECTURE FOR MORE INFORMATION ON HOW TO ENABLE INTERRUPTS<br>0 SPU INTERRUPTS DISABLED<br>1 SPU INTERRUPT ENABLED |

FIG. 20B

ACCESS TYPE  WRITE
CHANNEL NUMBER  X'E'

| 0 1 2 3 4 5 6 7 8 9 10 11 12 13 14 15 16 17 18 19 20 21 22 23 24 25 26 27 28 29 30 31 |
|---|
| SRR0 DATA |

| BITS | FIELD NAME | DESCRIPTION |
|---|---|---|
| 0:31 | SRR0 DATA | STATE SAVE/RESTORE REGISTER 0 DATA |

FIG. 20C

ACCESS TYPE  READ
CHANNEL NUMBER  X'F'

| 0 1 2 3 4 5 6 7 8 9 10 11 12 13 14 15 16 17 18 19 20 21 22 23 24 25 26 27 28 29 30 31 |
|---|
| SRR0 DATA |

| BITS | FIELD NAME | DESCRIPTION |
|---|---|---|
| 0:31 | SRR0 DATA | STATE SAVE/RESTORE REGISTER 0 DATA |

FIG. 22A

| ACCESS TYPE | READ-BLOCKING |
| --- | --- |
| CHANNEL NUMBER | X'0' |

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| RESERVED | | | | | | | | | | | | | | | | | | | Ms | A | Lr | S1 | S2 | Le | Me | Tm | Mb | Qv | RESERVED | Sn | Tg |

| BITS | FIELD NAME | DESCRIPTION |
| --- | --- | --- |
| 0:18 | RESERVED | RESERVED |
| 19 | Ms | MULTISOURCE SYNCHRONIZATION EVENT. THIS EVENT IS TRIGGERED WHEN THE MULTISOURCE SYNCHRONIZATION REQUEST HAS COMPLETED. THE MULTISOURCE SYNCHRONIZATION REQUEST COMPLETES WHEN ALL PENDING TRANSFERS BEFORE A WRITE OF THE MFC WRITE MULTISOURCE SYNCHRONIZATION REQUEST CHANNEL (MFC_WrMSSyncReq) HAVE COMPLETED. THIS EVENT IS TRIGGERED IMMEDIATELY IF NO TRANSFERS ARE PENDING AT THE TIME OF THE MFC WRITE MULTISOURCE SYNCHRONIZATION REQUEST CHANNEL (MFC_WrMSSyncReq) WRITE<br>0  EVENT HAS NOT OCCURRED<br>1  EVENT HAS OCCURRED AND HAS NOT BEEN ACKNOWLEDGED |
| 20 | A | PRIVILEGED ATTENTION EVENT. THIS EVENT IS TRIGGERED BY SETTING THE SPU ATTENTION-EVENT REQUEST BIT IN THE SPU PRIVILEGED CONTROL REGISTER. ACCESS TO THIS REGISTER SHOULD BE LIMITED TO PRIVILEGED SOFTWARE<br>0  EVENT HAS NOT OCCURRED<br>1  EVENT HAS OCCURRED AND HAS NOT BEEN ACKNOWLEDGED |

TO FIG. 22B

*FIG. 22B*   FROM FIG. 22A

| | | |
|---|---|---|
| 21 | Lr | LOCK LINE RESERVATION LOST EVENT<br>THIS EVENT IS TRIGGERED WHEN A GET LOCK-LINE AND RESERVE (getllar) COMMAND IS ISSUED, AND THE RESERVATION IS RESET DUE TO THE MODIFICATION OF DATA IN THE SAME LOCK LINE BY AN OUTSIDE ENTITY. IT IS NOT TO BE SET DUE TO A RESERVATION RESET BY A LOCAL ACTION<br>0  EVENT HAS NOT OCCURRED<br>1  EVENT HAS OCCURRED AND HAS NOT BEEN ACKNOWLEDGED<br>THIS EVENT IS SET WHEN A SNOOP EXTERNAL TO THE MFC CAUSES A LOCK-LINE RESERVATION TO BE RESET. THE EVENT MUST NOT BE SET IF THE RESERVATION IS LOST DUE TO A LOCAL ACTION |
| 22 | S1 | SPU SIGNAL NOTIFICATION 1 AVAILABLE EVENT<br>THIS EVENT IS TRIGGERED WHEN A SNDSIG COMMAND TARGETS SPU SIGNAL NOTIFICATION 1 REGISTER OF THE CORRESPONDING SPU<br>0  EVENT HAS NOT OCCURRED<br>1  EVENT HAS OCCURRED AND HAS NOT BEEN ACKNOWLEDGED |
| 23 | S2 | SPU SIGNAL NOTIFICATION 2 AVAILABLE EVENT<br>THIS EVENT IS TRIGGERED WHEN A SNDSIG COMMAND TARGETS SPU SIGNAL NOTIFICATION 2 REGISTER OF THE CORRESPONDING SPU<br>0  EVENT HAS NOT OCCURRED<br>1  EVENT HAS OCCURRED AND HAS NOT BEEN ACKNOWLEDGED |
| 24 | Le | SPU OUTBOUND MAILBOX AVAILABLE EVENT<br>THIS EVENT IS TRIGGERED WHEN THE SPU WRITE OUTBOUND MAILBOX CHANNEL COUNT BECOMES GREATER THAN OR EQUAL TO AN IMPLEMENTATION DEPENDENT MAILBOX QUEUE-EMPTY THRESHOLD<br>0  EVENT HAS NOT OCCURRED<br>1  EVENT HAS OCCURRED AND HAS NOT BEEN ACKNOWLEDGED |

FROM FIG. 22B

| | | |
|---|---|---|
| 25 | Me | SPU OUTBOUND INTERRUPT MAILBOX AVAILABLE EVENT<br>THIS EVENT IS TRIGGERED WHEN THE SPU WRITE OUTBOUND INTERRUPT MAILBOX CHANNEL COUNT BECOMES GREATER THAN OR EQUAL TO AN IMPLEMENTATION DEPENDENT INTERRUPT-MAILBOX QUEUE-EMPTY THRESHOLD<br>0   EVENT HAS NOT OCCURRED<br>1   EVENT HAS OCCURRED AND HAS NOT BEEN ACKNOWLEDGED |
| 26 | Tm | SPU DECREMENTER EVENT<br>THIS EVENT IS TRIGGERED BY THE TRANSITION OF THE MOST SIGNIFICANT BIT OF THE SPU DECREMENTER COUNT FROM '0' TO '1'<br>0   EVENT HAS NOT OCCURRED<br>1   EVENT HAS OCCURRED AND HAS NOT BEEN ACKNOWLEDGED |
| 27 | Mb | SPU INBOUND MAILBOX AVAILABLE EVENT<br>THIS EVENT IS TRIGGERED WHEN THE SPU READ INBOUND MAILBOX CHANNEL COUNT BECOMES ZERO<br>0   EVENT HAS NOT OCCURRED<br>1   EVENT HAS OCCURRED AND HAS NOT BEEN ACKNOWLEDGED |
| 28 | Qv | MFC SPU COMMAND QUEUE AVAILABLE EVENT<br>THIS EVENT IS TRIGGERED BY THE TRANSITION OF THE MFC SPU COMMAND QUEUE FROM A FULL TO A NOT-FULL STATE<br>0   EVENT HAS NOT OCCURRED<br>1   EVENT HAS OCCURRED AND HAS NOT BEEN ACKNOWLEDGED |
| 29 | RESERVED | RESERVED |

TO FIG. 22D

*FIG. 22D*  FROM FIG. 22C

| | | |
|---|---|---|
| 30 | Sn | MFC DMA LIST COMMAND STALL-AND-NOTIFY EVENT<br>THIS EVENT OCCURS WHEN THE MFC ENCOUNTERS ONE OR MORE MFC LIST COMMANDS WITH THE STALL-AND-NOTIFY FLAG SET IN THE LIST ELEMENTS. WHEN THIS TYPE OF MFC COMMAND IS ENCOUNTERED, THE LIST ELEMENT IS COMPLETED, AND FURTHER LIST PROCESSING IS SUSPENDED UNTIL THE STALL IS ACKNOWLEDGED BY THE SPU PROGRAM<br>0   EVENT HAS NOT OCCURRED<br>1   EVENT HAS OCCURRED AND HAS NOT BEEN ACKNOWLEDGED |
| 31 | Tg | MFC TAG-GROUP STATUS UPDATE EVENT<br>THIS TAG STATUS EVENT OCCURS WHEN MFC READ TAG-GROUP STATUS CHANNEL IS UPDATED BASED ON THE TAG STATUS UPDATE REQUESTED BY WRITING THE MFC WRITE TAG STATUS UPDATE REQUEST CHANNEL<br>0   EVENT HAS NOT OCCURRED<br>1   EVENT HAS OCCURRED AND HAS NOT BEEN ACKNOWLEDGED |

FIG. 22E

ACCESS TYPE    WRITE
CHANNEL NUMBER  X'1'

```
 0  1  2  3  4  5  6  7  8  9 10 11 12 13 14 15 16 17 18 19 20 21 22 23 24 25 26 27 28 29 30 31
                         RESERVED                              Ms A  Lr S1 S2 Le Me Tm Mb Qv   Sn Tg
                                                                                  RESERVED
```

| BITS | FIELD NAME | DESCRIPTION. FOR MORE INFORMATION ON THESE EVENTS |
|---|---|---|
| 0:18 | RESERVED | RESERVED |
| 19 | Ms | MULTISOURCE SYNCHRONIZATION EVENT ENABLE<br>0  EVENT IS DISABLED<br>1  EVENT IS ENABLED |
| 20 | A | PRIVILEGED ATTENTION EVENT ENABLE<br>0  EVENT IS DISABLED<br>1  EVENT IS ENABLED |
| 21 | Lr | LOCK LINE RESERVATION LOST EVENT ENABLE<br>0  EVENT IS DISABLED<br>1  EVENT IS ENABLED |
| 22 | S1 | SPU SIGNAL NOTIFICATION 1 AVAILABLE EVENT ENABLE<br>0  EVENT IS DISABLED<br>1  EVENT IS ENABLED |
| 23 | S2 | SPU SIGNAL NOTIFICATION 2 AVAILABLE EVENT ENABLE<br>0  EVENT IS DISABLED<br>1  EVENT IS ENABLED |

TO FIG. 22F

FIG. 22F    FROM FIG. 22E

| | | |
|---|---|---|
| 24 | Le | SPU OUTBOUND MAILBOX AVAILABLE EVENT ENABLE<br>0   EVENT IS DISABLED<br>1   EVENT IS ENABLED |
| 25 | Me | SPU OUTBOUND INTERRUPT MAILBOX AVAILABLE EVENT ENABLE<br>0   EVENT IS DISABLED<br>1   EVENT IS ENABLED |
| 26 | Tm | SPU DECREMENTER EVENT ENABLE. SETTING THIS BIT TO ZERO BEFORE ACKNOWLEDGING A DECREMENTER EVENT RESULTS IN THE DECREMENTER BEING STOPPED, REGARDLESS OF THE DECREMENTER EVENT STATUS.<br>0   EVENT IS DISABLED<br>1   EVENT IS ENABLED |
| 27 | Mb | SPU INBOUND MAILBOX AVAILABLE EVENT ENABLE, WRITTEN BY THE PPE<br>0   EVENT IS DISABLED<br>1   EVENT IS ENABLED |
| 28 | Qv | MFC SPU COMMAND QUEUE AVAILABLE EVENT ENABLE<br>0   EVENT IS DISABLED<br>1   EVENT IS ENABLED |
| 29 | RESERVED | RESERVED |
| 30 | Sn | MFC DMA LIST COMMAND STALL-AND-NOTIFY EVENT ENABLE<br>0   EVENT IS DISABLED<br>1   EVENT IS ENABLED |
| 31 | Tag | MFC TAG-GROUP STATUS UPDATE EVENT ENABLE<br>0   EVENT IS DISABLED<br>1   EVENT IS ENABLED |

FIG. 22G

| ACCESS TYPE | READ |
|---|---|
| CHANNEL NUMBER | X'B' |

```
 0  1  2  3  4  5  6  7  8  9 10 11 12 13 14 15 16 17 18 | 19 | 20 | 21 | 22 | 23 | 24 | 25 | 26 | 27 | 28 | 29 | 30 | 31
                    RESERVED                              Ms   A   Lr  S1  S2  Le  Me  Tm  Mb  Qv  RESERVED  Sn  Tg
```

| BITS | FIELD NAME | DESCRIPTION. FOR MORE INFORMATION ON THESE EVENTS. |
|---|---|---|
| 0:18 | RESERVED | RESERVED |
| 19 | Ms | MULTISOURCE SYNCHRONIZATION EVENT ENABLE<br>0  EVENT IS DISABLED<br>1  EVENT IS ENABLED |
| 20 | A | PRIVILEGED ATTENTION EVENT ENABLE<br>0  EVENT IS DISABLED<br>1  EVENT IS ENABLED |
| 21 | Lr | LOCK LINE RESERVATION LOST EVENT ENABLE<br>0  EVENT IS DISABLED<br>1  EVENT IS ENABLED |
| 22 | S1 | SPU SIGNAL NOTIFICATION 1 AVAILABLE EVENT ENABLE<br>0  EVENT IS DISABLED<br>1  EVENT IS ENABLED |
| 23 | S2 | SPU SIGNAL NOTIFICATION 2 AVAILABLE EVENT ENABLE<br>0  EVENT IS DISABLED<br>1  EVENT IS ENABLED |

TO FIG. 22H

FIG. 22H  FROM FIG. 22G

| | | |
|---|---|---|
| 24 | Le | SPU OUTBOUND MAILBOX AVAILABLE EVENT ENABLE<br>0   EVENT IS DISABLED<br>1   EVENT IS ENABLED |
| 25 | Me | SPU OUTBOUND INTERRUPT MAILBOX AVAILABLE EVENT ENABLE<br>0   EVENT IS DISABLED<br>1   EVENT IS ENABLED |
| 26 | Tm | SPU DECREMENTER EVENT ENABLE<br>0   EVENT IS DISABLED<br>1   EVENT IS ENABLED |
| 27 | Mb | SPU INBOUND MAILBOX AVAILABLE EVENT ENABLE, WRITTEN BY THE PPE<br>0   EVENT IS DISABLED<br>1   EVENT IS ENABLED |
| 28 | Qv | MFC SPU COMMAND QUEUE AVAILABLE EVENT ENABLE<br>0   EVENT IS DISABLED<br>1   EVENT IS ENABLED |
| 29 | RESERVED | RESERVED |
| 30 | Sn | MFC DMA LIST COMMAND STALL-AND-NOTIFY EVENT ENABLE<br>0   EVENT IS DISABLED<br>1   EVENT IS ENABLED |
| 31 | Tag | MFC TAG-GROUP STATUS UPDATE EVENT ENABLE<br>0   EVENT IS DISABLED<br>1   EVENT IS ENABLED |

*FIG. 22J*   FROM FIG. 22I

| | | |
|---|---|---|
| 24 | Le | SPU OUTBOUND MAILBOX AVAILABLE EVENT ACKNOWLEDGMENT<br>0   EVENT NOT ACKNOWLEDGED<br>1   EVENT ACKNOWLEDGED |
| 25 | Me | SPU OUTBOUND INTERRUPT MAILBOX AVAILABLE EVENT ACKNOWLEDGMENT<br>0   EVENT NOT ACKNOWLEDGED<br>1   EVENT ACKNOWLEDGED |
| 26 | Tm | SPU DECREMENTER EVENT ACKNOWLEDGMENT<br>0   EVENT NOT ACKNOWLEDGED<br>1   EVENT ACKNOWLEDGED |
| 27 | Mb | SPU INBOUND MAILBOX AVAILABLE EVENT ACKNOWLEDGMENT<br>0   EVENT NOT ACKNOWLEDGED<br>1   EVENT ACKNOWLEDGED |
| 28 | Qv | MFC SPU COMMAND QUEUE AVAILABLE EVENT ACKNOWLEDGMENT<br>0   EVENT NOT ACKNOWLEDGED<br>1   EVENT ACKNOWLEDGED |
| 29 | RESERVED | RESERVED |
| 30 | Sn | MFC DMA LIST COMMAND STALL-AND-NOTIFY EVENT ACKNOWLEDGMENT<br>0   EVENT NOT ACKNOWLEDGED<br>1   EVENT ACKNOWLEDGED |
| 31 | Tg | MFC TAG-GROUP STATUS UPDATE EVENT ACKNOWLEDGMENT<br>0   EVENT NOT ACKNOWLEDGED<br>1   EVENT ACKNOWLEDGED |

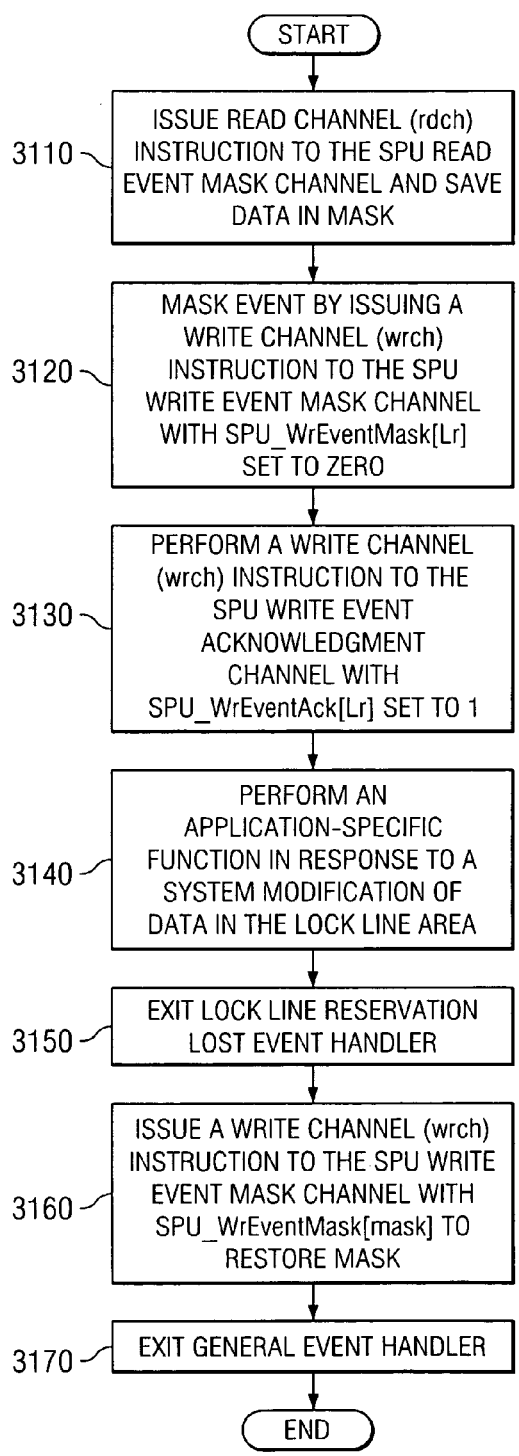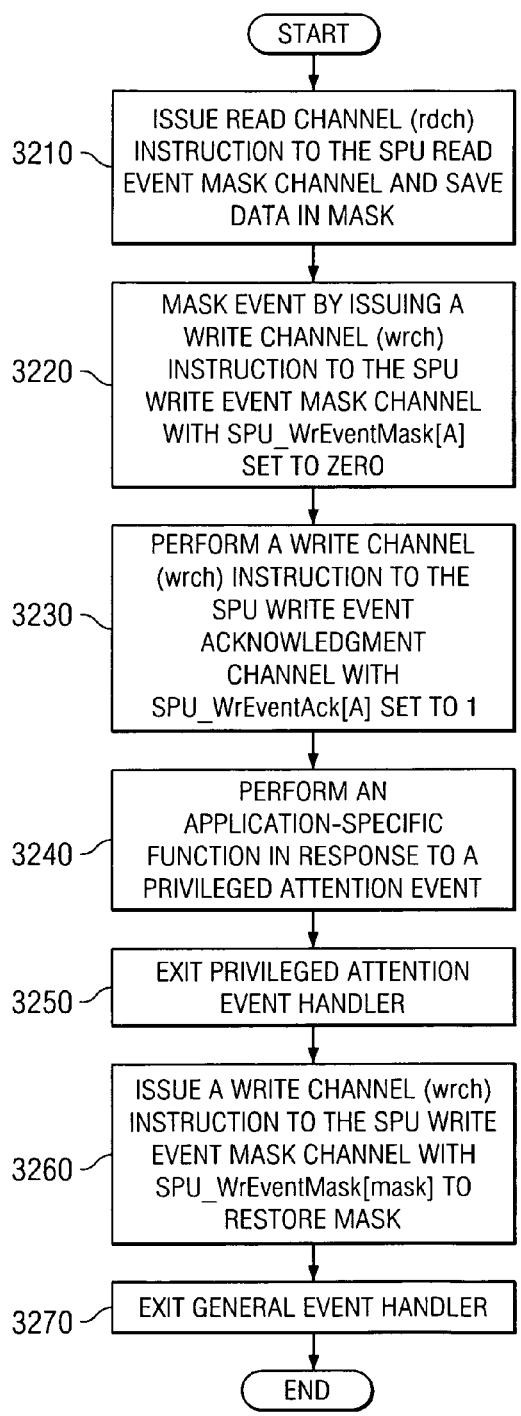

METHOD FOR COMMUNICATING INSTRUCTIONS AND DATA BETWEEN A PROCESSOR AND EXTERNAL DEVICES

BACKGROUND OF THE INVENTION

1. Technical Field

The present invention relates generally to an improved data processing system and method. More specifically, the present invention is directed to a system and method for communicating instructions and data between a processor and external devices.

2. Description of Related Art

Normally, in the prior art, when a CPU or other processing unit (PU) is waiting upon some event external to the program, the operating system or an active program will run a poll loop where it will keep reading an event register, utilized by the PU in connection with the program, until the event that it is waiting upon occurs. While the program is operating, the PU is polling the event register and is not doing useful work.

Typical modern processors often use virtual memory and the memory mapping of external devices for this communication. On the other hand, some processors, especially in a multiprocessor environment, only have access to local memory and not to virtual memory. Local memory is finite and, in typical multiprocessor configurations, no memory outside of this local memory can be accessed by load and store operations. Thus, the use of local memory for other PU functions is limited while awaiting response from an external device. If a PU is simultaneously awaiting communication responses from several devices, the available memory for other functions is even further limited.

Memory may also be used to keep track of whether or not there is valid data in an incoming or outgoing register. Valid data is data that has been placed in the register for use by a receiving device but has not yet been accessed by the receiving device. Thus, from the above, it is clear that there are many drains on the memory resource in most modern computing devices.

SUMMARY OF THE INVENTION

In view of the above, it would be beneficial to have a system and method for communicating between processors and other devices external to the processors, e.g., other processors, input/output (I/O) devices, and the like, where such communication does not burden the local or virtual memory of the processor. Moreover, it would be beneficial to have a system and method that permits the processor to be placed in a low power state while awaiting data or events.

The present invention provides a system and method for communicating instructions and data between a processor and external devices. The system and method of the present invention make use of a channel interface as the primary mechanism for communicating between the processor and a memory flow controller. The channel interface provides channels for communicating with processor facilities, memory flow control facilities, machine state registers, and external processor interrupt facilities, for example. These channels serve to reduce the burden on the processor's local store as well as minimize bus traffic.

These channels may be designated as blocking or non-blocking. With blocking channels, when no data is available to be read from the corresponding registers, or there is no space available to write to the corresponding registers, the processor is placed in a low power "stall" state. The processor is automatically awakened, via communication across the blocking channel, when data becomes available or space is freed. Thus, the channels of the present invention permit the processor to stay in a low power state rather than continuously polling or spinning on an event register, as in the prior art systems.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3A is an exemplary diagram illustrating the parameter mnemonics for MFC commands in accordance with an exemplary embodiment of the present invention;

FIGS. 6B to 6E illustrate an exemplary diagram listing a SPU channel map in accordance with one exemplary embodiment of the present invention;

FIG. 7F is an exemplary diagram illustrating details of a MFC local storage address channel in accordance with one exemplary embodiment of the present invention;

FIG. 7G is an exemplary diagram illustrating details of a MFC effective address low or list address channel in accordance with one exemplary embodiment of the present invention;

FIG. 7H is an exemplary diagram illustrating details of a MFC effective address high channel in accordance with one exemplary embodiment of the present invention;

FIG. 8 is a flowchart outlining an exemplary operation for writing MFC command parameters in accordance with one exemplary embodiment of the present invention;

FIG. 9A is an exemplary diagram illustrating details of a MFC write tag-group query mask channel in accordance with one exemplary embodiment of the present invention;

FIG. 9B is an exemplary diagram illustrating details of a MFC read tag-group query mask channel in accordance with one exemplary embodiment of the present invention;

FIG. 9C is an exemplary diagram illustrating details of a MFC write tag status update request channel in accordance with one exemplary embodiment of the present invention;

FIG. 9D is an exemplary diagram illustrating details of a MFC read tag-group status channel in accordance with one exemplary embodiment of the present invention;

FIG. 9E is an exemplary diagram illustrating details of a MFC read list stall-and-notify tag status channel in accordance with one exemplary embodiment of the present invention;

FIG. 9F is an exemplary diagram illustrating details of a MFC write list stall-and-notify tag acknowledgment channel in accordance with one exemplary embodiment of the present invention;

FIG. 9G is an exemplary diagram illustrating details of a MFC read atomic command status channel in accordance with one exemplary embodiment of the present invention;

FIG. 10 is a flowchart outlining an exemplary operation for polling for the completion of an MFC command or for the completion of a group of MFC commands in accordance with an exemplary embodiment of the present invention;

FIG. 11 is a flowchart outlining an exemplary operation for waiting for a tag-group update, or waiting for events (one or more tag-group completions) in accordance with an exemplary embodiment of the present invention;

FIG. 12 is a flowchart outlining an exemplary operation for using a SPU event facility as an alternative to waiting or polling on a conditional tag event in accordance with an exemplary embodiment of the present invention;

FIG. 13 is a flowchart outlining an exemplary operation for polling to determine if an MFC DMA list command has reached a list element with a stall-and-notify flag set in accordance with an exemplary embodiment of the present invention;

FIG. 14 is a flowchart outlining an exemplary operation for waiting on an MFC DMA list command to reach a list element with the stall-and-notify flag set in accordance with one exemplary embodiment of the present invention;

FIG. 15 is a flowchart outlining an exemplary operation for using a SPU event facility as an alternative to waiting or polling on list Stall-and-Notify Tag Group Status in accordance with an exemplary embodiment of the present invention;

FIG. 16 is an exemplary diagram illustrating details of a MFC write multisource synchronization request channel in accordance with one exemplary embodiment of the present invention;

FIG. 17A is an exemplary diagram illustrating details of a SPU write outbound mailbox channel in accordance with one exemplary embodiment of the present invention;

FIG. 17B is an exemplary diagram illustrating details of a SPU write outbound interrupt mailbox channel in accordance with one exemplary embodiment of the present invention;

FIG. 17C is an exemplary diagram illustrating details of a SPU read inbound mailbox channel in accordance with one exemplary embodiment of the present invention;

FIG. 18 is an exemplary diagram illustrating details of a SPU signal notification channel in accordance with one exemplary embodiment of the present invention;

FIG. 19A is an exemplary diagram illustrating details of a SPU write decrementer channel in accordance with one exemplary embodiment of the present invention;

FIG. 19B is an exemplary diagram illustrating details of a SPU read decrementer channel in accordance with one exemplary embodiment of the present invention;

FIG. 20A is an exemplary diagram illustrating details of a SPU read machine status channel in accordance with one exemplary embodiment of the present invention;

FIG. 20B is an exemplary diagram illustrating details of a SPU write state save-and-restore channel in accordance with one exemplary embodiment of the present invention;

FIG. 20C is an exemplary diagram illustrating details of a SPU read state save-and-restore channel in accordance with one exemplary embodiment of the present invention;

FIGS. 22A to 22D provide an exemplary diagram illustrating details of a SPU read event status channel in accordance with one exemplary embodiment of the present invention;

FIGS. 22E-22F provide an exemplary diagram illustrating details of a SPU write event mask channel in accordance with one exemplary embodiment of the present invention;

FIGS. 22G-22H provide an exemplary diagram illustrating details of a SPU read event mask channel in accordance with one exemplary embodiment of the present invention;

FIGS. 22I-22J provide an exemplary diagram illustrating details of a SPU write event acknowledgment channel in accordance with one exemplary embodiment of the present invention;

FIG. 31 is a flowchart outlining an exemplary operation for handling the lock line reservation lost event in accordance with one exemplary embodiment of the present invention.

FIG. 32 is a flowchart outlining an exemplary operation for handling a privileged attention event in accordance with one exemplary embodiment of the present invention.

DETAILED DESCRIPTION OF THE PREFERRED EMBODIMENTS

Figure 1:
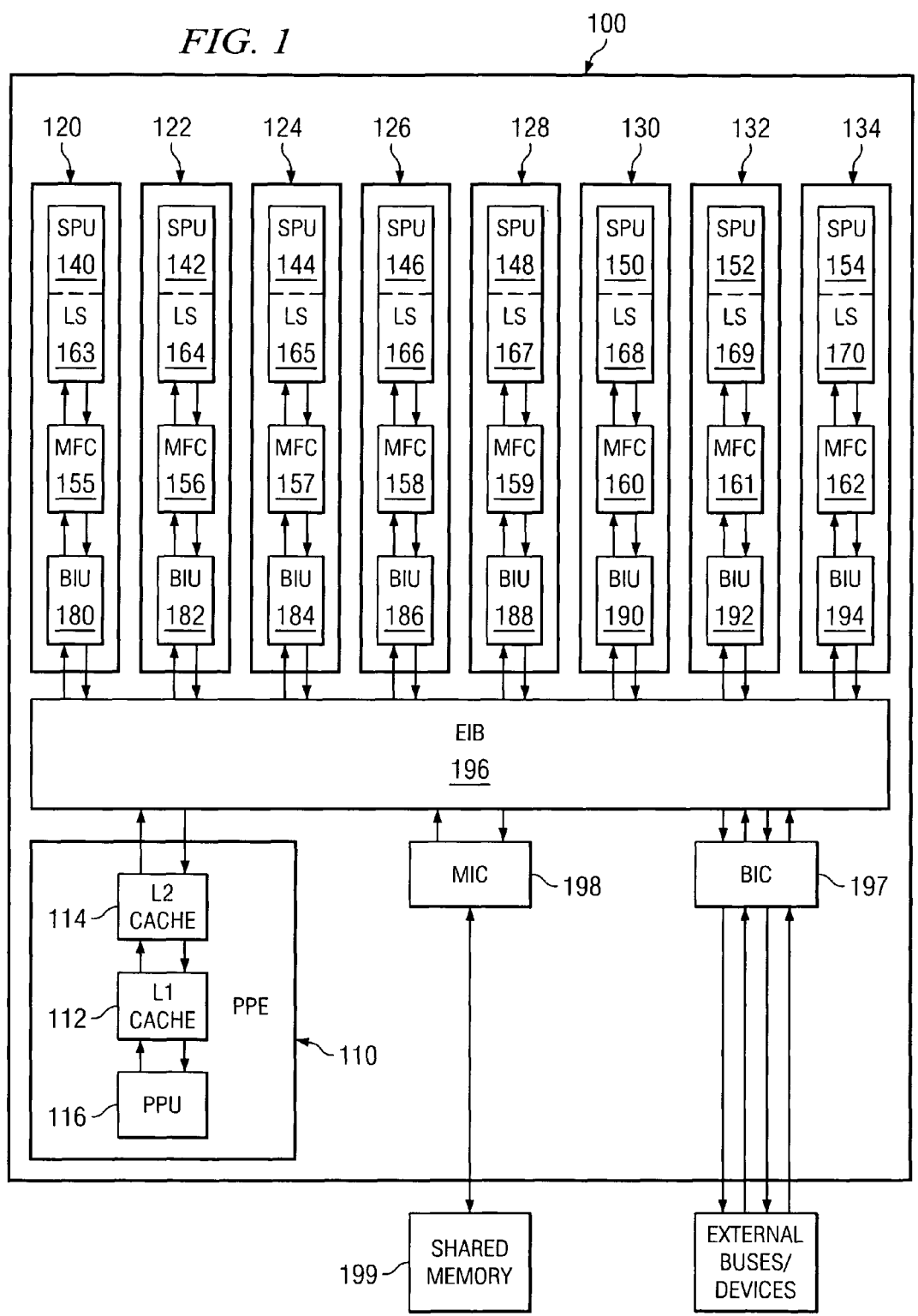
FIG. 1 is an exemplary block diagram of a Broadband Processor Architecture (BPA) in accordance with an exemplary embodiment of the present invention.

FIG. 1 is an exemplary block diagram of a data processing system in which aspects of the present invention may be implemented. The exemplary data processing system shown in FIG. 1 is an example of an implementation of the heterogenous Broadband Processor Architecture, such as the CELL Broadband Engine processor available from International Business Machines, Inc. While the Broadband Processor Architecture (BPA) will be used in the description of the preferred embodiments of the present invention, the present invention is not limited to such, as will be readily apparent to those of ordinary skill in the art upon reading the following description.

As shown in FIG. 1, the BPA 100 includes a heterogenous arrangement of power processor element (PPE) 110 having a processor (PPU) 116 and its L1 and L2 caches 112 and 114, and multiple synergistic processor elements (SPEs) 120-134 each of which has its own processor unit (SPU) 140-154, memory flow control (MFC) 155-162, local memory or store (LS) 163-170, and bus interface unit (BIU unit) 180-194 which may be, for example, a combination direct memory access (DMA), memory management unit (MMU), and bus interface unit. A high-bandwidth internal element interconnect bus (EIB) 196, a bus interface controller (BIC) 197, and a memory interface controller (MIC) 198 are also provided. The broadband engine 100 may be a system-on-a-chip such that each of the elements depicted in FIG. 1 may be provided on a single microprocessor chip.

The BPA 100 may be a system-on-a-chip such that each of the elements depicted in FIG. 1 may be provided on a single microprocessor chip. Moreover, the BPA 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the BPA 100 and other external buses and devices.

The PPE 110 is a dual threaded PPE 110. The combination of this dual threaded PPE 110 and the eight SPEs 120-134 makes the BPA 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-174, and an interface unit 180-194. The local memory or store 163-174, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the BPA 100 may load programs for reading a DVD, video and audio decoding, and display, and the data would be passed off from SPE to SPE until it finally ended up on the output display.

The memory flow control units (MFCs) 155-162 serve as an interface for an SPU to the rest of the system and other elements. The MFCs 155-162 provide the primary mechanism for data transfer, protection, and synchronization between main storage and the local stores 163-174. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

The Memory Flow Control (MFC) Unit

Figure 2:
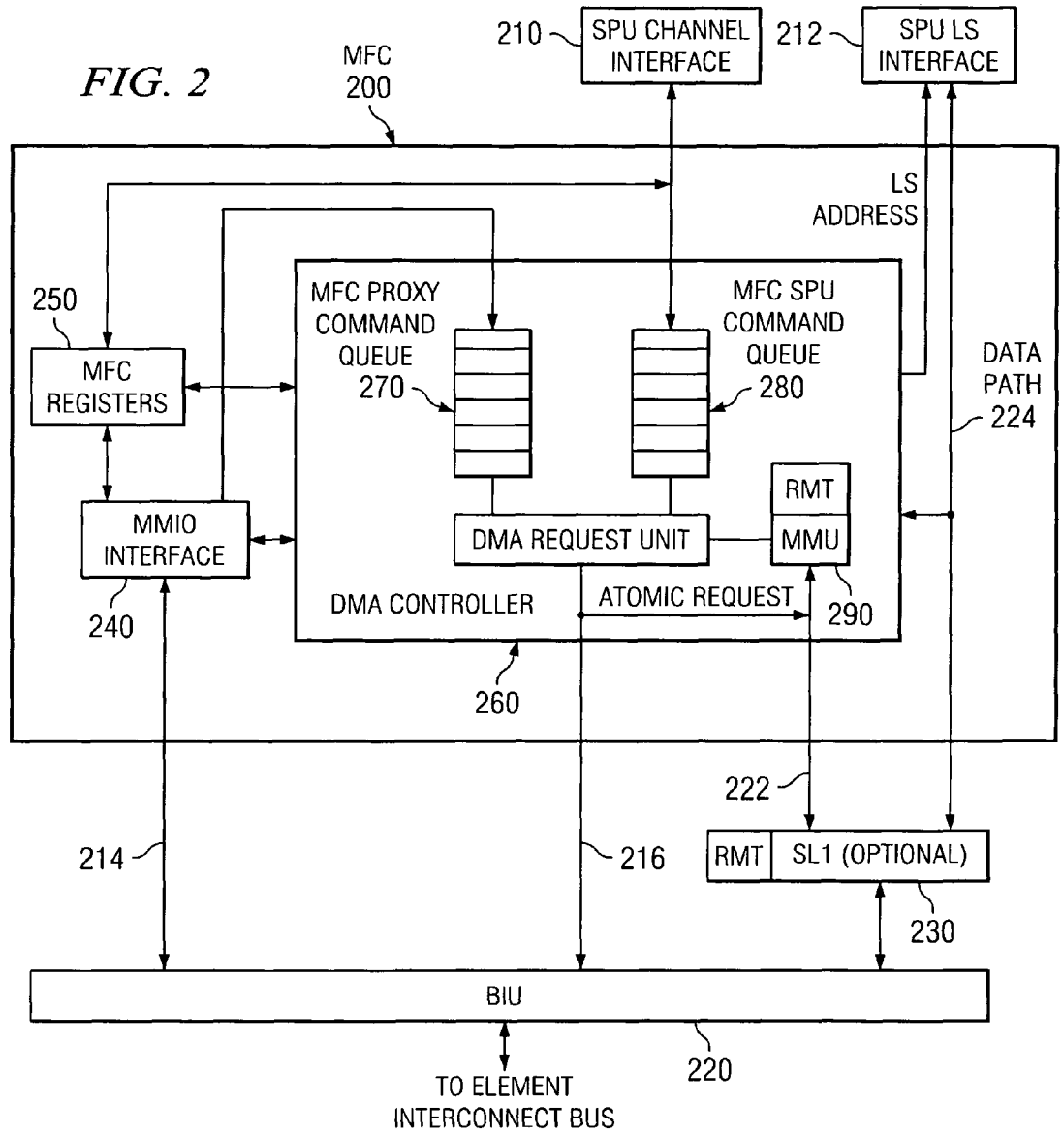
FIG. 2 is an exemplary block diagram of a typical MFC 200 in accordance with an exemplary embodiment of the present invention.

FIG. 2 is an exemplary block diagram of a typical memory flow control (MFC) unit 200 in accordance with an exemplary embodiment of the present invention. In this exemplary embodiment, the MFC 200 has two interfaces 210 and 212 to the SPU, two interfaces 214 and 216 to the Bus Interface Unit (BIU) 220, and two interfaces 222 and 224 to an optional SL1 cache 230. The SPU interfaces 210 and 212 are the SPU channel interface 210 and the SPU local storage interface 212. The SPU channel interface 210 allows the SPU to access MFC facilities and to issue MFC commands. The SPU local storage interface 212 is used by the MFC 200 to access the local store in the SPU. One interface 214 to the BIU 220 allows Memory Mapped I/O (MMIO) access to the MFC facilities. This interface 214 also allows other processors to issue MFC commands. Commands issued using MMIO are referred to as MFC proxy commands.

The interfaces 222 and 224 to the SL1 cache are mainly for data transfers. One interface 222 is used by the MFC 200 for access to the address translation tables in main storage and the other 224 is used for the transfer of data between main storage and local storage.

As shown in FIG. 2, the main units in a typical MFC include a memory mapped input/output (MMIO) interface 240, MFC registers 250, and DMA controller 260. The MMIO interface 240 maps the MFC facilities of the SPU into the real address space of the system. This allows access to the MFC facilities from any processor, or any device in the system. In addition, the MMIO interface 240 may be configured to map the local store of the SPU into the real address space. This allows direct access to the local store from any processor or any device in the system, enabling local-store-to-local-store transfers and the ability for I/O devices to directly access the local store domain of an SPU.

The MFC registers unit 250 contains most of the MFC facilities. Some facilities are contained in the Direct Memory Access Controller (DMAC) 260. The following is a list of the facilities within the MFC 200. User mode environment facilities, i.e. environment facilities that may be accessed from non-privileged applications, include: (1) a Mailbox Facility, (2) a SPU Signal Notification Facility, (3) a Proxy Tag-Group Completion Facility, (4) a MFC Multisource Synchronization Facility, (5) SPU Control and Status Facilities, and (6) a SPU Isolation Facility. Privileged mode environment facilities, i.e.

facilities that may only be accessed by privileged software, such as an operating system, include: (1) MFC State Register One, (2) MFC Logical Partition ID Register, (3) MFC Storage Description Register, (4) MFC Data Address Register, (5) MFC Data Storage Interrupt Status Register, (6) MFC Address Compare Control Register, (7) MFC Local Storage Address Compare Facility, (8) MFC Command Error Register, (9) MFC Data Storage Interrupt Pointer Register, (10) MFC Control Register, (11) MFC Atomic Flush Register, (12) SPU Outbound Interrupt Mailbox Register, (13) SPU Privileged Facilities, (14) SPU Privileged Control Register, (15) SPU Local Storage Limit Register, (16) SPU Configuration Register, and (17) SPE Context Save and Restore.

The facilities that are of particular importance to the mechanisms of the present invention, i.e. the mailbox facility, SPU signal notification facility, proxy tag-group completion facility, MFC multisource synchronization facility, SPU channel access facility, SPU event facility, and interrupt facilities will be described in more detail hereafter.

The synchronization and the transfer of data is generally the responsibility of the DMAC 260 within the MFC 200. The DMAC 260 can move data between the local storage of an SPU and the main storage area. Optionally, the data can be cached in the SL1 cache.

The SPE and PPE instruct the MFC 200 to perform these DMA operations by queuing DMA command requests to the MFC through one of the command queues 270 and 280. Commands issued by an SPE are queued to the MFC SPU command queue 280. Commands issued by a PPE are queued to the MFC proxy command queue 270. The MFC uses a memory mapping unit (MMU) 290 to perform all MFC address translations and MFC access protection checks required for the DMA transfers.

MFC commands provide the main method that enables code executing in an SPU to access main storage and maintain synchronization with other processors and devices in the system. Commands are also provided to manage optional caches. MFC commands can either be issued by code running on the SPU, or by code running on another processor or device, such as the PPE. Code running on the associated SPU executes a series of channel instructions to issue an MFC command. Code running on other processors or devices performs a series of memory mapped I/O (MMIO) transfers to issue an MFC command to an SPE. The commands issued are queued to one of the command queues 270 and 280.

In general, commands can be queued using the MMIO registers, or through channel instructions executed by the associated SPU. The MMIO method is intended for use by the PPE to control the transfer of data between main storage and the associated local storage on behalf of the SPE. MFC commands that transfer data are referred to as MFC DMA commands. The data transfer direction for MFC DMA commands is always referenced from the perspective of an SPE. Therefore, commands that transfer data into an SPE (from main storage to local storage) are considered get commands, while commands that transfer data out of an SPE (from local storage to main storage) are considered put commands.

The MFC commands make use of a plurality of parameters that affect the operation of the command. FIG. 3A is an exemplary diagram illustrating the parameter mnemonics for MFC commands in accordance with an exemplary embodiment of the present invention. Not all parameters are used by all commands. For example, the EAH parameter is optional. When optional parameters are not specified on a command, the optional parameter is set by hardware to '0'.

MFC commands may be categorized into three classes: defined commands, illegal commands, and reserved commands. The class of a command is determined by examining the opcode, and if it exists, the extended opcode. If a command opcode, or a combination of opcode and extended opcode, is not that of a defined or reserved command, then the command is illegal.

Defined commands fall into one of three categories: data transfer commands, SL1 cache-management commands, and synchronization commands. The data transfer commands are further divided into sub-categories that define the direction of the data movement (that is, to or from local storage). Put commands are data transfer commands that move data from the local store to main storage. Get commands are data transfer commands that move data into the local store from main storage. An application can place the data transfer commands into the MFC proxy command queue 270. Unless otherwise noted, these commands can be executed in any order (asynchronous).

The "illegal" class of commands is directed to commands that are not in the defined class or in the reserved class. The "reserved" class of commands is intended for implementation dependent use.

SL1 storage control commands are commands for controlling operations with regard to the SL1 cache. These storage control commands include "hint" commands for informing the SL1 cache that a particular type of data transfer commands is probably going to be issued, e.g., a get or put command, address range manipulation commands, and flush commands, for example.

MFC synchronization commands are used to control the order in which storage accesses are performed with respect to other MFCs, processors, and other devices. MFC synchronization commands include commands for enforcing in-order execution, barrier commands for ordering all subsequent commands with respect to all commands preceding the barrier command in the DMA command queue, a send signal command for logically setting signal bits in a targeted signal notification register, and the like.

Figure 3B:
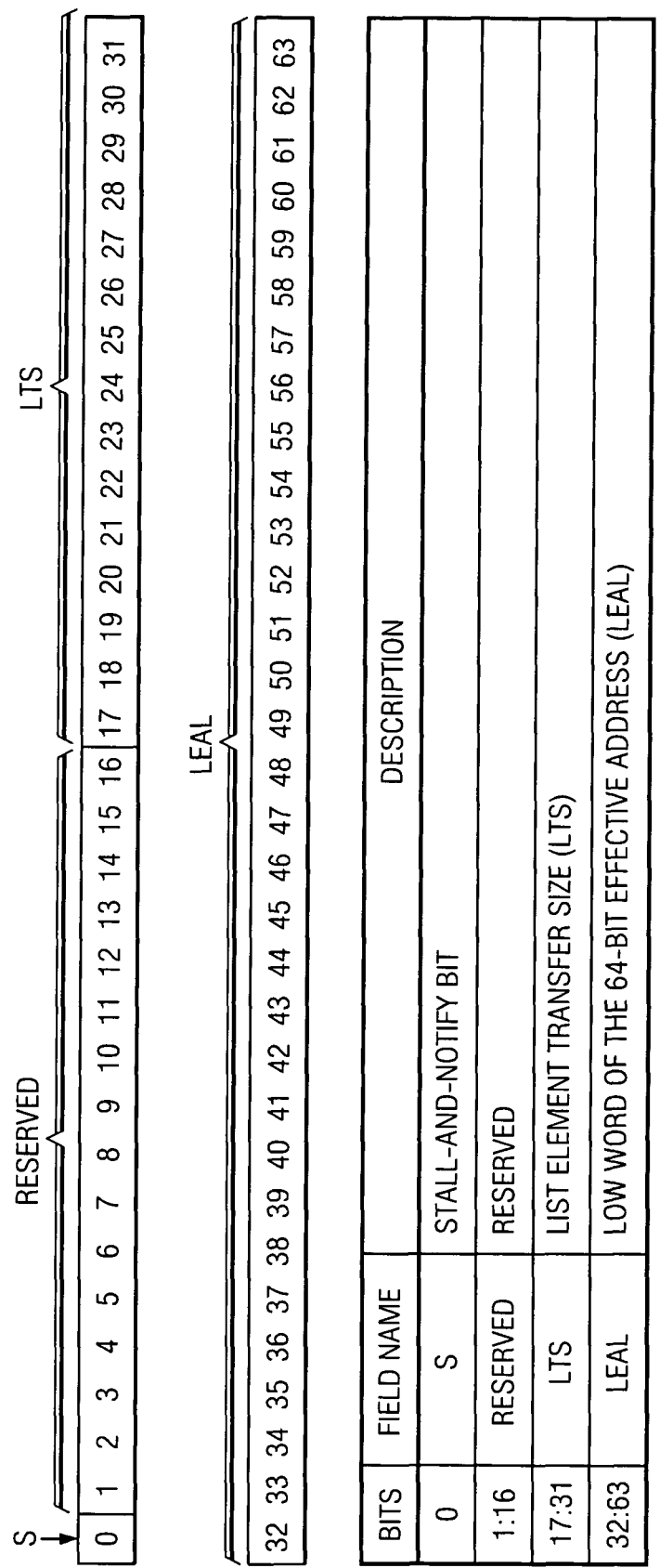
FIG. 3B is an exemplary diagram illustrating details of a DMA list command in accordance with an exemplary embodiment of the present invention.

MFC commands may be individual DMA commands or may be DMA list commands. Details of a DMA list command in accordance with an exemplary embodiment of the present invention are shown in FIG. 3B. The DMA list commands use a list of effective addresses and transfer size pairs, or list elements, stored in local storage as the parameters for the DMA transfer. These parameters are used for SPU-initiated DMA list commands, which are not supported on the MFC proxy command queue. The first word of each list element contains the transfer size and a stall-and-notify flag. The second word contains the lower order 32 bits of the effective address. While the starting effective address is specified for each transfer element in the list, the local storage address involved in the transfer is only specified in the primary list command (the term "primary" refers to the list command as specified by the parameters shown in FIG. 3A).

The local storage address is internally incremented based on the amount of data transferred by each element in the list. However, due to alignment restrictions, if the local storage address does not begin on a 16-byte boundary for a list element transfer, the hardware automatically increments the local storage address to the next 16-byte boundary. This only occurs if transfer sizes less than 16 bytes are used. List elements with transfer sizes less than 16 bytes use a local storage offset within the current quadword (16 bytes) defined by the 4 least-significant bits of the effective address.

Effective addresses specified in the list elements are relative to the 4-GB area defined by the upper 32 bits of the effective address specified in the base DMA list command.

While DMA list starting addresses are relative to the single 4-GB area, transfers within a list element can cross the 4-GB boundary.

Setting the "S" (stall-and-notify) bit causes the DMA operation to suspend execution of this list after the current list element has been processed, and to set a stall-and-notify event status for the SPU. Execution of the stalled list does not resume until the MFC receives a stall-and-notify acknowledgment from the SPU program. Stall-and-notify events are posted to the SPU program using the associated command tag group identifier. When there are multiple DMA list commands in the same tag group with stall-and-notify elements software ensures that a tag-specific barrier or global barrier is used to force ordered execution of the DMA list commands to avoid ambiguity.

All DMA list elements within the DMA list command are guaranteed to be started and issued in sequence. All elements within a DMA list command have an inherent local ordering. A single DMA list command can contain up to 2048 elements, occupying 16 KB of local storage.

The Channel Interface

In the BPA, channels are used as the primary interface between the synergistic processing unit (SPU) and the memory flow control (MFC) unit. The SPU Channel Access Facility is used to configure, save, and restore the SPU channels. The SPU Instruction Set Architecture (ISA) provides a set of channel instructions for communication with external devices through a channel interface (or SPU channels). Table 1 lists these instructions:

TABLE 1

Channel Instructions

| Channel Instruction | Instruction Mnemonic | Operational Description |
|---|---|---|
| Read Channel | rdch | Causes a read of data stored in the addressed channel to be loaded into the selected general purpose register (GPR). |
| Write Channel | wrch | Causes data to be read from the selected GPR and stored in the addressed channel |
| Read Channel Count | rchcnt | Causes the count associated with the addressed channel to be stored in the selected GPR |

Architecturally, SPU channels can be configured to have an access type of read-only or write-only. Channels cannot be configured as read and write. In addition to the access type, each channel can be configured as non-blocking or blocking. Channels that are configured as blocking cause the SPU to stall when reading a channel with a channel count of '0', or writing to a full channel (that is, a channel with a channel count of '0'). A "read" channel means that only a read channel instruction (rdch) can be issued to this channel and data is always returned. A "write" channel means that only a write channel instruction (wrch) can be issued to this channel and data is always accepted by the channel.

A "read-blocking" channel means that only a read channel instruction (rdch) can be issued to this channel. A read channel instruction (rdch) sent to a read-blocking channel only completes if the channel count is not zero. A channel count of '0' indicates that the channel is empty. Executing a channel read (rdch) to a read-blocking channel with a count of '0' results in the SPU stalling until data is available in the channel.

A "write-blocking" channel means that only a write channel instruction (wrch) can be issued to this channel. A write channel (wrch) instruction sent to a write-blocking channel only completes if the channel count is not zero. A channel count of '0' indicates that the channel is full. Executing a write channel (wrch) instruction to a write-blocking channel with a count of '0' results in the SPU stalling until an entry in the addressed channel becomes available.

It should be noted that issuing a channel instruction that is inappropriate to the configuration of the channel results in an invalid channel instruction interrupt. For example, issuing a read channel instruction (rdch) to a channel configured as a write or a write-blocking channel results in an invalid channel instruction interrupt.

Each channel has a corresponding count (that is, depth), which indicates the number of outstanding operations that can be issued for that channel. The channel depth (that is, the maximum number of outstanding transfers) is implementation-dependent. Software must initialize the channel counts when establishing a new context in the SPU, or when it resumes an existing context.

Figure 4:
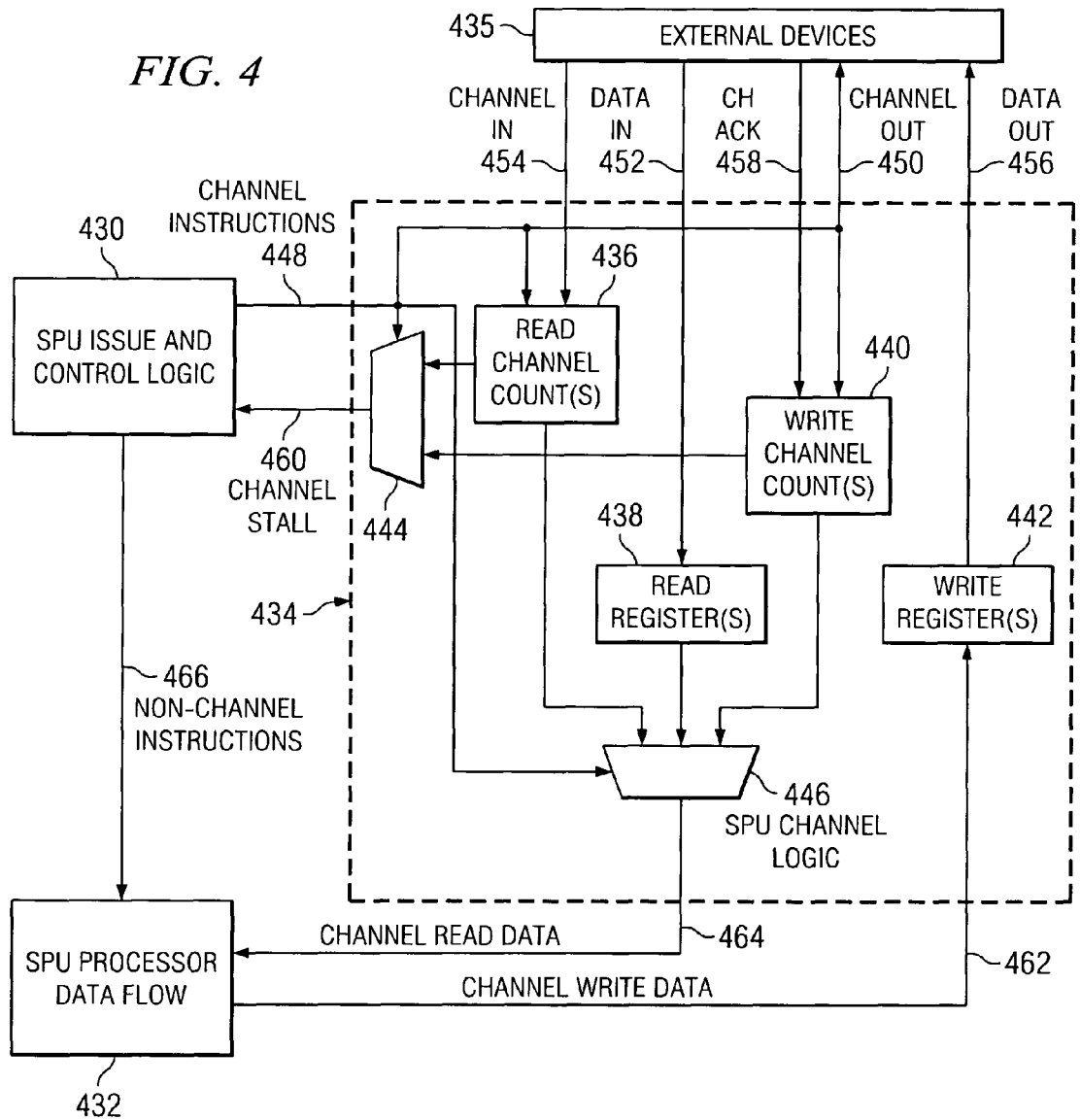
FIG. 4 is an exemplary diagram illustrating the arrangement of the SPU issue and control logic and data flow with respect to channel circuitry for a single pair of channels in accordance with the mechanism described in U.S. Patent Application Publication No. 2004/0264445.

The operation of channels and a channel interface is described in co-pending and commonly assigned U.S. Patent Application Publication No. 2004/0264445 entitled "External Message Passing Method and Apparatus," filed on Jun. 26, 2003, which is hereby incorporated by reference. FIG. 4 is an exemplary diagram illustrating the arrangement of the SPU issue and control logic and data flow with respect to channel circuitry for a single pair of channels in accordance with the mechanism described in U.S. Patent Application Publication No. 2004/0264445. The operation of a channel interface will now be described with reference to the various blocks depicted in FIG. 4.

As shown in FIG. 4, a block 430 represents external device instruction issue and control logic of a SPU. A block 432 represents data flow to and from a SPU. As is known, a processor may simultaneously be in communication with many different external devices. In the present processor, the communication is accomplished via a channel register. Each channel operates in one direction only, and is called either a Read Channel or a Write Channel, according to the operation that can be performed on the channel by the SPU. A block 434 represents the channel logic for one set of channels for a single external device as represented by a block 435. As will be discussed in greater detail hereafter, this external device 435 may be a MFC, such as the MFC 200, machine status registers, or any other type of external device. In particular, the use of the channel interface to communicate with the MFC, the machine status registers, an event facility, a mailbox facility and a signal notification facility will be described hereafter following this general description of the channel interface.

Within block 434 there is shown a read channel counter 436, a read register 438, a write channel counter 440, a write register 442, a MUX (multiplexer) 444 and a MUX 446. Channel instructions are delivered from the SPU issue and control logic 430 on a bus 448 to the read and write counters 436 and 440 as well as to a gate input of the MUXs 444 and 446. These instructions are also supplied on a channel OUT lead 450 to the appropriate external device such as 435. A data IN lead 452 provides data from the external device 435 to read register 438. A channel count IN signal is supplied from the external device 435 on a channel IN lead 454 to counter 436 signifying that data has been input to the register and operating to alter the count in counter 436 by one value or digit.

The data being output to the external device 435 from write register 442 is supplied on a data OUT lead 456. A channel acknowledgement signal is returned from the external device 435 on a channel ACK lead 458 to write channel counter 440 when the external device 435 has completed satisfactory reception of the data and operates to alter the count in counter 440 by one value unit or digit. In a preferred embodiment of the invention, a signal on bus 448 will decrement the appropriate read or write counter while a signal on either lead 454 or 458 will increment the appropriate read or write counter.

As shown, the count of both of the counters 436 and 440 is supplied through the MUX 444 on a channel stall lead 460 to the SPU issue and control logic 430. Channel write data is supplied from the SPU data flow block 432 on a channel write data lead 462 to the write register 442. Outputs from blocks 436, 438 and 440 are returned to data flow block 432 on a bus 464. Non-channel instructions are communicated between blocks 430 and 432 via a bus 466.

Figure 5:
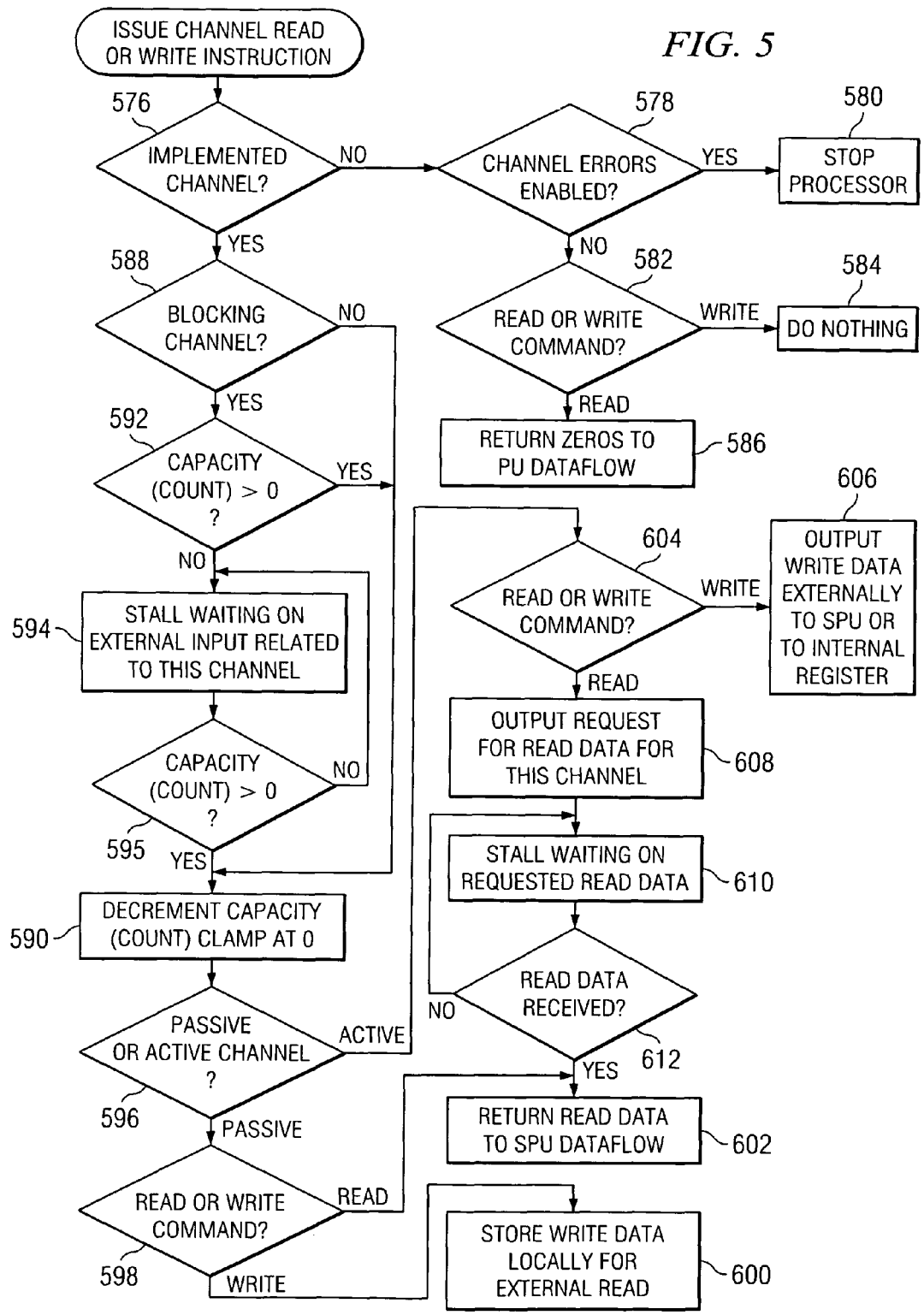
FIG. 5 provides a flowchart outlining an exemplary operation of the channel interface in accordance with an exemplary embodiment of the present invention.

FIG. 5 provides a flowchart outlining an exemplary operation of the channel interface in accordance with an exemplary embodiment of the present invention. It will be understood that each block, and combination of blocks, of the flowchart illustration in FIG. 5, and the flowchart illustrations in subsequent figures described hereafter, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

As shown in FIG. 5, the issuance of a channel read or write instruction will cause a determination as to whether or not the channel specified is one where a control mechanism, as set forth above, has been implemented (step 576). If not, a determination is made as to whether channel errors logic is enabled (step 578). If so, the processor is stopped (step 580). If not, a determination is made as to whether the command is a read or a write (step 582).

If the non-implemented command is a write, nothing further is done for that command (step 584). On the other hand, if the non-implemented command is a read, zeros are returned to the data processor data flow (step 586). In either case, the process returns to a status of awaiting the next read or write instruction. In the preferred embodiment shown, all valid read instructions must return a value. As defined herein, channel read instructions to a non-implemented channel return a value of all zeroes.

It may be noted that for a particular implementation, not all channels have to be defined. Each channel will have a unique numerical identifier. In a preferred embodiment, this channel identifier ranges from 0 to 127. However, since not all channels need to be defined, not all identifiers may be used. Thus, if there is an instruction to an undefined channel, then the process goes down the above-referenced non-implemented path. It may be desired, in some implementations, that channel read or write commands to non-implemented channels be considered an illegal operation. The further action may possibly be to force the processor to stop, as shown in the previously mentioned step 580.

Returning to FIG. 5, if in step 576 it is determined that the channel specified has been implemented, a check is made to see if the specified channel is a blocking channel (step 588). If not, the count for that channel is decremented but not allowed to be less than zero (step 590). If the channel is determined to be blocking, a check is made to determine if the count for that channel is greater than zero (step 592). If so, the process returns to step 590.

If the count is already at zero, as determined in step 592, the SPU stalls until an external device provides input related to this channel and thus changes the count from zero (steps 594 and 595). Thus the loop of steps 594 and 595 is periodically processed until there is a change in the count for this channel. Once the count is changed, the process continues from step 595 to step 590.

Thereafter, it is determined if the channel is active or passive (step 596). If the channel is passive, a check is made to see if the command is a write or read instruction (step 598). If the command is a write instruction, the data is stored locally for external read (step 600). If the command is a read instruction, the data is returned to the SPU, via SPU data flow 432 of FIG. 4 (step 602).

It should be noted that, in the situation of a passive channel, the SPU is dependent upon an external process to complete the operation. As an example, a read channel may be dependant on an external device to load data. On the other hand, in an active channel, the SPU actively completes the operation of executing a read or write operation. An example of this type of operation is when the connected hardware makes an external request for data from an active read channel.

When it is determined, in step 596, that the channel is an active channel, a check is made to see if the command is a read or write command (step 604). If the command is to write, the write data is output externally to the SPU or an internal register (step 606). If the command is read, a read request is sent to the appropriate external device (step 608).

Input of the requested data is awaited (step 610). Periodically, a determination is made as to whether or not the read data has been received (step 612). If not, the process returns to step 610 until the time for the next check occurs. When the data is received, the process is completed (step 602).

From the above, it will be apparent that each channel is accessed using a specific channel read or write instruction where the channel number is specified in the instruction. Each channel has a count specified with it. This count is read using a read channel count instruction where the channel of interest is specified in the instruction. Channel commands are not speculative and cannot be processed out of order at the external interface. The channel architecture does not require that devices external to the SPU process the channel commands in order, but may do so depending on the processor and external device implementation. The value in this count register keeps track of the number of accesses to this register versus the number of external acknowledgments that have occurred to this register.

In operation, the manner of changing of the channel count via accesses through the external interface(s) is based on the implementation. In a preferred embodiment, the count is incremented by one for each successful data transfer to or from a register. For each channel, SPU access can be defined as a read or write channel. Further, in the preferred embodiment, a "0" count is used to stall further operations when the channel is defined or implemented as a "blocking" channel. When a channel register is defined to have a queue depth of "1," a "0" count may be used to indicate that the data in that channel is not valid. The channel can also be defined to stall SPU operations on a read or write channel command, on that command, if the count is "0" until such time as the count is no longer "0."

In a preferred embodiment, the counter value is decremented for every SPU initiated read or write channel command and is incremented for each external initiated read or write (with or without data) access. In other words, the counter maintains an indication of inputs versus outputs. Thus, a value or count of "0" indicates that, for writes, no more external write slots are available. On the other hand, a count value of "0" for reads indicates that there is no valid data. When the count is zero, if an additional SPU read or write channel command is issued, and the channel is defined as non-blocking, then the count will remain at "0" and data in the register is lost. As implemented in the preferred embodiment, the previously most recent data in that register is lost. If the count is at a maximum value for the number of bits of that channel register implementation and there occurs an additional transaction that would cause the count to increment out of range, then the count will stay at that maximum value.

The method of initializing the count value is implementation dependent, and one method is initialization through the external interface. This count can be used for flow control for a write queue. The count can be preset to the depth of the external queue. A value of zero in the count register means that there is no more space in this external queue. For an external queue depth of "1," the count should be preset to "1." When the SPU writes to this channel, the count goes to "0." When the external device reads from this channel, the count is incremented to "1," thereby indicating that the channel is ready for another write operation.

As mentioned above, for reads of the channel registers, this allows the count to indicate valid data. If the count register is preset to "0," this indicates that the data is not valid. When the external device writes to this channel, the count increments to "1," indicating the data is valid for SPU reads. When the SPU reads from this channel, the count decrements back to "0," indicating that another external write can occur.

In a preferred embodiment of the invention, computer code channel count read instructions are sent to the counter to ascertain the count for both the read and write channels. When the external device is an intelligent device, such as another SPU or computing device in a multiprocessor environment, the external device may also send channel count read instructions to the counter to ascertain the count. In this manner, the external device may determine when the channel contains unread data in either the read or write channel and/or when it is appropriate to send additional data to the processor containing the read channel.

In usage with the present invention, the read and write channels may be either non-accumulating or accumulating. Accumulating channels are channels that accumulate multiple writes. That is, incoming data is logically added to data already contained in a register or other storage means, until the channel is read. Upon reading the channel, the accumulating register is reset, typically to "0," and the channel begins accumulating again. This action can be for both read or write channels.

Further, accumulating channels can be blocking or non-blocking. Typically, accumulating channels will only have a count depth of "1" as opposed to non-accumulating channels may act to count each write to that channel.

In summary, the channel interface utilizes defined channels to free up memory but still provide easily accessible information as to when data in a register is valid or, in other words, has not been previously read. This information is obtained by sending a channel count read instruction to the counting mechanism. When an intelligent external device is connected to a given channel, a similar instruction may be used by the external device in sending or receiving data to or from given channels. The channel interface, through the use of the channel count read instructions, also further prevents the accidental overwriting of data in a register when the specified channel is defined as a non-blocking channel.

The present invention makes use of the channel interface and the defined channels to communicate instructions and data to/from different types of external devices and facilities provided by such external devices. For example, the present invention provides mechanisms for utilizing the channel interface of the SPU to communicate instructions and data with the MFC, machine status registers, and interrupt facilities. Moreover, the channel interface is used to communicate instructions and data with event facilities, mailbox facilities, multisource synchronization facilities, proxy tag group completion facilities, signal notification facilities, and the like, of the BPA.

Figure 6A:
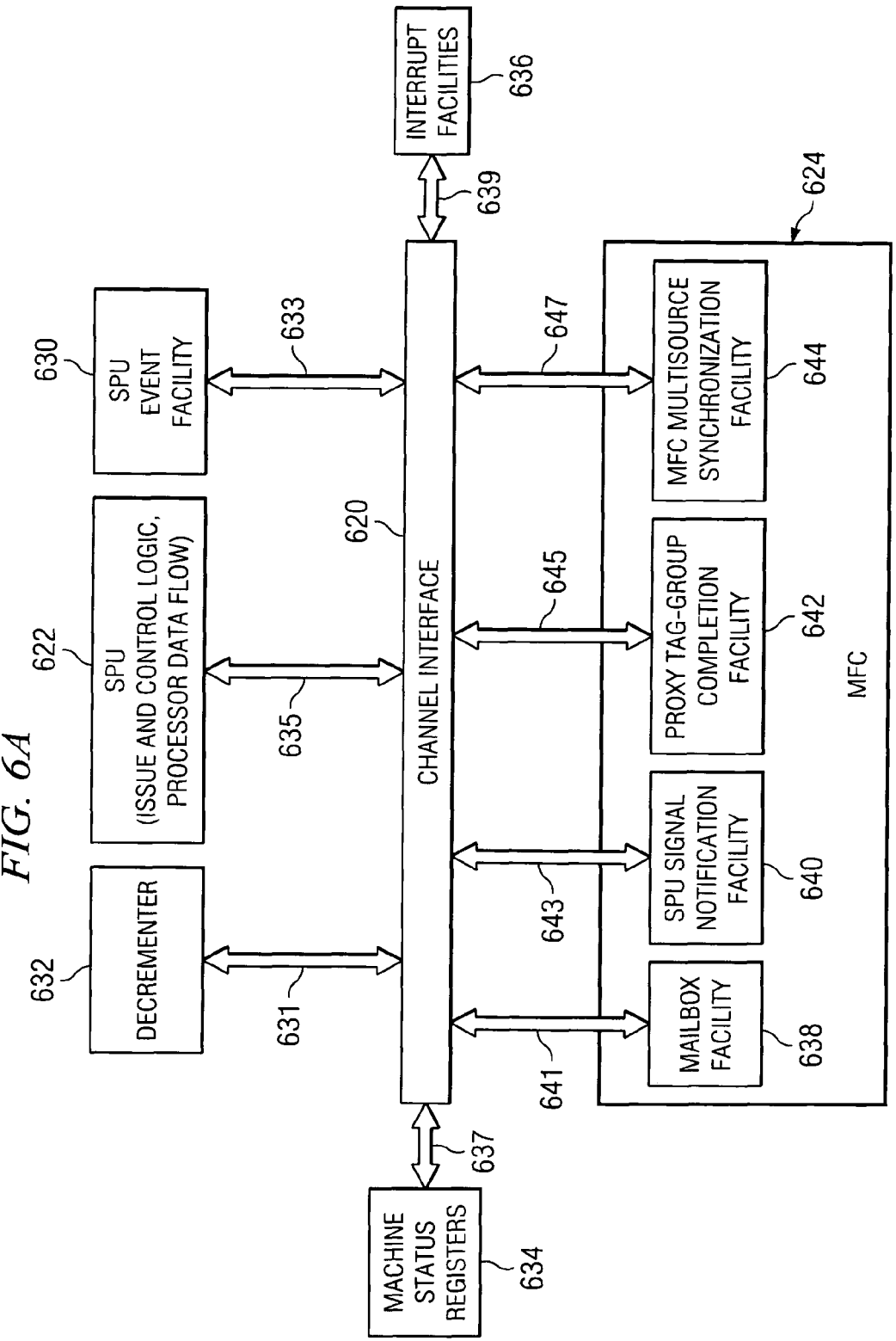
FIG. 6A is an exemplary diagram illustrating the manner by which channels are employed by one embodiment of the present invention.

FIG. 6A is an exemplary diagram illustrating the manner by which channels are employed by one embodiment of the present invention. As shown in FIG. 6A, a channel interface 620 provides a plurality of channels via which the SPU 622 may communicate with the MFC 624, machine status registers 634, and interrupt facilities 636. Each channel may be comprised of elements similar to that described above with regard to FIG. 4 and whose operation is similar to that described in FIGS. 5A and 5B. In one exemplary embodiment of the present invention, channel interface 620 may correspond to an aggregate of all channel pairs represented by block 434 in FIG. 4. SPU 622 may correspond to a combination of blocks 430 and 432 in FIG. 4, for example, with all other blocks in FIG. 6 corresponding to block 435 in FIG. 4.

As shown in FIG. 6A, the channels 631, 633 and 635 provide a communication pathway associated with the SPU 622 through which the SPU event facility 630 and decrementer 632 may communicate with the MFC 624. The SPU event facility 630 provides mechanisms for handling events generated within the BPA. The channel 633 provides a mechanism for identifying events of interest and obtaining information regarding these events of interest, as will be discussed in greater detail hereafter. The decrementer 632 provides a mechanism by which software running on an SPU can measure the progress of time or be notified of the passage of a given measure of time. The decrementer 632 may have its value set and status read via channels 631.

The SPU (issue and control logic, processor data flow) 622 provides instructions, data, and facilities for communicating with external devices. For example, the SPU 622 provides the SPU channel access facility which is a privileged facility that initializes, saves, and restores the SPU channels. The facility consists of three MMIO registers: the SPU Channel Index Register, the SPU Channel Count Register, and the SPU Channel Data Register. The SPU Channel Index Register is a pointer to the channel whose count and data is accessed by the SPU Channel Count Register and SPU Channel Data Register, respectively. The SPU Channel Index Register selects which SPU channel is accessed using the SPU Channel Count Register or the SPU Channel Data Register. The SPU Channel Data Register is used to read or to initialize the SPU channel data selected by the SPU Channel Index Register.

In addition to channels 631, 633 and 635 for communicating with facilities of the SPU 622, the channels 637 provide a communication pathway associated with machine status registers 634. The machine status registers 634 contain the current machine isolation status and interrupt status. The isolation status indicates whether a SPU has been isolated or not. The isolation facilities of the BPA enable privileged software and applications to isolate and load a code image into one or more of the SPUs. The SPU isolation facility ensures the code image loaded into the associated local storage of the SPU has not been altered by any means. The interrupt status related machine status registers are used to save and restore interrupt-state information when nested interrupts are supported.

Furthermore, the channels 639 provide communication pathways associated with interrupt facilities 636. The interrupt facilities 636 are used for routing interrupts and interrupt status information to a PPE or external device, prioritizing interrupts presented to a PPE, and generating an inter-processor interrupt.

Additionally, the channels 641 provide communication pathways associated with mailbox facility 638. The mailbox facility 638 is used for sending information to, and receiving information from, external devices such as other SPUs, the PPE, and the like.

Channels 643 provide communication pathways associated with SPU signal notification facility 640. The SPU signal notification facility 640 is used to send signals, such as a buffer completion flag, to an SPU from other processors and devices in the system.

Channels 645 provide communication pathways associated with proxy tag group completion facility 642. The proxy tag group completion facility 642 is a facility for determining when processing of a group of similarly tagged instructions has completed.

Channels 647 provide communication pathways associated with MFC multisource synchronization facility 644. The MFC multisource synchronization facility 644 achieves cumulative ordering across the local storage and main storage address domains. Ordering of storage accesses performed by multiple sources (that is, two or more processors or units) with respect to another processor or unit is referred to as cumulative ordering.

FIGS. 6B to 6E illustrate an exemplary diagram listing a SPU channel map in accordance with one exemplary embodiment of the present invention. As shown in FIGS. 6B to 6E, the SPU channel interface supports various types of channels for communicating instructions and data. These channels include SPU event channels 650, SPU signal notification channels 652, SPU decrementer channels 654, MFC multisource synchronization channels 656, a SPU reserved channel 658, mask read channels 660, SPU state management channels 662, MFC command parameter channels 664, MFC tag status channels 666, and SPU mailbox channels 668. These "channels" are essentially memory mapped registers and corresponding circuitry for writing to these registers. Thus, the term "channel" may also be used herein to refer to a register or registers for storing a data value corresponding to a designated "channel." The operation of each of these channels will be described hereafter. Various facilities are provided in the PPE, SPU and MFC for utilizing these channels. Each of these types of channels will be described in detail hereafter, starting with those channels used to communicate with the MFC.

MFC Command Parameter Channels

The MFC command parameter channels 664 are channels used to write data to the MFC command parameter registers of the MFC SPU command queue (see FIG. 2 and Table 1 above). The MFC command parameter channels 664 are non-blocking and do not have channel counts associated with them. Thus, performing a read channel count (rchcnt) instruction that is sent to any of these channels returns a count of "1."

The MFC command parameter channels 664 include a MFC local storage address channel, an MFC effective address high channel, a MFC effective address low or list address channel, a MFC transfer size or list size channel, a MFC command tag identification channel, a MFC command opcode channel, and a MFC class ID channel. Each of these channels will be described in detail hereafter.

MFC Command Opcode Channel

Figure 7A:
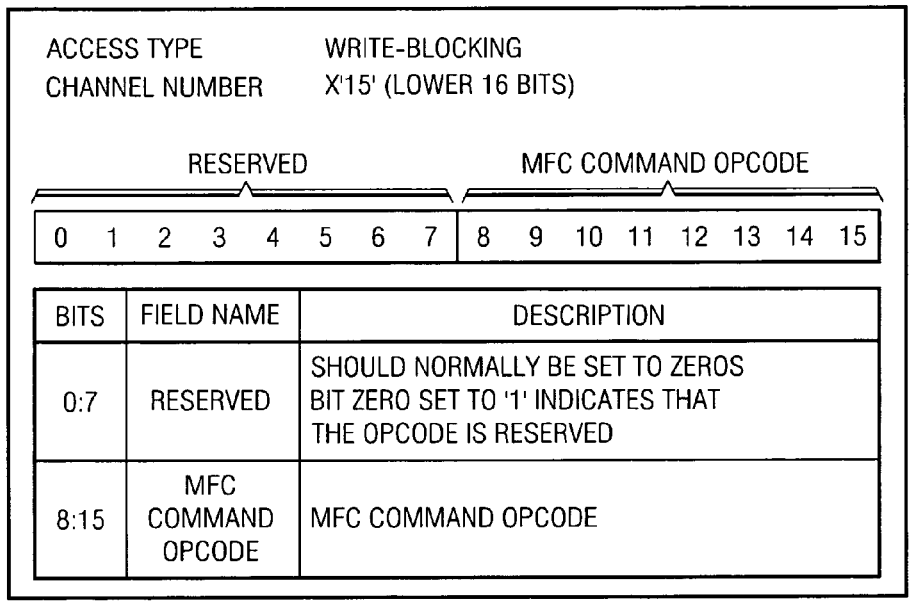
FIG. 7A is an exemplary diagram illustrating details of a MFC command opcode channel in accordance with one exemplary embodiment of the present invention.

Details of a MFC command opcode channel are provided in FIG. 7A in accordance with one exemplary embodiment of the present invention. The MFC command opcode channel identifies the operation to be performed based on an opcode. The validity of this opcode is checked asynchronously to the instruction stream. If the MFC command, or any of the command parameters are invalid, MFC command queue processing is suspended and an invalid MFC command interrupt is generated.

The MFC command and the class ID parameters are written to the MFC SPU command queue using a single channel instruction. As shown in FIG. 7A, in a preferred embodiment, the MFC command opcode parameter is the lower 16 bits of the 32-bit word. The upper 8 bits of this field are reserved and the lower 8 bits identify the MFC command opcode.

MFC Class ID Channel

Figure 7B:
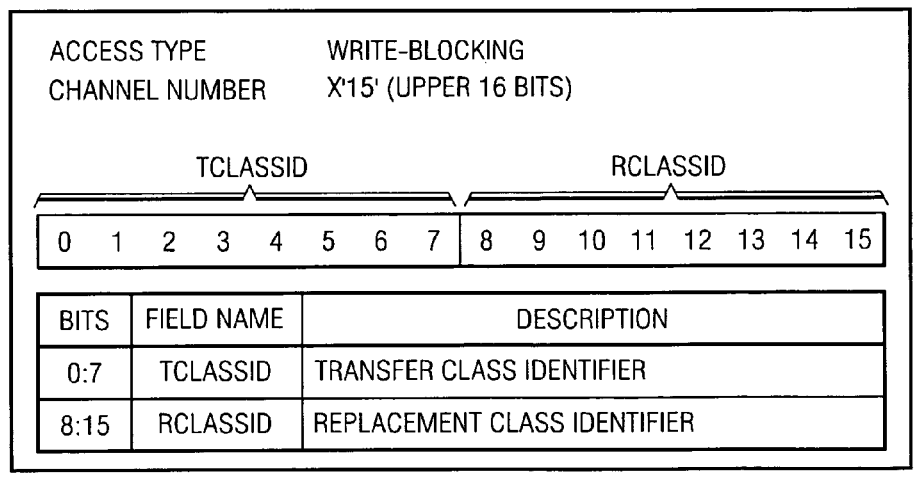
FIG. 7B is an exemplary diagram illustrating details of a MFC class ID channel in accordance with one exemplary embodiment of the present invention.

The MFC class ID channel is used to specify the replacement class ID and the transfer class ID for each MFC command, as shown in FIG. 7B. These IDs are used by the SPU and software to improve the overall performance of the system. In particular, the replacement class ID (RclassID) is used with a replacement management table (RMT) to control cache replacement. The replacement class ID may be generated from the load-and-store address for PPE operations, for example (the PPE includes a address range facility that provides a method to map effective addresses or real addresses for PPE loads and stores and instruction fetches to a class ID for the cache replacement management facility).

The RclassID is used to generate an index to a privileged-software managed table, i.e. the replacement management table (RMT), which is used to control the replacement policy. The format of the RMT is implementation-dependent. The RMT consists of an implementation-dependent number of entries, which should contain set-enable bits, a valid bit, and other control information. Optionally, an implementation can also provide a cache bypass bit and an algorithm bit. The number of entries and the size of each entry in the RMT table is implementation dependent.

Figure 7C:
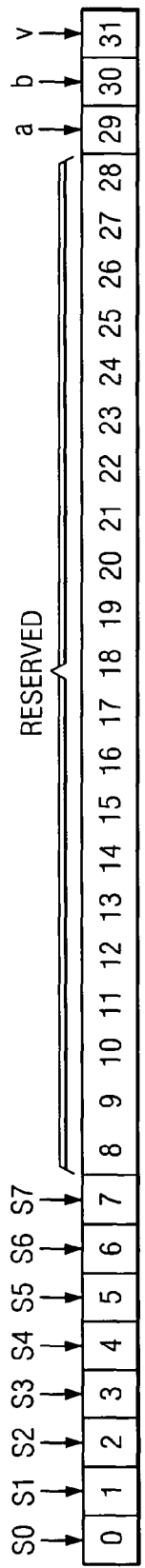
FIG. 7C depicts a typical RMT entry for an 8-way, set-associative cache in accordance with one exemplary embodiment of the present invention.

FIG. 7C depicts a typical RMT entry for an 8-way, set-associative cache. The RMT table is located in the real address space of the system. The privileged software should map these RMT tables as privileged pages. An implementation should provide an RMT for each major cache structure.

Returning to FIG. 7B, the transfer class ID (TclassID) is used to identify access to storage with different characteristics. The TclassID is intended to be used to allow an implementation to optimize the transfers corresponding to the MFC command based on the characteristics of the storage location. Setup and use of the TclassID is implementation dependent.

The contents of the RclassID and TclassID, hereafter referred to herein as the "class ID parameters," are not persistent and must be written for each MFC command enqueue sequence. The class ID parameters perform the same function, whether they are used with commands issued from the PPE or the SPU side of the SPU command queue. The class ID parameters are used to control resources associated with the SPE and have no effect on resources associated with other SPEs or PPES. The validity of the class ID parameters is not verified. The number of class ID parameters supported is implementation dependent.

MFC Command Tag Identification Channel

Figure 7D:
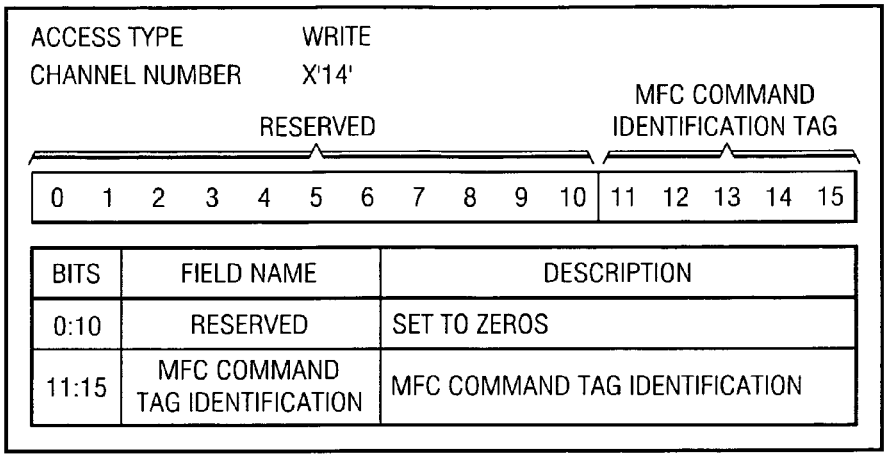
FIG. 7D is an exemplary diagram illustrating details of a MFC command tag identification channel in accordance with one exemplary embodiment of the present invention.

The MFC command tag identification channel is used to specify an identifier for each command, or for a group of commands. The details of the MFC command tag identification channel are depicted in FIG. 7D. The identification tag is any value between x'0' and x'1F' for example. Identification tags have a purely local scope in the hardware. Thus, the same tag may be used in different SPEs or PPEs.

Any number of MFC commands can be tagged with the same identification. MFC commands tagged with the same identification are referred to as a tag group. Tags are associated with commands written to a specific queue. Tags supplied to the MFC SPU command queue are independent of the tags supplied to the MFC proxy command queue. The contents of the MFC command tag identification parameter are not persistent and must be written for each MFC command enqueue sequence. The validity of this parameter is checked asynchronously with respect to the instruction stream. If the upper bits (bits 0 through 10, for example) are not set to 0's, the MFC command queue processing is suspended and an interrupt is generated.

MFC Transfer Size or List Size Channel

Figure 7E:
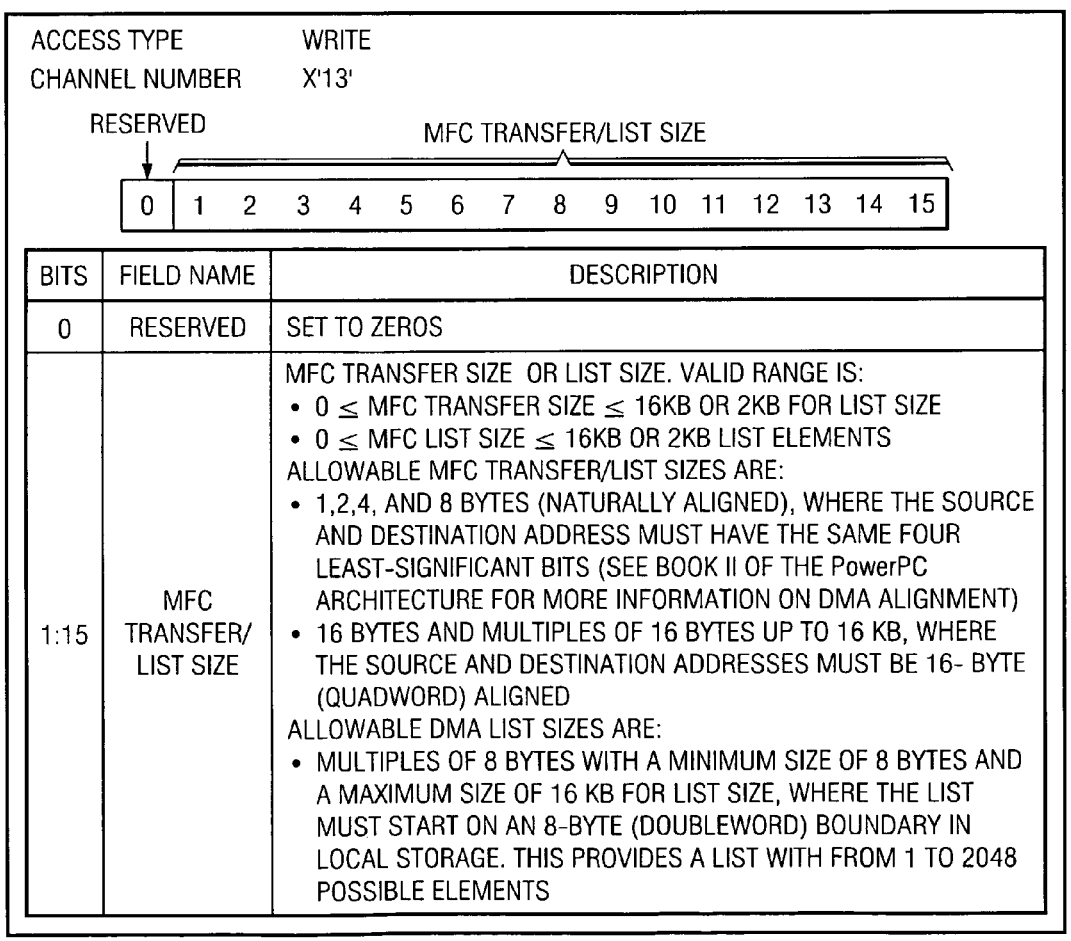
FIG. 7E is an exemplary diagram illustrating details of a MFC transfer size or list size channel in accordance with one exemplary embodiment of the present invention.

The MFC transfer size or list size channel is used to specify the size of the MFC transfer, or the size of the MFC DMA transfer list, i.e. a list of a series of DMA transfer commands. The details of the MFC transfer size or list size channel are provided in FIG. 7E. In an exemplary embodiment, the transfer size can have a value of 1, 2, 4, 8, 16, or a multiple of 16 bytes to a maximum of 16 KB. The MFC DMA transfer list size can have a value of 8, or of multiples of 8, up to a maximum of 16 KB. The contents of the MFC transfer size or list size channel are not persistent and must be written for each MFC command enqueue sequence. The validity of this parameter is checked asynchronously with respect to the instruction stream. If the size is invalid, the MFC command queue processing is suspended and an MFC DMA alignment interrupt is generated.

MFC Local Storage Address Channel

The MFC local storage address channel is used to supply the SPU local storage address associated with the MFC command to be queued. The MFC local storage address is used as the source or destination of the MFC transfer as defined in the MFC command. The details of the MFC local storage address channel are provided in FIG. 7F.

The contents of the MFC local storage address channel are not persistent and must be written for each MFC command enqueue sequence. The validity of the MFC local storage address parameter is checked asynchronously with respect to the instruction stream. If the address is unaligned, MFC command queue processing is suspended and an MFC DMA alignment exception is generated. To be considered aligned, the 4 least significant bits of the local storage address must match the least significant 4 bits of the effective address, for example.

MFC Effective Address Low or List Address Channel

The MFC effective address low or list address channel is used to specify the effective low address for the MFC command, or the local storage pointer to the list elements for an MFC DMA list command. If translation is enabled in the MFC state register, effective addresses are translated into real addresses by the address translation facility of the PPE. FIG. 7G provides details of the MFC effective address low or list address channel.

The contents of the MFC effective address low or list address channel are not persistent and must be written for each MFC command enqueue sequence. For transfer sizes less than 16 bytes, bits 28 through 31 of this parameter must provide natural alignment based on the transfer size. For transfer sizes of 16 bytes or greater, bits 28 through 31 must be "0." If translation is disabled, this parameter must be within the real address space limits of the main storage domain. For MFC list commands, bits 29 through 31 of the list address must be "0." If any of these conditions are not met, the parameter is invalid and considered unaligned.

The validity of the MFC effective address low or list address parameter is checked asynchronously with respect to the instruction stream. If the address is invalid, for example due to a segment fault, a mapping fault, a protection violation, or because the address is not aligned, MFC command queue processing is suspended and an interrupt is generated. The types of interrupts that may be generated are a MFC data-segment interrupt, a MFC data-storage interrupt, and a DMA alignment interrupt.

MFC Effective Address High Channel

The MFC effective address high channel is used to specify the effective address for the MFC command. If translation is enabled in the MFC state register, effective addresses are translated into real addresses by the address translation facility. The details of the MFC effective address high channel are shown in FIG. 7H.

The contents of the MFC effective address high channel are not persistent and must be written for each MRC command enqueue sequence. If the upper 32 bits are not written, hardware sets EAH, the high address bits are set to 0's, i.e. the address is between 0 and 4 GB. The validity of this parameter is checked asynchronously with respect to the instruction stream. If the address is invalid, for example due to a segment fault, a mapping fault, or a protection violation, MFC command queue processing is suspended and an interrupt is generated. The types of interrupts that may be generated include a MFC data-segment interrupt and a MFC data-storage interrupt. It should be noted that the validity of the effective address is checked during transfers. Partial transfers can be performed before an invalid address is encountered and the exception is generated.

Using the MFC command parameter channels described above, to queue a MFC command from the SPU, the MFC command parameters must first be written to the MFC command parameter channels. This may be done in any order except that the MFC command opcode and class ID parameters must be written last. Thus, in order to write the MFC command parameters, the operation as outlined in FIG. 8 is followed.

As shown in FIG. 8, the operation includes writing the local storage address parameter to the MFC local storage address channel (step 810). The effective address high parameter is written to the MFC effective address high channel (step 820). The effective address low or the list address parameter is written to the MFC effective low or list address channel (step 830). The MFC transfer or list size parameter is written to the MFC transfer size or list size channel (step 840). The MFC command tag parameter is written to the MFC command tag identifier channel (step 850). After all of the above parameters are written to their respective channels, the MFC command opcode and class ID parameters are written to the MFC opcode and MFC class ID channels (step 860) and the operation terminates. It should be appreciated that steps 810-850 may be performed in any order with step 860 following the writing of the other parameters to their respective channels.

The MFC command parameters are retained in the MFC command parameter channels until a write of the MFC command opcode and class ID parameter is processed by the MFC. A write channel (wrch) instruction to the MFC command opcode channel and MFC class ID channel causes the parameters held in the MFC command parameter channels to be sent to the MFC command queue. The MFC command parameters can be written in any order before the issue of the MFC command itself to the MFC command queue. The values of the last parameters written to the MFC command parameter channels are used in the enqueuing operation.

After an MFC command has been queued, the values of the MFC parameters become invalid and must be respecified for the next MFC command queuing request. Not specifying all of the required MFC parameters (that is, all the parameters except for the optional EAH) can result in the improper operation of the MFC command queue.

The MFC command opcode channel and the MFC class ID channel have a maximum count configured by hardware to the number of MFC queue commands supported by the hardware. Software must initialize the channel count of the MFC command opcode channel to the number of empty MFC proxy command queue slots supported by the implementation after power on and after a purge of the MFC proxy command queue. The channel count of the MFC command opcode channel must also be saved and restored on a SPE preemptive context switch.

MFC Tag-Group Status Channels

As mentioned previously, each command may be tagged with an identifier, e.g., a 5-bit identifier, referred to as the MFC command tag. The same identifier can be used for multiple MFC commands. A set of commands with the same identifier is defined as a tag group. Software can use the MFC command tag to check, or to wait on, the completion of all queued commands for each tag group. In addition, the MFC command tag is used by software to check, or to wait on, an MFC DMA list command, to reach an element with a stall-and-notify flag set, and to acknowledge the list element for resuming the MFC DMA list command.

The MFC tag-group status channels will first be described and then a description of the procedures for determining the status of tag groups and for determining MFC DMA list command completion will be provided.

The MFC tag-group status channels include a MFC write tag-group query mask channel, a MFC read tag-group query mask channel, a MFC write tag status update request channel, a MFC read tag-group status channel, a MFC read list stall-and-notify tag status channel, a MFC write list stall-and-notify tag acknowledgment channel, and a MFC read atomic command status' channel. Each of these channels will be described in detail hereafter.

MFC Write Tag-Group Query Mask Channel

The MFC write tag-group query mask channel is used to select the tag groups to be included in a query or wait operation. Details of the MFC write tag-group query mask channel are shown in FIG. 9A.

The data provided by this channel is retained by the MFC until changed by a subsequent write channel (wrch) instruction issued to this channel. Therefore, the data does not need to be respecified for each status query or wait. If this mask is modified by software when an MFC tag status update request is pending, the meaning of the results are ambiguous. A pending MFC tag status update request should always be cancelled before a modification of this mask. An MFC tag status update request can be cancelled by writing a value of "0" (that is, immediate update) to the MRC write tag status update request channel. The current contents of this channel can be accessed by reading (rdch) the MFC read tag-group query mask channel. This channel is non-blocking and does not have an associated count. If a read channel count (rchcnt) instruction is sent to this channel, the count is always returned as "1."

MFC Read Tag-Group Query Mask Channel

The MFC read tag-group query mask channel is used to read the current value of the proxy tag-group query mask register. Details of the MFC read tag-group query mask channel are provided in FIG. 9B. Reading this channel always returns the last data written to the MFC write tag-group query mask channel. This channel can be used to avoid software shadow copies of the proxy tag-group query mask and for SPE context save and restore operations. This channel is non-blocking and does not have an associated count. Thus, if a read channel count (rchcnt) instruction is sent to this channel, the count is always returned as "1."

MFC Write Tag Status Update Request Channel

The MFC write tag status update request channel controls when the MFC tag-group status is updated in the MFC read tag-group status channel. Details of the MFC write tag status update request channel are shown in FIG. 9C.

The MFC write tag status update request channel can specify that the status be updated immediately or upon the occurrence of a condition, e.g., updated when any enabled MFC tag-group completion has a "no operation outstanding" status or updated only when all enabled MFC tag groups have a "no operation outstanding" status. A write channel (wrch) instruction to this channel must occur before a read channel (rdch) from the MFC read tag-group status channel occurs.

A MFC write tag status update request should be performed after setting the tag-group mask and after issuing the commands for the tag groups of interest. If the commands for a tag group are completed before issuing the MFC write tag status update request, thereby satisfying the update status condition, the status is returned without waiting. Reading from the MFC read tag-group status channel without first requesting a status update by writing to the MFC write tag status update request channel results in a software induced deadlock.

A previous MFC tag status update request can be cancelled by issuing an immediate update status request to the MFC write tag status update request channel, reading the count associated with the MFC write tag status update request channel until a value of "1" is returned, and then reading from the MFC read tag-group status channel to determine and to discard unwanted results.

Two conditional update requests without an intervening status read request results in the return of an unpredictable tag status. To avoid unpredictable results, software pairs requests for tag status updates with reads to the tag status, unless a request cancellation is being performed via the immediate update request.

Privileged software initializes the count for this channel to "1." The count for this channel is set to "0" when a write channel (wrch) instruction is issued to this channel. The count is set to "1" when the MFC receives the tag status update request. This channel is write-blocking enabled with a maximum count of "1."

MFC Read Tag-Group Status Channel

The MFC read tag-group status channel contains the status of the tag groups from the last tag-group status update request. The details of the MFC read tag-group status channel are provided in FIG. 9D.

Only the status of the enabled tag groups at the time of the tag-group status update is valid. The bit positions that correspond to the tag groups that are disabled at the time of the tag group status update are set to "0."

An MFC write tag status update request channel must be requested before reading from this channel. Failure to do so results in a software induced deadlock condition. This is considered a programming error, and privileged software is required to remove the deadlock condition.

A read channel count (rchcnt) instruction sent to the MFC read tag-group status channel returns "0" if the status is not yet available or returns "1" if the status is available. This instruction can be used to avoid stalling the SPU when the MFC read tag-group status channel is read. Software initializes the count for this channel to a value of "0." This channel is read-blocking enabled with a maximum count of "1."

MFC Read List Stall-and-Notify Tag Status Channel

Details of the MFC read list stall-and-notify tag status channel are provided in FIG. 9E. As previously described, list elements for an MFC list command contain a stall-and-notify flag. If the flag is set on a list element, the MFC stops executing the MFC list command, i.e. DMA list command, and sets the bit corresponding to the tag group of the MFC list command in this channel. The count associated with this channel is also set to "1." An MFC list command remains stalled until acknowledged by writing the tag value to the MFC write list stall-and-notify tag acknowledgment channel.

The MFC list stall and notify facility is useful when a program wishes to be notified when a DMA list execution has reached a specific point. This is also useful when an application wishes to dynamically change list elements (transfer sizes or effective addresses) that follow the stalled list element. List elements can also be skipped by setting their transfer size to "0." Hardware is not allowed to pre-fetch list elements beyond a stall and notify element.

Privileged software should initialize the count of the MFC read list stall-and-notify tag status channel to 0's. Software can determine which tag groups have commands that have stalled since the last read of this channel by reading the contents of this channel again. Issuing a read channel (rdch) instruction to this channel resets all bits to 0's and sets the count corresponding to this channel to a "0." Therefore, issuing a read channel (rdch) instruction with no outstanding list elements that contain a stall-and-notify flag set to "1" and no stalled commands results in a software induced deadlock.

Issuing a read channel (rdch) instruction on this channel when no tag groups are stalled results in an SPU execution stall until a list element with the stall-and-notify flag set is encountered. Software can also read (rchcnt) the count associated with this channel for use with the SPU event facility to determine when an MFC list element is encountered with the stall-and-notify flag set. A read channel count (rchcnt) instruction sent to the MFC read list stall-and-notify tag status channel returns a "0" if there are no new stalled MFC list commands since the last read of this channel. This channel is read-blocking and has a maximum count of "1."

MFC Write List Stall-and-Notify Tag Acknowledgment Channel

The details of the MFC write list stall-and-notify tag acknowledgment channel are shown in FIG. 9F. The MFC write list stall-and-notify tag acknowledgment channel is used to acknowledge a tag group containing MFC list commands that are stalled on a list element with the stall-and-notify flag set. The tag group is acknowledged by writing the MFC tag group to this channel. After the write, all stalled MFC list commands of the tag group which match the value written to this channel are restarted.

The MFC list stall-and-notify facility is useful when a program wishes to be notified when a DMA list execution has reached a specific point. This is also useful when an application wishes to dynamically change list elements (transfer sizes or effective addresses) that follow the stalled list element. List elements can also be skipped by setting their transfer size to 0. Hardware is not allowed to pre-fetch list elements beyond a stall-and-notify element.

Acknowledging a tag group that is currently not stalled due to a stall-and-notify condition is undefined. Doing so results in an invalid status in the MFC read list stall-and-notify tag status channel. For consistency, this condition is treated as a no-op.

This channel is a non-blocking channel and does not have an associated count. Whenever a read channel count (rchcnt) instruction is sent to this channel, the count is always returned as "1."

MFC Read Atomic Command Status Channel

The details of the MFC read atomic command status channel are provided in FIG. 9G. The MFC read atomic command status channel contains the status of the last completed immediate MFC atomic update command. An atomic command is a command that is performed without waiting for other commands in the MFC SPU queue and is performed independently of the other commands in the MFC SPU queue. There are four atomic commands supported by the MFC: getlar (get lock line reserve), putlc (put lock line conditional), putluc (put lock line unconditional), and putqlluc (put queued lock line unconditional). These commands perform a similar function to a cacheable store instruction, conventionally used by software to release a "lock". The difference between the putlluc and putqlluc commands is that the putqlluc command is tagged and queued behind other MFC commands in the MFC SPU command queue, whereas the putlluc command is executed immediately.

Since the putqlluc command is tagged and has an implied tag-specific fence, it is then ordered with respect to all other commands in the same tag group already in the MFC SPU command queue. The getllar, putllc, and putlluc commands are not tagged; therefore, they are executed immediately. Even though the getllar, putllc, and putlluc commands are executed immediately, these commands still require an available slot in the MFC SPU command queue. No ordering with other commands in the MFC SPU command queue should be assumed. After issuing each getllar, putllc, or putlluc command, the software must issue a read from the MFC Read Atomic Command Status Channel to verify completion of the command. Issuing a channel read (rdch) instruction to this channel before issuing an immediate atomic command results in a software induced deadlock.

Software can read the channel count (rchcnt) associated with this channel to determine if an immediate atomic MFC command has completed. If a value of "0" is returned, the immediate atomic MFC command has not completed. If a value of "1" is returned, the immediate atomic MFC command has completed and the status is available by reading (rdch) this channel.

A read (rdch) from the MFC read atomic command status channel should always follow an immediate atomic MFC command. Performing multiple atomic MFC commands without an intervening read from the MFC read atomic command status channel results in an incorrect status.

Privileged software initializes the count of this channel to "0." This channel is read-blocking with a maximum count of "1." The contents of this channel are cleared when read. Completion of a subsequent immediate MFC atomic update command overwrites the status of earlier MFC commands.

The MFC tag-group status channels described above are used to facilitate determining the status of tag groups and for determining MFC DMA list command completion. Three basic procedures are supported to determine the status of the tag groups: polling the MFC read tag-group status channel, waiting for a tag-group update, or waiting for an event, and interrupting on a tag-group status update event. For polling for the completion of an MFC command or for the completion of a group of MFC commands, the basic procedure is as shown in FIG. 10.

As shown in FIG. 10, any pending tag status update requests are cleared (step 1010). This may be accomplished, for example, by writing a "0" to the MFC write tag status update request channel, reading the channel count associates with the MFC write tag status update request channel until a value of "1" is returned, and reading the MFC read tag-group status channel and discarding the tag status data.

The tag groups of interest are then enabled by writing to the MFC write tag group query mask channel with the appropriate mask data (step 1020). An immediate tag status update is then requested, for example, by writing to the MFC write tag status update request channel with a value of "00" (step 1030).

A read of the MFC read tag-group status channel is then performed (step 1040). The data that is returned is the current status of each tag group with the tag-group mask applied. A determination is made as to whether there are additional tag-groups of interest (step 1050). If so, the operation returns to step 1030. Otherwise, the operation terminates.

For waiting for a tag-group update, or waiting for events (one or more tag-group completions), the basic procedure is as shown in FIG. 11. As shown, the operation starts by clearing any pending tag status update requests (step 1110). This may be accomplished, for example, by writing a "0" to the MFC write tag status update request channel, reading the channel count associates with the MFC write tag status update request channel until a value of "1" is returned, and reading the MFC read tag-group status channel and discarding the tag status data.

A conditional tag status update is requested by writing the MFC write tag status update request channel with a value of "01" or "10" (step 1120). A value of "01" specifies the completion of any enabled tag group results in a tag-group update. A value of "10" specifies that all enabled tag groups must complete to result in an SPU tag-group status update.

Thereafter, the MFC read tag-group status channel is read to wait on the specific tag event specified in step 1120 (step 1130). This read stalls the execution of the SPU until the condition as specified in step 1120 is met. Alternatively, a read of the count associated with the MFC read tag-group status channel to poll or wait for the specific tag event may be performed (step 1132).

A determination is made as to whether a count returned has a value of "1" (step 1140). If not, the operation returns to step 1132. If the count is "1", the MFC read tag-group status channel is read to determine which tag group or tag groups are complete (step 1150). The operation then terminates.

An alternative to waiting or to polling on a conditional tag event is to use the SPU event facility. This procedure is typically used when an application is waiting for one of multiple events to occur or can do other work while waiting for command completion. The procedure is as shown in FIG. 12.

As shown in FIG. 12, any pending tag status update requests are cleared (step 1210). As described previously, this may be accomplished, for example, by writing a "0" to the MFC write tag status update request channel, reading the channel count associates with the MFC write tag status update request channel until a value of "1" is returned, and reading the MFC read tag-group status channel and discarding the tag status data.

The tag group or tag groups are selected (step 1220). Any pending tag status update events are cleared by writing (wrch) to the SPU write event acknowledgment channel with a value of "1" (step 1230). The MFC tag-group status update event is unmasked by writing a "1" to the SPU write event mask channel (step 1240). The SPU read event status channel is then read to wait for an enabled event to occur (step 1250). This read stalls the execution of the SPU until an enabled event occurs. Alternatively, the count associated with the SPU read event status channel may be read to poll or wait for the specific tag event until the count is returned as a "1."

The SPU read event status channel is read and a determination is made as to whether an enabled event has occurred (step 1260). If not, the operation returns to step 1250. If an enabled event has occurred, then the MFC read tag-group status channel is read to determine which tag or tag groups caused the event (step 1270). The operation then terminates.

Three basic procedures are supported to determine if an MFC DMA list command has reached a list element with the stall-and-notify flag set: poll the MFC read list stall-and-notify tag status channel, wait for a MFC DMA list command stall-and-notify event, and interrupt on MFC DMA list command stall-and-notify event. For polling to determine if an MFC DMA list command has reached a list element with a stall-and-notify flag set, the basic procedure is as shown in FIG. 13.

As shown in FIG. 13, the operation starts by a MFC DMA list command being issued which has a list element with the stall-and-notify flag set (step 1310). The count associated with the MFC read list stall-and-notify tag status channel is read (rchcnt) until a value of "1" is returned (step 1320). If a "1" value is returned (step 1330), the MFC read list stall-and-notify tag status channel is read (rdch) (step 1340). The data returned is the current status of each tag group, which has reached a list element with the stall-and-notify flag set since the last read of this channel.

A determination is made as to whether there the tag group or groups of interest have reached a list element with the stall-and-notify flag set (step 1350). If not, the operation returns to step 1340 until the tag group or tag groups of interest have reached the list element with the stall-and-notify flag set.

If the tag group or groups of interest have reached a list element with the stall-and-notify flag set, the MFC write list stall-and-notify tag acknowledgment channel is written to (wrch) with the tag-group number corresponding to the stalled tag group to resume the MFC DMA list command (step 1360). The operation then terminates.

The basic procedure for waiting on an MFC DMA list command to reach a list element with the stall-and-notify flag set is as shown in FIG. 14. As shown, the operation starts with a MFC DMA list command being issued which has a list element with the stall-and-notify flag set (step 1410). A read (rdch) of the MFC read list stall-and-notify tag status channel is performed (step 1420). The data returned is the current status of each tag group which has reached a list element with the stall-and-notify flag set since the last read of this channel. This read stalls the SPU until an MFC DMA list command has reached a list element with the stall-and-notify flag set.

A determination is made as to whether the tag group or groups of interest have reached the list element with the stall-and-notify flag set (step 1430). The corresponding bits are set in the return data. Since the bits are reset for each read, software must perform the accumulation of the tag groups while waiting on multiple tag groups to stall.

If not, the operation returns to step 1420 until the tag group or groups of interest have reached the list element with the stall-and-notify flag set. Otherwise, a write (wrch) is performed to the MFC write list stall-and-notify tag acknowledgment channel with the tag-group number corresponding to the stalled tag group to restart the MFC DMA list command (step 1440).

An alternative to waiting or polling on list Stall-and-Notify Tag Group Status is to use the SPU event facility. This procedure is typically used when other work can be performed by the SPU program while the MFC DMA list command is executing. The procedure is as outlined in FIG. 15, for example.

As shown in FIG. 15, the procedure starts with the clearing of any pending MFC DMA list command stall-and-notify events (step 1510). This may be accomplished, for example, by writing (wrch) to the SPU write event acknowledgment channel with a value of "1". The MFC DMA list command stall-and-notify event is enabled by writing a "1" to the Sn bit of the SPU write event mask channel (1520). An MFC DMA list command is issued which has a list element with the stall-and-notify flag set (step 1530).

A read (rdch) from the SPU read event status channel may be made to wait for an enabled event to occur (step 1540). This read stalls the execution of the SPU until an enabled event occurs. Alternatively, a read (rchcnt) of the count associated with the SPU read event status channel may be made to poll for the specific tag event until the count is returned as a "1."

A determination is made as to whether an enabled event has occurred (step 1550). If not, the operation returns to step 1540. If an enabled event has occurred, a determination is made as to whether a DMA list stall-and-notify event has occurred (step 1560). If a DMA list stall-and-notify event has not occurred, the operation returns to step 1540.

If a DMA list stall-and-notify event occurred, a read (rdch) from the MFC read list stall-and-notify tag status channel is performed to determine which tag group or groups caused the event (step 1570). A write (wrch) to the MFC write list stall-and-notify tag acknowledgment channel with the tag-group number corresponding to the stalled tag group to resume the MFC DMA list command is then made (step 1580).

MFC Write Multisource Synchronization Request Channel

The details of the MFC write multisource synchronization request channel are provided in FIG. 16. The MFC write multisource synchronization request channel is part of the MFC multisource synchronization facility and causes the MFC to start tracking outstanding transfers sent to the associated MFC. The MFC multisource synchronization facility includes a MFC multisource synchronization register, which allows processors or devices to control synchronization from the main storage address domain, and the MFC write multisource synchronization request channel (MFC_WrMSSyncReq), which allows an SPU to control synchronization from the local storage address domain.

Synchronization may be requested by a write to the MFC write multisource synchronization request channel. When the requested synchronization is complete, the channel count is set back to "1" and the data written to this channel is ignored. A second write to this channel results in the SPU being stalled until the outstanding transfers being tracked by the first write are complete.

To use the MFC write multisource synchronization request channel, a program writes to the MFC write multisource synchronization request channel and then waits for the MFC write multisource synchronization request channel to become available, i.e. when the channel count is set back to "1." Software initializes the count for this channel to a value of "1." This channel is write-blocking enabled with a maximum count of "1."

Mailbox Facilities

In addition to the channels for communicating with the MFC, the channel interface of the present invention further provides channels for communicating with a mailbox facility provided in the SPU. The MFC provides a set of mailbox queues between the SPU and other processors and devices. Each mailbox queue has an SPU channel assigned as well as a corresponding MMIO register. SPU software accesses the mailbox queues by using SPU channel instructions. Other processors and devices access the mailbox queues by using one of the MMIO registers. In addition to the queues, the MFC provides queue status, mailbox interrupts, and SPU event notification for the mailboxes. Collectively, the MMIO registers, channels, status, interrupts, mailbox queues, and events are referred to as the "mailbox facility." As mentioned previously, the mailbox facility is provided in the MFC registers unit 240 in FIG. 2.

Two mailbox queues are provided by the MFC for sending information from the SPU to another processor or to other devices: the SPU outbound mailbox queue and the SPU outbound interrupt mailbox queue. These mailbox queues are intended for sending short messages to the PPE (for example, return codes or status). Data written by the SPU to one of these queues using a write channel (wrch) instruction is available to any processor, or device by reading the corresponding MMIO register.

A write channel (wrch) instruction sent to the SPU Write outbound interrupt mailbox channel also can cause an interrupt to be sent to a processor, or to another device in the system. An MMIO read from either of these queues (SPU outbound mailbox or SPU outbound interrupt mailbox registers) can set an SPU event, which in turn causes an SPU interrupt.

One mailbox queue is provided for either an external processor or other devices to send information to the SPU, i.e. the SPU inbound mailbox queue. This mailbox queue is intended to be written by the PPE. However, other processors, SPUs, or other devices can also use this mailbox queue. Data written by a processor or another device to this queue using an MMIO write is available to the SPU by reading the SPU read inbound mailbox channel. An MMIO write to the SPU inbound mailbox register can set an SPU event, which in turn can cause an SPU interrupt.

The SPU outbound mailbox register is used to read 32 bits of data from the corresponding SPU outbound mailbox queue. The SPU outbound mailbox register has a corresponding SPU write outbound mailbox channel for writing data into the SPU outbound mailbox queue. A write channel (wrch) instruction sent to the SPU outbound mailbox queue loads the 32 bits of data specified in the instruction into the SPU outbound mailbox queue for other processors or other devices to read. If the SPU outbound mailbox queue is full, the SPU stalls on the write channel (wrch) instruction that is sent to this queue until an MMIO read from this mailbox register occurs.

A MMIO read of this register always returns the information in the order that it was written by the SPU. The information returned on a read from an empty SPU outbound mailbox queue is undefined. The number of entries in the SPU outbound mailbox queue (or queue depth) is implementation-dependent.

A MMIO read of the SPU mailbox status register returns the status of the mailbox queues. The number of valid queue entries in the SPU outbound mailbox queue is given in the SPU_Out_Mbox_Count field of the SPU mailbox status register. A MMIO read of the SPU outbound mailbox register sets a pending SPU outbound mailbox available event. If the amount of data remaining in the mailbox queue is below an implementation-dependent threshold and this condition is enabled (i.e. SPU_WrEventMask[Le] is set to '1'), then the SPU read event status channel is updated (i.e. SPU_RdEventStat[Le] is set to '1'), and its channel count is set to '1.' This causes an SPU outbound interrupt mailbox available event.

The SPU Inbound Mailbox Register is used to write 32 bits of data into the corresponding SPU inbound mailbox queue. The SPU inbound mailbox queue has the corresponding SPU read inbound mailbox channel for reading data from the queue. A read channel (rdch) instruction of the SPU read inbound mailbox channel loads the 32 bits of data from the SPU inbound mailbox queue into the SPU register specified by the read channel (rdch) instruction. The SPU cannot read from an empty mailbox. If the SPU inbound mailbox queue is empty, the SPU stalls on a read channel (rdch) instruction to this channel until data is written to the mailbox. A read channel (rdch) instruction to this channel always returns the information in the order that it was written by the PPE or by other processors and devices.

The number of entries in the queue (or queue depth) is implementation-dependent. A MMIO read of the SPU mailbox status register returns the state of the mailbox queues. The number of available queue locations in the SPU mailbox queue is given in the SPU_In_Mbox_Count field of the SPU mailbox status register (i.e., SPU_Mbox_Stat [SPU_In_Mbox_Count]).

Software checks the SPU mailbox status register before writing to the SPU_In_Mbox to avoid overrunning the SPU mailbox. A MMIO write of the SPU inbound mailbox register sets a pending SPU mailbox event. If enabled (that is, SPU_WrEventMask[Mbox]='1'), the SPU read event status channel is updated and its channel count is set to '1', which causes an SPU inbound mailbox available event.

The SPU mailbox status register contains the current state of the mailbox queues between the SPU and the PPE in the corresponding SPE. Reading this register has no effect on the state of the mailbox queues.

SPU Mailbox Channels

As mentioned above, the mailbox facility provided by the MFC includes a plurality of SPU mailbox channels including a SPU write outbound mailbox channel, a SPU write outbound interrupt mailbox channel, and a SPU read inbound mailbox channel. These SPU mailbox channels are defined as blocking, i.e. they stall the SPU when a channel is full (write-blocking) or when data is not available (read-blocking). The blocking method of a channel is very beneficial for power savings when an application has no other work to perform. Essentially, the processor may be placed in a low power state until space is freed or data is made available.

While these channels are blocking and thus, obtains the benefit of conserving power, accessing these channels may cause the SPU to stall for an indefinite period of time. Software can avoid stalling the SPU by using the SPU event facility, discussed hereafter, or by reading the channel count associated with the mailbox channel.

SPU Write Outbound Mailbox Channel

FIG. 17A provides details of a SPU write outbound mailbox channel in accordance with an exemplary embodiment of the present invention. A write channel instruction (wrch) sent to this channel writes data to the SPU write outbound mailbox queue. The data written to this channel by the SPU is available for an MMIO read of the SPU outbound mailbox register: A write channel (wrch) to this channel also causes the associated channel count to be decremented by '1'. Writing to a full SPU write outbound mailbox queue causes SPU execution to stall until the SPU outbound mailbox register is read, freeing up a location in the SPU write outbound mailbox queue.

To avoid the stall condition, the channel count associated with this channel can be read to ensure there is a slot in the SPU write outbound mailbox queue before issuing the channel write. Alternatively, the SPU outbound mailbox available event can be used to signal the availability of a slot in the SPU write outbound mailbox queue, if it was determined to be full.

When the SPU write outbound mailbox queue is full, a read of the channel count associated with this channel returns a value of '0'. A non-zero value indicates the number of 32-bit words free in the SPU write outbound mailbox queue.

Privileged software initializes the count of the SPU write outbound mailbox channel to the depth of the SPU write outbound mailbox queue. This channel is write-blocking. The maximum count for this channel is implementation-dependent and should be the depth (that is, the number of available slots) of the SPU write outbound mailbox queue.

SPU Write Outbound Interrupt Mailbox Channel

FIG. 17B provides details of a SPU write outbound interrupt mailbox channel in accordance with one exemplary embodiment of the present invention. A write channel (wrch) instruction to this channel writes data to the SPU write outbound interrupt mailbox queue. The data written to this channel by the SPU is made available to a MMIO read of the SPU outbound interrupt mailbox register.

A write channel (wrch) instruction to this SPU write outbound mailbox channel also causes the associated count to be decremented by '1'. Writing to a full SPU write outbound interrupt mailbox queue causes SPU execution to stall until the SPU outbound interrupt mailbox register is read, freeing up a location in the SPU write outbound interrupt mailbox queue.

To avoid a stall condition, the channel count associated with this channel can be read to ensure there is a slot in the SPU write outbound interrupt mailbox queue before issuing the channel write. Alternatively, the SPU outbound interrupt mailbox available event can be used to signal the availability of a slot in the SPU write outbound interrupt mailbox queue, if it was previously full. A write channel (wrch) instruction to the SPU write outbound interrupt mailbox channel also causes an interrupt to be sent to a processor or other device. There is no ordering of the interrupt and previously-issued MFC commands.

When the SPU write outbound interrupt mailbox queue is full, a read of the count associated with this channel returns a value of '0'. A non-zero count value has the number of 32-bit words free in this queue.

Privileged software initializes the count of this channel to the depth of the SPU write outbound interrupt mailbox queue. This channel is write-blocking. The maximum count for this channel is implementation-dependent and should be the depth (that is, the number of available slots) of the SPU write outbound interrupt mailbox queue.

SPU Read Inbound Mailbox Channel

FIG. 17C provides details of a SPU read inbound mailbox channel in accordance with one exemplary embodiment of the present invention. A read from this channel returns the next data in the SPU read inbound mailbox queue. Data is placed in the SPU read inbound mailbox queue by a processor or device issuing a write to the SPU inbound mailbox register.

Reading from the SPU read inbound mailbox channel causes the associated count to be decremented by '1'. Reading an empty mailbox causes SPU execution to stall until the SPU inbound mailbox register is written, placing a data item in the SPU read inbound mailbox queue. To avoid the stall condition, the channel count associated with this channel can be read to ensure there is data in the SPU read inbound mailbox queue before issuing the channel read. Alternatively, the SPU inbound mailbox available event can be used to signal the availability of data in the SPU read inbound mailbox queue.

If the mailbox is empty, reading the channel count (rchcnt) returns a value of '0'. If the result of the rchcnt is non-zero, then the mailbox contains information, which has been written by the PPE, but which has not been read by the SPU.

The channel count of the SPU read inbound mailbox channel is initialized by privileged software to '0'. The maximum count is implementation-dependent. This channel is read-blocking.

SPU Signal Notification Facility

The MFC provides a SPU signal notification facility that is used to send signals, such as a buffer completion flag to an SPU from other processors and devices in the system. This signal notification facility may be provided, for example, in MFC registers unit 250 of FIG. 2.

The BPA provides two independent signal notification facilities: SPU Signal Notification 1 and SPU Signal Notification 2. Each facility consist of one register and one channel: SPU signal notification 1 register and SPU signal notification 1 channel; and SPU signal notification 2 register and SPU signal notification 2 channel.

Signals are issued by an SPU using a set of send signal commands with the effective address of the signal notification register associated with the SPU to which the signal is sent. PPEs and other devices that do not support send signal commands, simulate sending a signal command by performing a MMIO write to the SPU signal notification register associated with the SPU to which the signal is to be sent.

Each of the signal notification facilities can be programmed to either an overwrite mode, which is useful in a one-to-one signaling environment or to a logical OR mode, which is useful in a many-to-one signaling environment. The mode for each channel is set in the SPU configuration register.

Performing either a send signal command or a MMIO that targets a signaling register programmed to overwrite mode sets the contents of the associated channel to the data of the signaling operation. It also sets the corresponding channel count to '1'. In logical OR mode, the data of the signaling operation is OR'd with the current contents of the channel, and the corresponding count is set to a value of '1'.

In addition, the signal notification registers are used as the effective address of an image, when performing an isolated load. In these cases, SPU signal notification 1 register contains the upper 32 bits of the 64-bit effective address, and SPU signal notification 2 register contains the least significant 32 bits. Software must have the SPU signal notification facility in an overwrite mode before setting the effective address for proper operation of an isolated load request.

SPU Signaling Channels

The SPU signaling channels are the PPE part of the SPU signal notification facility. They are used to read signals from other processors and other devices in the system. The signaling channels are configured as read-blocking with a maximum count of '1'. When a read channel (rdch) instruction is sent to one of these channels and the associated channel count is '1', the current contents of the channel and the associated count are reset to '0'. When a read channel (rdch) instruction is sent to one of these channels, and the channel count is '0', the SPU stalls until a processor or device performs a MMIO write to the associated register.

SPU Signal Notification Channel

FIG. 18 provides details of a SPU signal notification channel in accordance with an exemplary embodiment of the present invention. The signal notification channel may be a SPU signal notification 1 or 2 channel. A read channel (rdch) instruction sent to the SPU signal notification channel returns the 32 bit value of signal-control word 1, and atomically resets any bits that were set when read. If no signals are pending, a read from this channel stalls the SPU until a signal is issued. If no signals are pending, a read channel count (rchcnt) instruction sent to this channel returns '0'. If unread signals are pending, it returns '1'.

Privileged software initializes the count for this channel to a value of '0'. This channel is read-blocking enabled with a maximum count of '1'.

SPU Decrementer

Each SPU contains a 32-bit decrementer. If enabled in the MFC control register, it is written with MFC_CNTL [Dh] set to '0'. The SPU decrementer starts when a write channel (wrch) instruction is issued to the SPU write decrementer channel. The decrementer is stopped by following the program sequence described hereafter, or when the MFC control register is written with MFC_CNTL [Dh] set to '1'. The current running status of the decrementer is available in the MFC control register (that is, MFC_CNTL[Ds]). A decrementer event does not need to be pending for the decrementer to be stopped.

Two channels are assigned to manage the decrementer: one to set the decrementer value and one to read the current contents of the decrementer. A decrementer event occurs when the most significant bit (bit 0) changes from a '0' to a '1'.

SPU Write Decrementer Channel

FIG. 19A provides details of a SPU write decrementer channel in accordance with one exemplary embodiment of the present invention. The SPU write decrementer channel is used to load a 32-bit value to the decrementer. The value loaded into the decrementer determines the lapsed time between the write channel (wrch) instruction and the decrementer event. The event occurs when the most significant bit (msb) of the decrementer changes from a '0' to a '1'. If the value loaded into the decrementer causes a change from '0' to '1' in the msb, an event is signaled immediately. Setting the decrementer to a value of '0' results in an event after a single decrementer interval.

In order for the state of the decrementer to be properly saved and restored, the decrementer must be stopped before changing the decrementer value. The following sequence outlines the procedure for setting a new decrementer value:

1. Write to SPU write event mask channel to disable the decrementer event.
2. Write to SPU write event acknowledgment channel to acknowledge any pending events and to stop the decrementer. The decrementer is stopped because the decrementer event has been disabled in step 1.
3. Write to SPU write decrementer channel to set a new decrementer count value. (Note: The decrementer is started because step 2 stopped the decrementer.)
4. Write to SPU write event mask channel to enable decrementer event.
5. Wait on timer to expire.

This channel is non-blocking and does not have an associated count. Whenever a read channel count (rchcnt) instruction is sent to this channel, the count is always returned as '1'.

SPU Read Decrementer Channel

FIG. 19B provides details of a SPU read decrementer channel in accordance with one exemplary embodiment of the present invention. The SPU read decrementer channel is used to read the current value of the 32-bit decrementer. Reading the decrementer count has no effect on the accuracy of the decrementer. Successive reads of the decrementer return the same value.

This channel is non-blocking and does not have an associated count. Whenever a read channel count (rchcnt) instruction is sent to this channel, the count is always returned as '1'.

SPU State Management Channels

In addition to the above, SPU state management channels are provided. These SPU state management channels include a SPU read machine status channel and two interrupt related state channels. The interrupt related state channels include a SPU write state save-and-restore channel and a SPU read state save-and-restore channel.

SPU Read Machine Status Channel

FIG. 20A provides details of a SPU read machine status channel in accordance with one exemplary embodiment of the present invention. The SPU read machine status channel contains the current SPU machine status information. This channel contains the two status bits: the isolation status and the SPU interrupt status. This isolation status reflects the current operating state of the SPU, isolated or non-isolated.

The SPU interrupt enable status reflects the current state of the SPU interrupt enable. If enabled, a SPU interrupt is generated if any enabled SPU event is present.

This channel is non-blocking and does not have an associated count. Whenever a read channel count (rchcnt) instruction is sent to this channel, the count is always returned as '1'.

SPU Write State Save-and-Restore Channel

FIG. 20B provides details of a SPU write state save-and-restore channel in accordance with one exemplary embodiment of the present invention. A write to this channel updates the contents of the state save and restore register 0 (SRR0) in the SPU. A write to this channel is typically used to restore interrupt-state information when nested interrupts are supported.

This channel should not be written when SPU interrupts are enabled. Doing so can result in the contents of SRR0 being indeterminate. A channel form of the sync instruction must be issued after writing this channel and before the execution of instructions that are dependent upon the SRR0 contents.

This channel is non-blocking and does not have an associated count. Whenever a read channel count (rchcnt) instruction is sent to this channel, the count is always returned as '1'.

SPU Read State Save-and-Restore Channel

FIG. 20C provides details of a SPU read state save-and-restore channel. A read of this channel returns the contents of the state save and restore register 0 (SRR0) in the SPU. A read of this channel is typically used to save interrupt-state information when nested interrupts are supported.

This channel is non-blocking and does not have an associated count. Whenever a read channel count (rchcnt) instruction is sent to this channel, the count is always returned as '1'.

SPU Event Facility

Figure 21A:
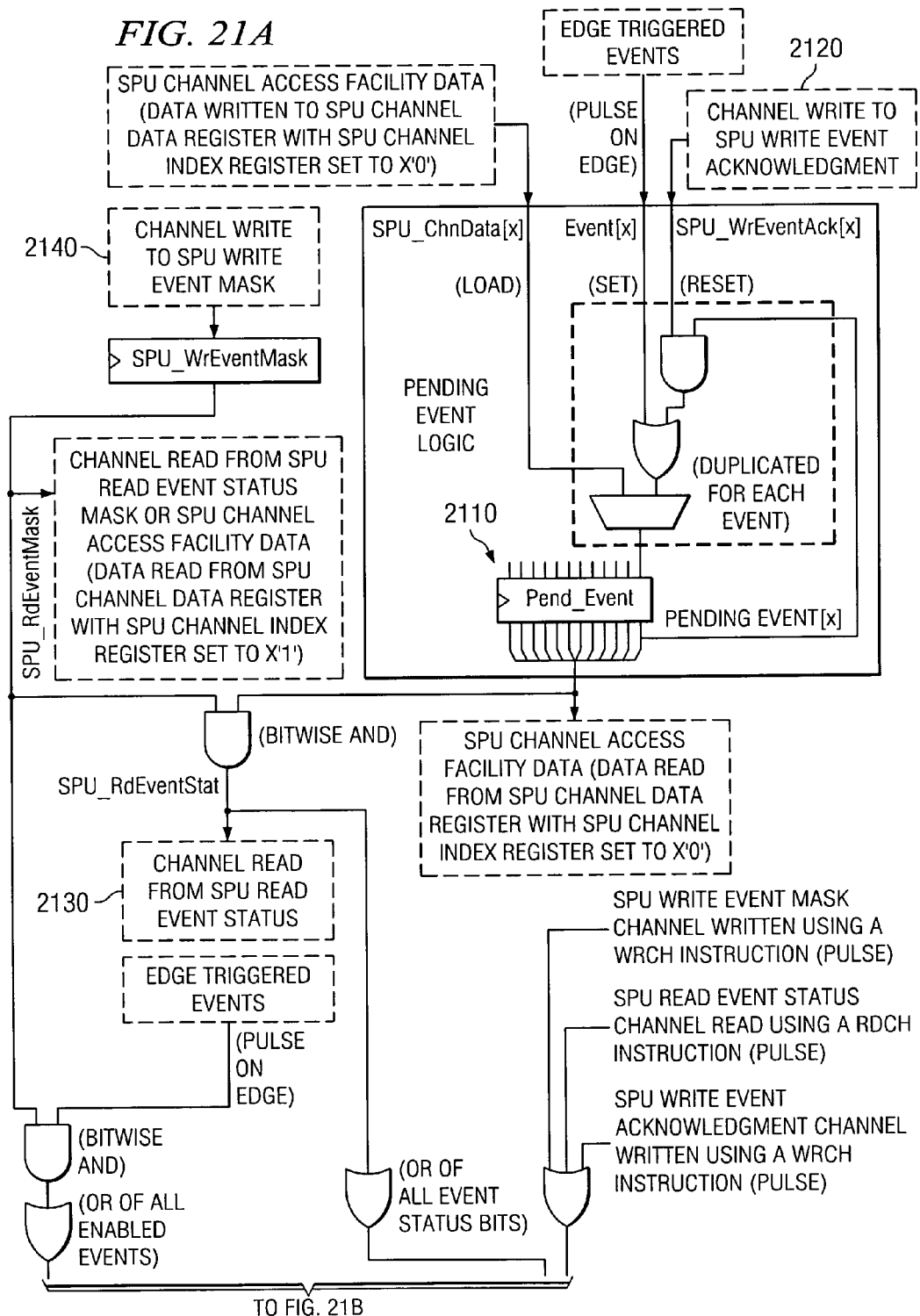
FIGS. 21A-21B provide an exemplary block diagram illustrating a logical representation of an SPU event facility in accordance with one exemplary embodiment of the present invention.
Figure 21B:
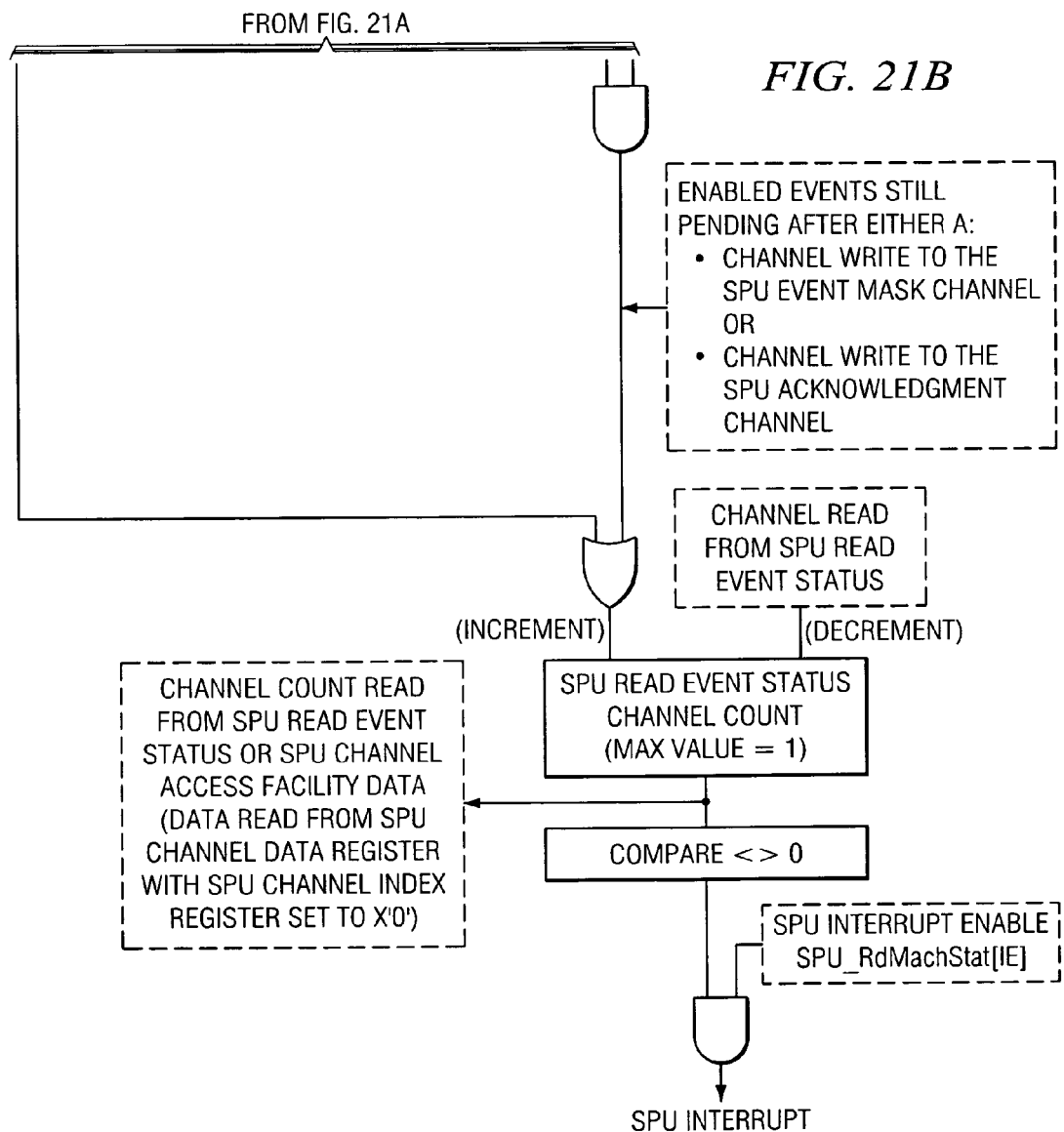

FIGS. 21A-21B provide an exemplary block diagram illustrating a logical representation of an SPU event facility. As shown in FIGS. 21A-21B, an edge-triggered event sets a corresponding bit in the SPU pending event register 2110 to a '1'. Events in the SPU pending event register 2110 are acknowledged, or reset, by writing a '1' to the corresponding bit in the SPU write event acknowledgment channel 2120 using a channel instruction.

The SPU pending event register (Pend_Event) 2110 is an internal register. The SPU pending event register 2110 can be read using a SPU channel access facility.

Reading the SPU read event status channel 2130 with the channel read (rdch) instruction returns the value of the SPU pending event register logically AND'd with the value in the SPU write event mask channel 2140. This function provides an SPU program with only the status of the enabled events, while the SPU pending event register 2110 allows privileged software to see all the events which have occurred. Access to all events is required for an SPE context save and restore operation.

The contents of the SPU read event status channel 2130 change when the SPU write event mask channel 2140 is written with a new value, or when a new event is recorded in the SPU pending event register 2110. Any changing of a bit from '0' to '1' in the SPU read event status channel 2130 increments the SPU read event status channel count by '1'. The count also increments if an event is still set in the SPU read event status channel 2130 after a write is sent to the SPU write event acknowledgment channel 2120. The count is decremented by '1' when the SPU read event status channel 2130 is read using a channel read (rdch) instruction. The count saturates at a value of '1', and is not decremented below a value of '0'. When the SPU read event status channel count is nonzero, an interrupt condition is sent to the SPU, if enabled.

SPU Event Channels

An SPU program may monitor events using a number of SPU event channels. These SPU event channels include a SPU read event status channel, a SPU write event mask channel, a SPU read event mask channel, and a SPU write event acknowledgment channel. The SPU read event status channel contains the status of all events which are enabled in the SPU write event mask channel. The SPU write event acknowledgment channel is used to reset the status of an event, which is usually an indication that the event has been processed or recorded by the SPU program. If no enabled events are present, reading from the SPU read event status channel stalls the SPU program.

When individual events have similar methods for stalling the SPU program, if the event has not occurred, the SPU event facility provides software with a method to look for multiple events and to cause an interrupt of the SPU program.

SPU Read Event Status Channel

FIGS. 22A to 22D provide details of the SPU read event status channel in accordance with one exemplary embodiment of the present invention. The SPU read event status channel contains the current status of all events enabled by the SPU write event mask channel at the time this channel is read. If the SPU write event mask channel specifies that an event is not part of the query, then its corresponding position is '0' in the reported status.

A read from the SPU read event status channel, which has a channel count of '0', results in an SPU stall thereby providing a "wait on event" function. A read from this channel, with a channel count of '1', returns the status of any enabled, pending events and sets the channel count to '0'. The channel count is set to '1' for the following conditions:

An event occurs and the corresponding mask is '1' in the SPU write event mask channel;

The SPU write event mask channel is written with a '1' in a bit position which corresponds to a '1' in the SPU pending event register;

Enabled events are pending after a write of the SPU write event acknowledgment channel; and Privileged software sets the channel count to '1' using the SPU channel access facility.

If no enabled events have occurred, a read channel count (rchcnt) instruction of the SPU read event status channel returns zeros. A read channel count (rchcnt) instruction can be used to avoid stalling the SPU when reading the event status from the SPU read event status channel.

Privileged software must initialize the count value of the SPU read event status channel to '0'. The channel count is initialized using the SPU channel count register in the SPU channel access facility. If SPU interrupts are enabled (SPU_RdMachStat[IE] set to '1'), a non-zero SPU read event status channel count results in an interrupt being issued to the SPU.

It should be noted that software can cause phantom events in two instances:

1. If software acknowledges or masks an event after the event has incremented the SPU read event status channel count, before reading the event status from the SPU read event status channel. In this case, reading the SPU read event status channel returns data that indicates that the event is no longer present or is disabled.

2. If software resets the interrupting condition of an enabled event (such as reading from a mailbox) before reading the SPU read event status channel and before acknowledging the event. In this case, reading the event-status register returns data that indicates that the event is still pending, even though the condition that generated the event is no longer present. In this case, the event must still be acknowledged.

To avoid generating phantom events, events should be handled as follows:

Read the SPU read event status channel.

For all events that are to be processed, acknowledge the event by writing the corresponding bits to the SPU write event acknowledgment channel.

Process the events (for example, read the mailbox, reset, or stop the timer, or read a signal notification register).

SPU Write Event Mask Channel

FIGS. 22E-22F provide details of a SPU write event mask channel in accordance with one exemplary embodiment of the present invention. The SPU write event mask channel selects which pending events affect the state of the SPU read event status channel. The contents of this channel are retained until a subsequent channel write or SPU channel access occurs. The current contents of this channel can be accessed by reading the SPU read event mask channel.

All events are recorded in the SPU pending event register, regardless of the SPU event mask setting. Events remain pending until cleared by a write channel (wrch) instruction to the SPU write event acknowledgment channel or privileged software loads the SPU pending event register with a new value using the SPU channel access facility. A pending event is cleared even if it is disabled.

Pending events, which are disabled and subsequently cleared, are not reflected in the SPU read event status channel. Enabling a pending event results in an update of the SPU read event status channel and an SPU interrupt, if enabled.

This channel is non-blocking and does not have an associated count. A read channel count (rchcnt) instruction of this channel always returns '1'.

SPU Read Event Mask Channel

FIGS. 22G-22H provide details of a SPU read event mask channel in accordance with one exemplary embodiment of the present invention. The SPU read event mask channel is used to read the current value of the event status mask. Reading this channel always returns the last data written by the SPU write event mask channel. This channel can be used to avoid software shadow copies of the event status mask and for SPE context save-and-restore operations. This channel is non-blocking and does not have an associated count. Whenever a read channel count (rchcnt) instruction is sent to this channel, the count is always returned as '1'.

SPU Write Event Acknowledgment Channel

Figure 22I:
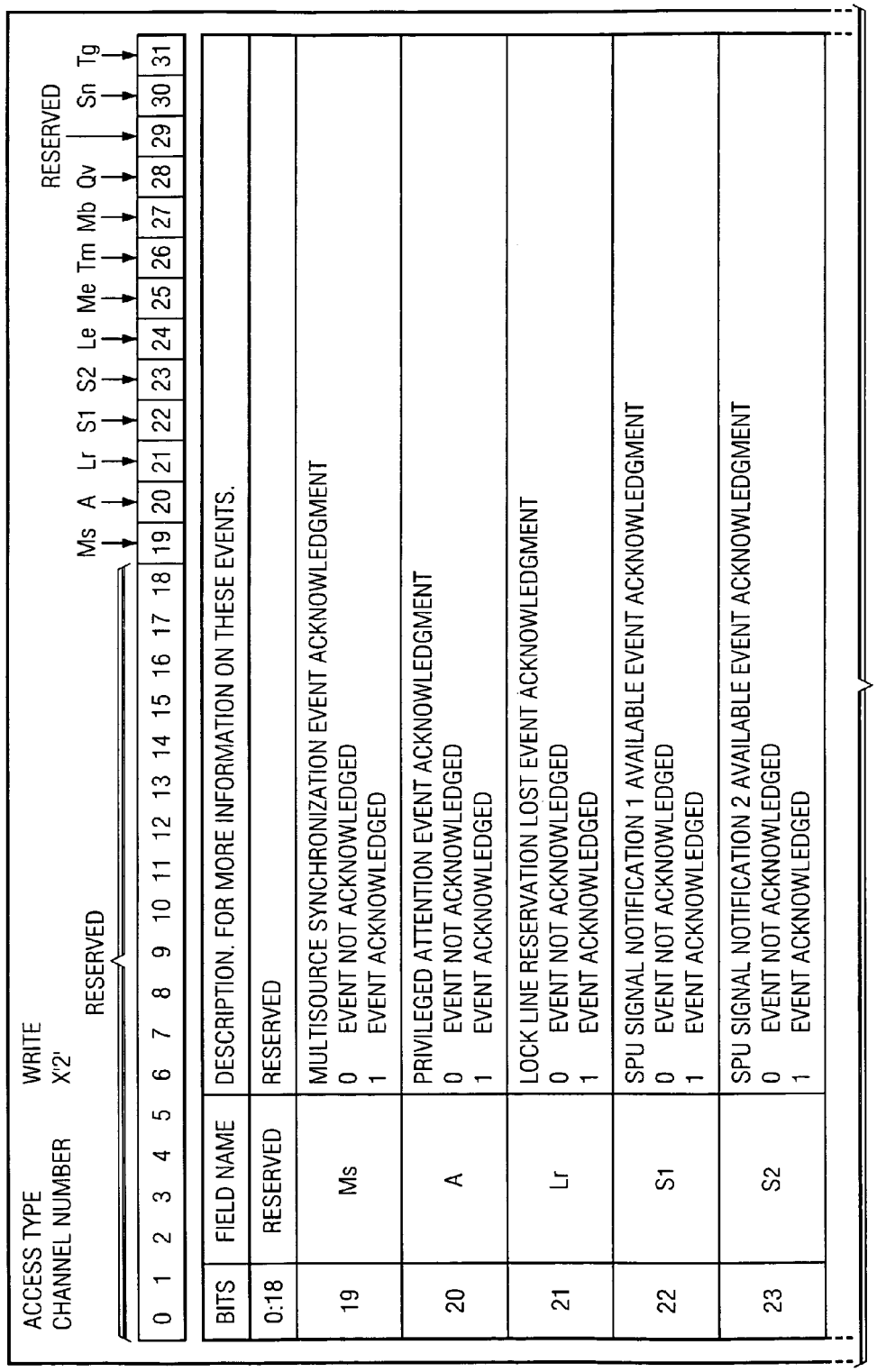

FIGS. 22I-22J provide details of a SPU write event acknowledgment channel in accordance with one exemplary embodiment of the present invention. A write to the SPU write event acknowledgment channel, with specific event bits set, acknowledges that the corresponding events is being serviced by the software. Events that have been acknowledged are reset and resampled. Events that have been reported, but not acknowledged continue to be reported until acknowledged or until cleared by privileged software using the SPU channel access facility.

Disabled events are not reported in the SPU read event status channel but they are held pending until they are cleared by writing a '1' to the corresponding bit in the SPU write event acknowledgment channel. Acknowledging a disabled event clears the event, even though it has not been reported. Clearing an event before it occurs, results in a software induced deadlock.

This channel is non-blocking and does not have an associated count. Whenever a read channel count (rchcnt) instruction is sent to this channel, the count is always returned as '1'.

SPU Events

Hardware determines events by detecting the appropriate channel counts, decrementer count, or SPU channel access operation. A number of different types of events are supported by the BPA described above. For example, a MFC tag-group status update event is set when the count for the MFC read tag-group status channel changes from 0 to a non-zero value. A MFC DMA list command stall-and-notify event is set when the count for the MFC read list stall-and-notify tag status channel changes from 0 to a non-zero value. A MFC SPU command queue available event is set when the count for the queued MFC command opcode register changes from 0 (full) to a non-zero value (not full). A SPU inbound mailbox available event is set when the count for the SPU read inbound mailbox channel changes from 0 to a non-zero value.

Similarly, a SPU decrementer event is set when the most significant bit of the decrementer count changes from 0 to 1.

If a value loaded into the decrementer causes a change from 0 to 1 in the most significant bit, an event is signaled immediately. Setting the decrementer value to 0 results in an event after a single decrementer interval.

Further, a SPU outbound mailbox available event is set when the SPU write outbound interrupt mailbox channel count changes from 0 to a non-zero value. A SPU signal notification 1 or 2 available events are set when the count for the corresponding SPU signal notification channel changes from 0 to a non-zero value. A lock line reservation event is set when a atomic reservation is lost (see the "Lock-Line Reservation Lost Event" section hereafter). A privileged attention event is set when the SPU privilege control register is written with an attention event request bit set to 1 (see the "Privileged Attention Event" section hereafter). A multisource synchronization event is set when a MFC write multisource synchronization request channel count changes from a value of 0 to a value of 1. These events will now be described in more detail.

MFC Tag-Group Status Update Event

The MFC tag-group status update event is used to notify an SPU program that a tag group or groups have completed, and the MFC read tag-group status channel has been updated and can be read without stalling the SPU (see the section "MFC Tag-Group Status Channels" above) The event occurs when the channel count for the MFC read tag-group status channel changes from '0' to '1'. The occurrence of the event sets Pend_Event[Tg] to '1'. If the event is enabled (that is, SPU_RdEventStat[Tg] is set to '1'), the count for the SPU event status channel is set to '1'.

The Pend_Event[Tg] bit is set to '0' when a channel write (wrch) is issued to the SPU pending event register, or when privileged software updates the SPU pending event register using the SPU channel access facility with the corresponding bit set to '0'. This event must be cleared before issuing any commands for the tag group or groups.

MFC DMA List Command Stall-and-Notify Event

The MFC DMA list command stall-and-notify event is used to notify an SPU program that a list element within an MFC DMA list command has completed, and that the MFC read list stall-and-notify tag status channel has been updated and can be read without stalling the SPU. This event occurs when the channel count for the MFC read list stall-and-notify tag status channel changes from '0' to '1'.

The count is set to '1' when all the transfers of the list elements with the stall-and-notify flag set, as well as the transfers for all the previous list elements in the MFC DMA list command, are complete with respect to the associated SPE. When this event happens, it sets Pend_Event[Sn] to '1'. If the event is enabled (that is, PU_RdEventStat[Sn] is set to '1'), the count for the SPU read event status channel is set to '1'. The Pend_Event[Sn] bit is set to '0' when a channel write (wrch) is issued to the SPU write event acknowledgment channel with the tag bit set to '1' (SPU_WrEventAck[Sn]) or when privileged software updates the SPU pending event register using the SPU channel access facility with the corresponding bit set to '0'.

Figure 23:
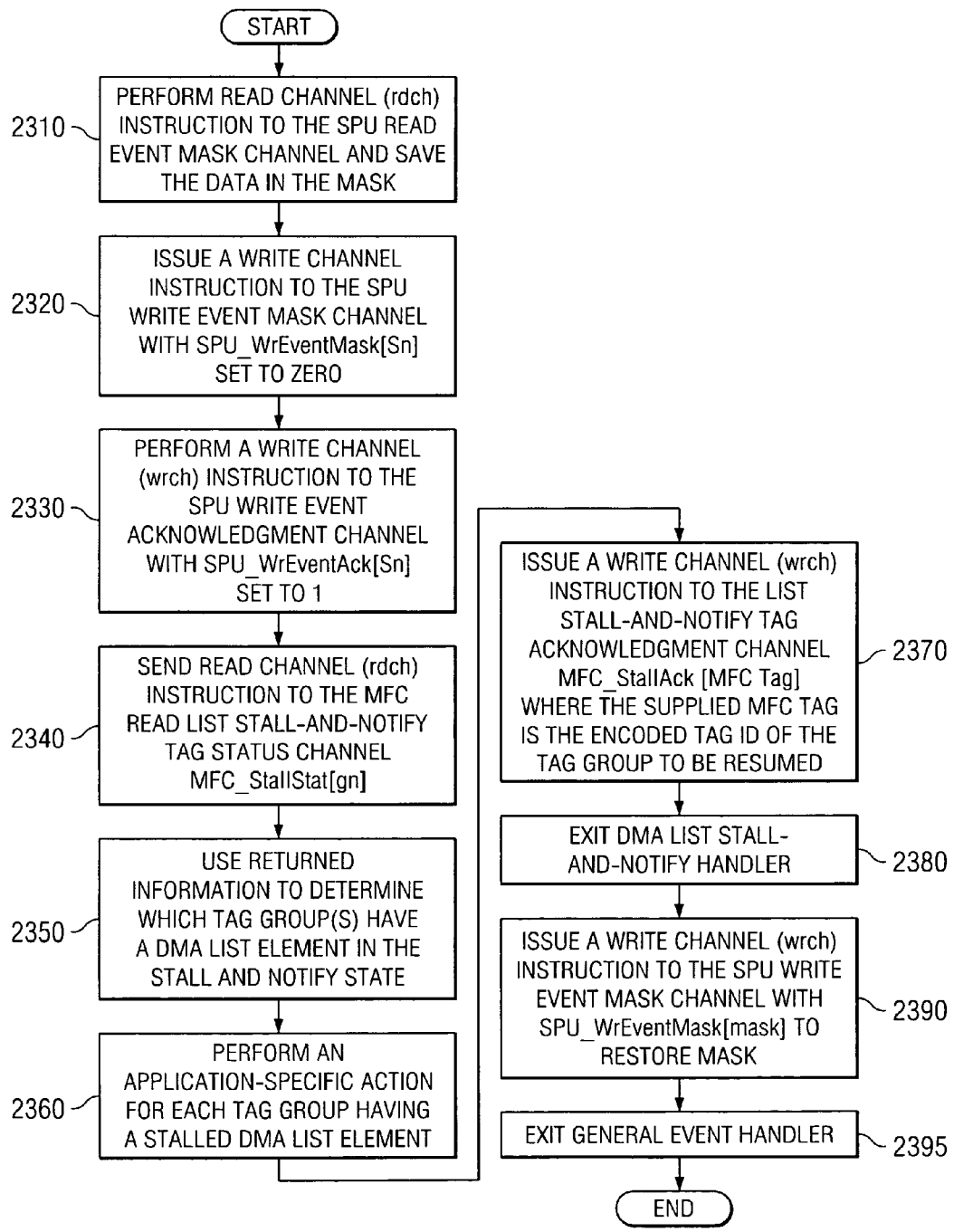
FIG. 23 is a flowchart outlining an exemplary operation for handling the MFC DMA list command stall-and-notify event in accordance with one embodiment of the present invention.

The procedure for handling the MFC DMA list command stall-and-notify event is outlined in FIG. 23. As shown in FIG. 23, the procedure starts with performing a read channel (rdch) instruction to the SPU read event mask channel and save the data in the "mask" (step 2310). The event is masked by issuing a write channel instruction to the SPU write event mask channel with SPU_WrEvent Mask[Sn] set to '0' (step 2320). The event is acknowledged by performing a write channel (wrch) instruction to the SPU write event acknowledgment channel with SPU_WrEventAck[Sn] set to a 1 (step 2330).

A read channel (rdch) instruction is then sent to the MFC read list stall-and-notify tag status channel MFC_StallStat [gn] (step 2340). The returned information is used to determine which tag group or tag groups that have a DMA list element in the stall and notify state (step 2350). An application-specific action is then performed with respect to each Tag Group having a stalled DMA list element (step 2360).

Each stalled DMA list command is acknowledged and resumed by issuing a write channel (wrch) instruction to the list stall and notify tag acknowledgement channel MFC_StallAck [MFC Tag] where the supplied MFC tag is the encoded tag ID of the tag group to be resumed (step 2370). The DMA list stall and notify handler is then exited (step 2380). It should be noted that if application software does not acknowledge all stalled tag groups indicated in the MFC_StallStat[gn] channel, a second stall and notify event does not occur for the un-acknowledged tag group.

The "mask" is restored by issuing a write channel (wrch) instruction to the SPU write event mask channel with SPU_WrEvent Mask[mask] (step 2390). The general event handler is then exited (step 2395).

It should be noted that when a DMA list contains multiple list elements having the stall and notify flag set, and/or when a tag group has multiple DMA list commands queued with elements having the stall and notify flag set, the application software initializes to 0 a tag-group specific stall counter before the DMA list commands are queued for the tag group. In addition, when multiple DMA list commands are queued for a tag group with stall and notify elements, ordering is enforced with tag specific fences, barriers, or the command barrier. Each time a stall and notify status is indicated for a tag group, the corresponding counter should be incremented. Application software can then use this counter to determine at what point in the list the stall has occurred.

Application software uses stall and notify to update list element addresses and transfer sizes that follow the list element that has stalled due to dynamically changing conditions. List elements after the stalled list element can be skipped by setting their transfer sizes to 0. However, the number of list elements in a queued DMA list command cannot be changed.

MFC SPU Command Queue Available Event

The MFC SPU command queue available event is used to notify an SPU program that an entry in the MFC SPU command queue is available and that the MFC command opcode channel can be written without stalling the SPU. This event occurs when the channel count for the MFC command opcode channel changes from '0' (full) to a non-zero (not full) value.

The count is set to '1' when one or more MFC DMA commands in the MFC SPU command queue are completed. When this event happens, it sets Pend_Event[Qv] to '1'. If the event is enabled (that is, SPU_RdEventMask[Qv] is '1'), SPU_RdEventStat[Qv] is set to '1' and the count for the SPU read event status channel is set to '1'. The Pend_Event[Qv] bit is set to '0' when a channel write (wrch) is issued to the SPU write event acknowledgment channel (that is, SPU_WrEventAck[Qv] set to '1'), or when privileged software updates the SPU pending event register using the SPU channel access facility with the corresponding bit set to '0'.

Figure 24:
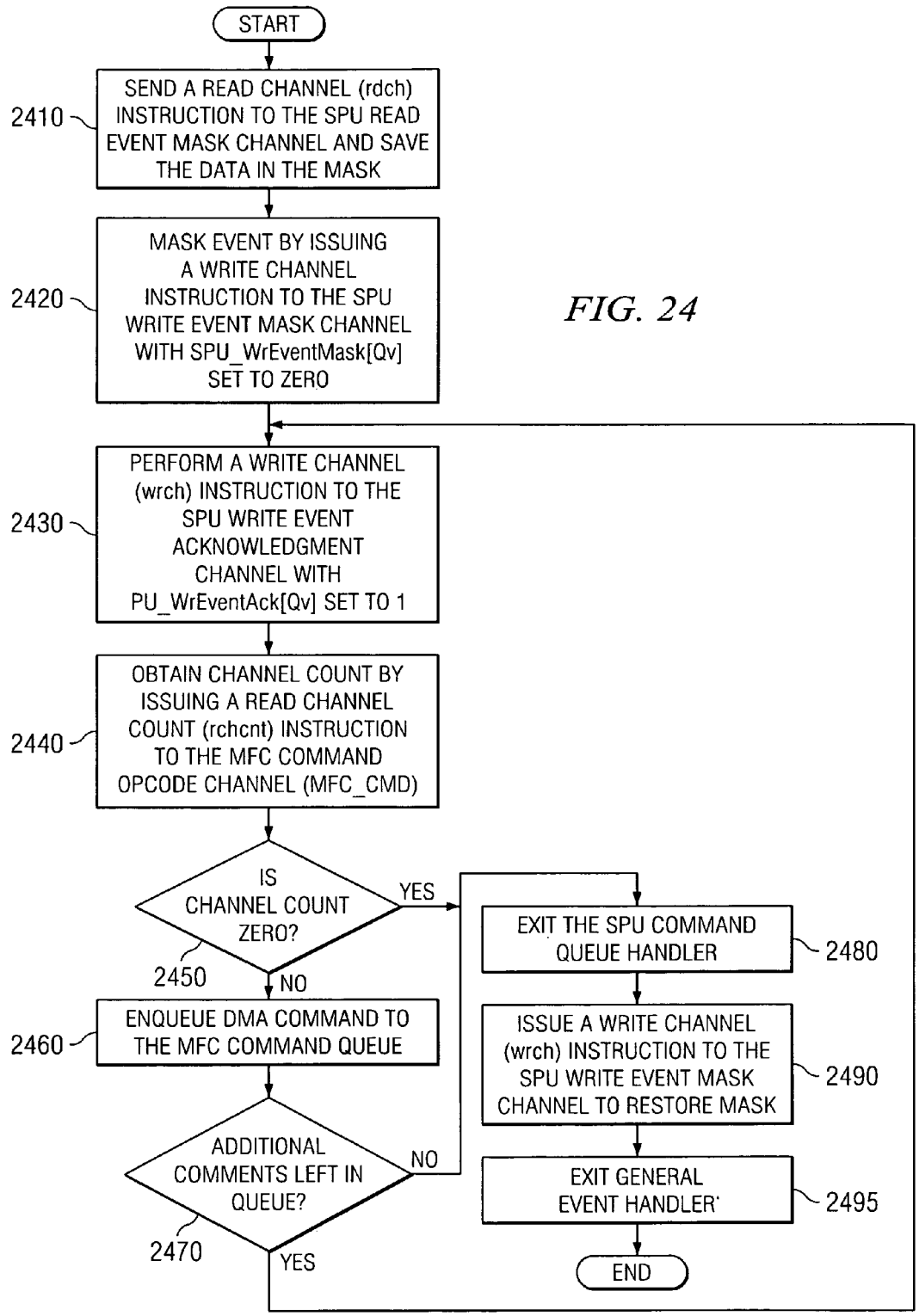
FIG. 24 is a flowchart outlining an exemplary operation for handling the MFC SPU command queue available event in accordance with one embodiment of the present invention.

The procedure for handling the MFC SPU command queue available event is outlined in FIG. 24. As shown in FIG. 24, the procedure beings by sending a read channel (rdch) instruction to the SPU read event mask channel and the data in the "mask" is saved (step 2410). The event is masked by issuing a write channel instruction to the SPU write event mask channel with SPU_WrEventMask[Qv] set to '0' (step 2420). The event is acknowledged by performing a write channel (wrch) instruction to the SPU write event acknowledgment channel with PU_WrEventAck[Qv] set to '1' (step 2430).

The channel count is obtained by issuing a read channel count (rchcnt) instruction to the MFC command opcode channel (MFC_CMD) (step 2440). A determination is made as to whether the channel count is '0' (step 2450). If not, then a DMA command is enqueued to the MFC command queue (step 2460). A determination is then made as to whether there are additional commands left in the queue (step 2470). If so, the procedure returns to step 2430. If there are no additional commands left, or if the channel count is '0', the SPU command queue handler is exited (step 2480). The mask is then restored by issuing a write channel (wrch) instruction to the SPU write event mask channel (step 2490). The general event handler is then exited (step 2495).

SPU Inbound Mailbox Available Event

The SPU inbound mailbox available event is used to notify an SPU program that a PPE or other device has written to an empty SPU mailbox and that the SPU read inbound mailbox channel (see page 124) can be read without stalling the SPU. If this event is enabled (that is, SPU_RdEventStat[Mb] is '1'), the count for the SPU read event status channel is set to '1'.

This event occurs when the channel count for the SPU read inbound mailbox channel changes from '0' (empty) to a non-zero (not empty) value. The occurrence of the event sets Pend_Event[Mb] to '1'. The Pend_Event[Mb] bit is set to '0' when a channel write (wrch) is issued to the SPU write event acknowledgment channel (that is, SPU_WrEventAck[Mb] set to '1') or when privileged software updates the SPU pending event register, using the SPU channel access facility with the corresponding bit set to '0'.

Figure 25:
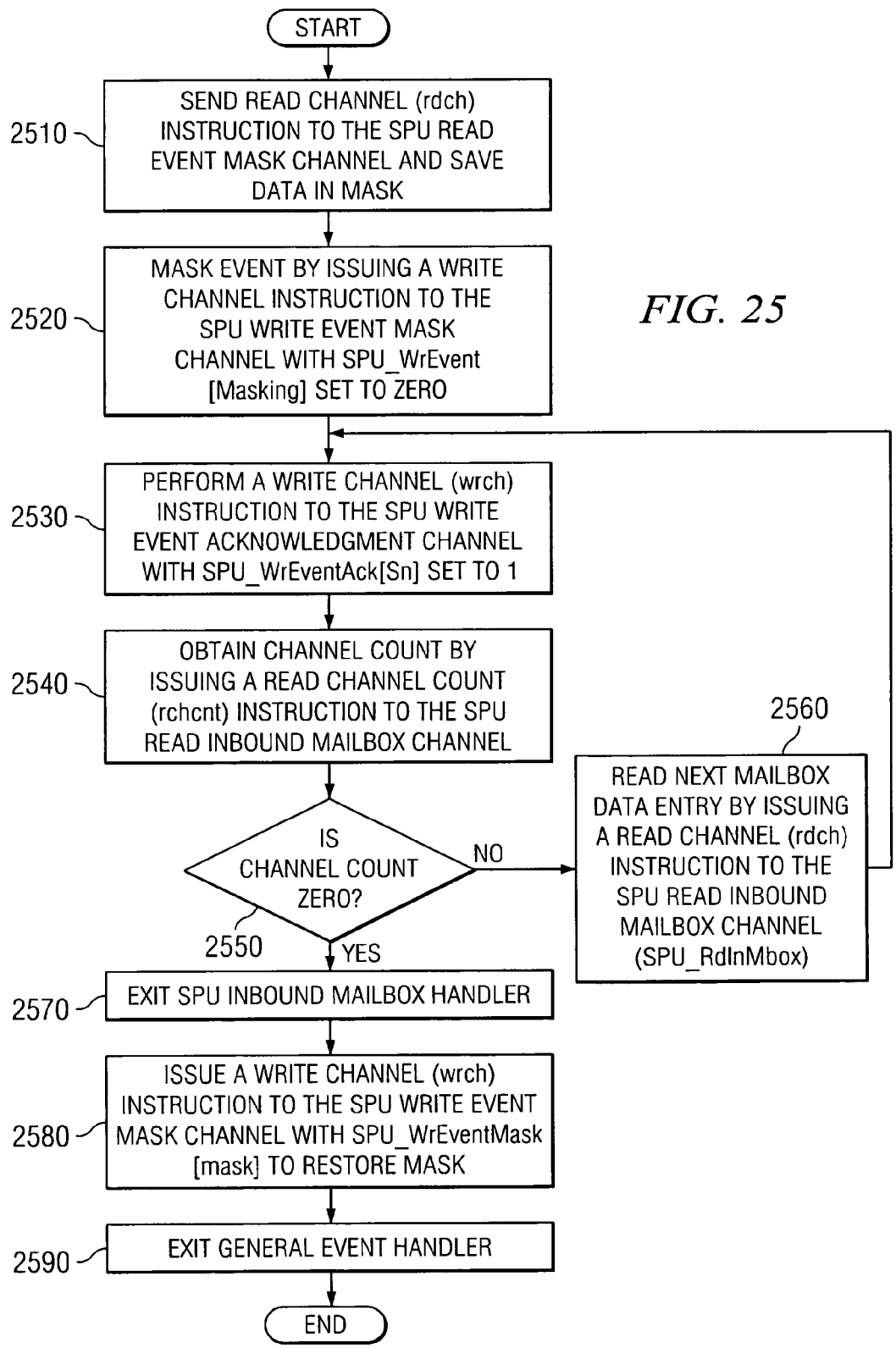
FIG. 25 is a flowchart outlining an exemplary operation for handling the SPU inbound mailbox available event in accordance with one embodiment of the present invention.

The procedure for handling the SPU inbound mailbox available event is outlined in FIG. 25. As shown in FIG. 25, the procedure starts by sending a read channel (rdch) instruction to the SPU read event mask channel and saving the data in "mask" (step 2510). The event is then masked by issuing a write channel instruction to the SPU write event mask channel with SPU_WrEvent[Masking] set to '0' (step 2520). The event is acknowledged by performing a write channel (wrch) instruction to the SPU write event acknowledgment channel with SPU_WrEventAck[Sn] set to '1' (step 2530).

A channel count is obtained by issuing a read channel count (rchcnt) instruction to the SPU read inbound mailbox Channel (step 2540). A determination is made as to whether the channel count is '0' (step 2550). If not, the next mailbox data entry is read by issuing a read channel (rdch) instruction to the SPU read inbound mailbox channel (SPU_RdInMbox) (step 2560). The procedure then returns to step 2530.

If the channel count is '0', then the SPU inbound mailbox handler is exited (step 2570). The "mask" is restored by issuing a write channel (wrch) instruction to the SPU write event mask channel with SPU_WrEvent Mask[mask] (step 2580). The general event handler is then exited (step 2590).

SPU Decrementer Event

The SPU Decrementer event is used to notify a SPU program that the decrementer has reached '0'. If the event is enabled (that is, SPU_RdEventStat[Tm] is set to '1') and the count for the SPU read event status channel is set to '1', this event occurs when the most-significant bit of the decrementer changes from '0' to '1' (negative) value. The occurrence of this event sets Pend_Event[Tm] to '1'. The Pend_Event[Tm] bit is set to '0' when a channel write (wrch) is issued to the SPU write event Acknowledgment channel (SPU_WrEventAck[Tm] set to '1'), or when privileged software updates the SPU pending event register using the SPU channel access facility with the corresponding bit set to '0'.

Figure 26:
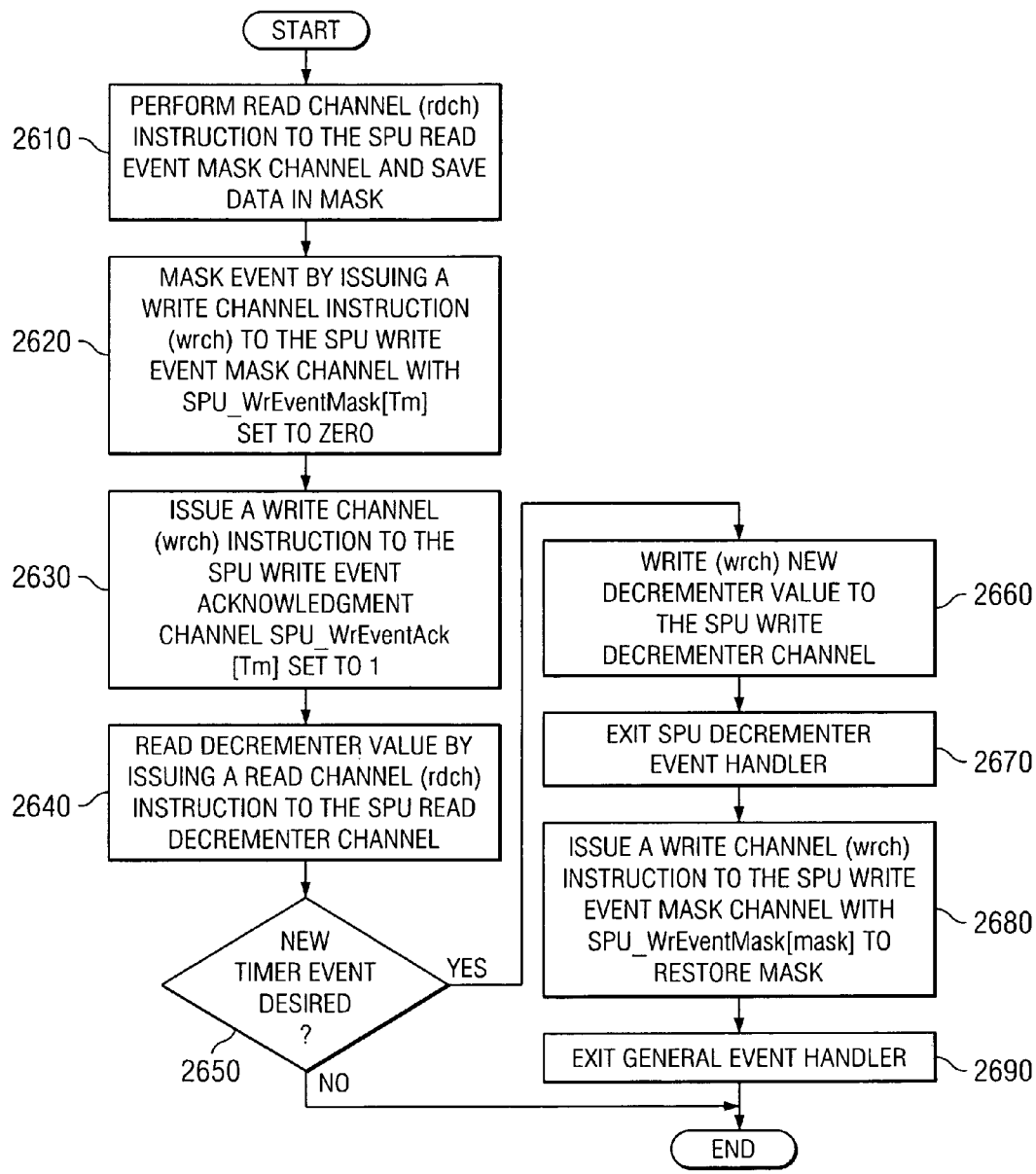
FIG. 26 is a flowchart outlining an exemplary operation for handling the SPU decrementer event in accordance with one embodiment of the present invention.

The procedure for handling the SPU decrementer event is outlined in FIG. 26. As shown in FIG. 26, the procedure starts by performing a read channel (rdch) instruction to the SPU read event mask Channel and saving the data in the "mask" (step 2610). The event is masked by issuing a write channel (wrch) instruction to the SPU write event mask channel with SPU_WrEventMask[Tm] set to '0' (step 2620). The event is acknowledged by issuing a write channel (wrch) instruction to the SPU write event acknowledgment channel (SPU_WrEventAck[Tm] set to '1') (step 2630).

The decrementer value is read by issuing a read channel (rdch) instruction to the SPU read decrementer channel (step 2640). If this value is negative, it can be used to determine how much additional time has elapsed from the desired interval. A determination is made as to whether a new timer event is desired (step 2650). If a new timer event is desired, a new decrementer value is written (wrch) to the SPU write decrementer channel (step 2660). Thereafter, or if a new timer event is not desired, the SPU decrementer event handler is exited (step 2670). The "mask" is restored by issuing a write channel (wrch) instruction to the SPU write event mask channel with SPU_WrEvent Mask[mask] (step 2680). The general event handler is then exited (step 2690).

SPU Outbound Interrupt Mailbox Available Event

The SPU outbound interrupt mailbox available event is used to notify an SPU program that a PPE, or another device, has read from a full SPU outbound interrupt mailbox register and that the SPU write outbound interrupt mailbox channel can be written without stalling the SPU. If this event is enabled (that is, SPU_RdEventStat[Me] set to '1') and the count for the SPU read event status channel is set to '1', this event occurs when the channel count for the SPU write outbound interrupt mailbox channel changes from '0' (full) to non-zero (not full) value. This event sets Pend_Event[Me] to '1'. The Pend_Event[Me] bit is set to '0' when a channel write (wrch) is issued to the SPU write event acknowledgment channel with the Me bit set to '1' (that is, SPU_WrEventAck[Me] is set to 1), or when privileged software updates the SPU pending event register using the SPU channel access facility with the corresponding bit set to '0'.

Figure 27:
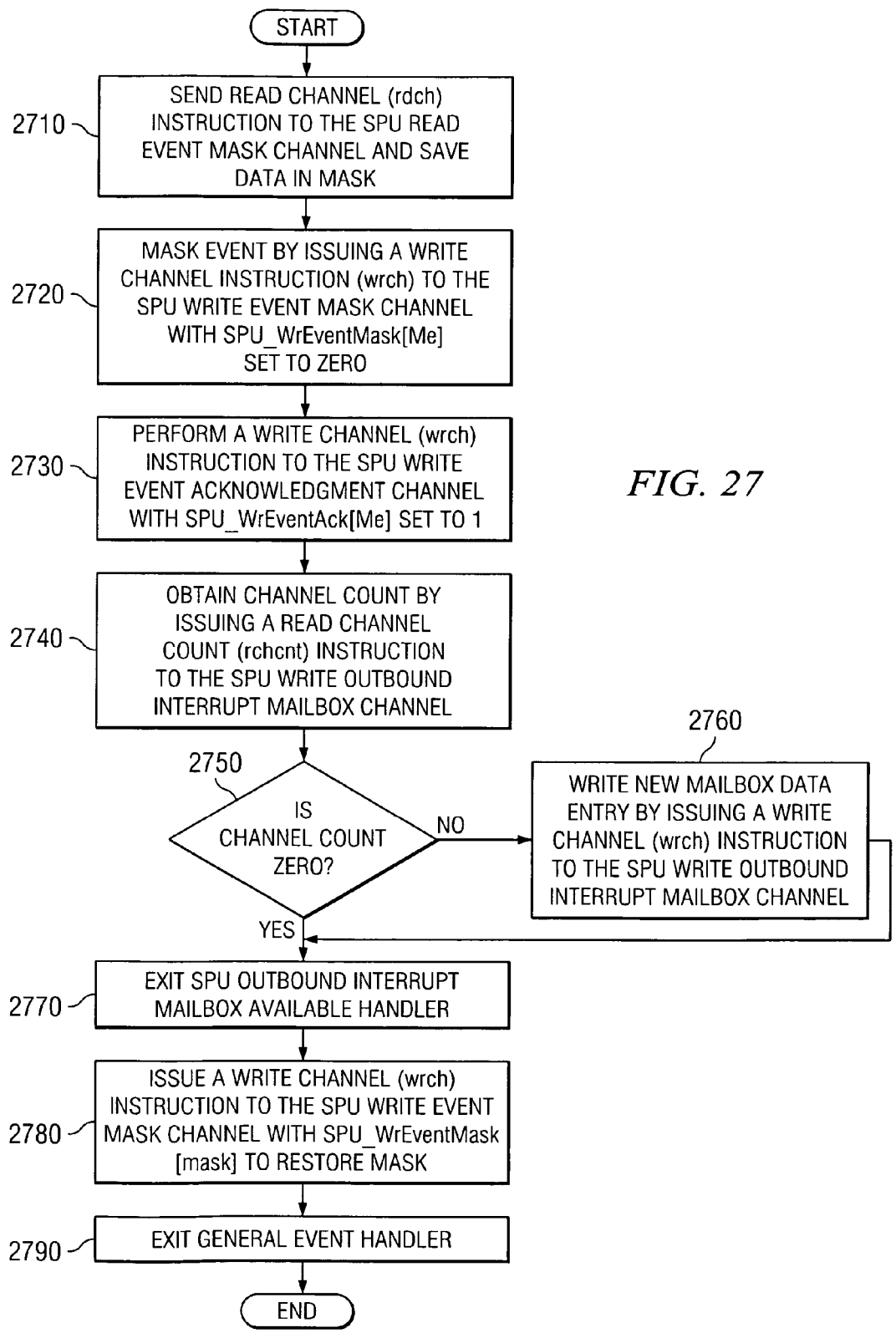
FIG. 27 is a flowchart outlining an exemplary operation for handling the SPU outbound interrupt mailbox available event in accordance with one embodiment of the present invention.

The procedure for handling the SPU outbound interrupt mailbox available event is outlined in FIG. 27. As shown in FIG. 27, the procedure starts by sending a read channel (rdch) instruction to the SPU read event mask channel and saving the data in the "mask" (step 2710). The event is masked by issuing a write channel (wrch) instruction to the SPU write event mask channel with SPU_WrEvent Mask[Me] set to '0' (step 2720). The event is acknowledged by performing a write channel (wrch) instruction to the SPU write event acknowledgment channel with SPU_WrEventAck[Me] set to a 1 (step 2730).

The channel count is obtained by issuing a read channel count (rchcnt) instruction to the SPU write outbound interrupt mailbox channel (step 2740). A determination is made as to whether the channel count is '0' (step 2750). If the channel count is not '0', a new mailbox data entry is written by issuing a write channel (wrch) instruction to the SPU write outbound interrupt mailbox channel (step 2760). If the channel count is '0' then the channel count is read again (step 2740). Thereafter, the SPU outbound interrupt mailbox available handler is exited (step 2770). The "mask" is restored by issuing a write channel (wrch) instruction to the SPU write event mask channel with SPU_WrEventMask[mask] (step 2780). The general event handler is then exited (step 2790).

SPU Outbound Mailbox Available Event

The SPU outbound mailbox available event is used to notify an SPU program that either a processor, or another device has read from a full SPU outbound mailbox register and that the SPU write outbound mailbox channel can be written without stalling the SPU. This event occurs when the channel count for the SPU write outbound mailbox channel changes from '0' (full) to a non-zero (not full) value. The occurrence of the event sets Pend_Event[Le] to '1'. If the event is enabled (that is, SPU_RdEventStat[Le] is set to '1'), the count for the SPU read event status channel is set to '1'. The Pend_Event[Le] bit is set to '0' when a channel write (wrch) is issued to the SPU write event acknowledgment channel (see page 144) with the Le bit set to '1' (that is, SPU_WrEventAck[Le] is set to 1), or when privileged software updates the SPU pending event register using the SPU channel access facility with the corresponding bit set to '0'.

Figure 28:
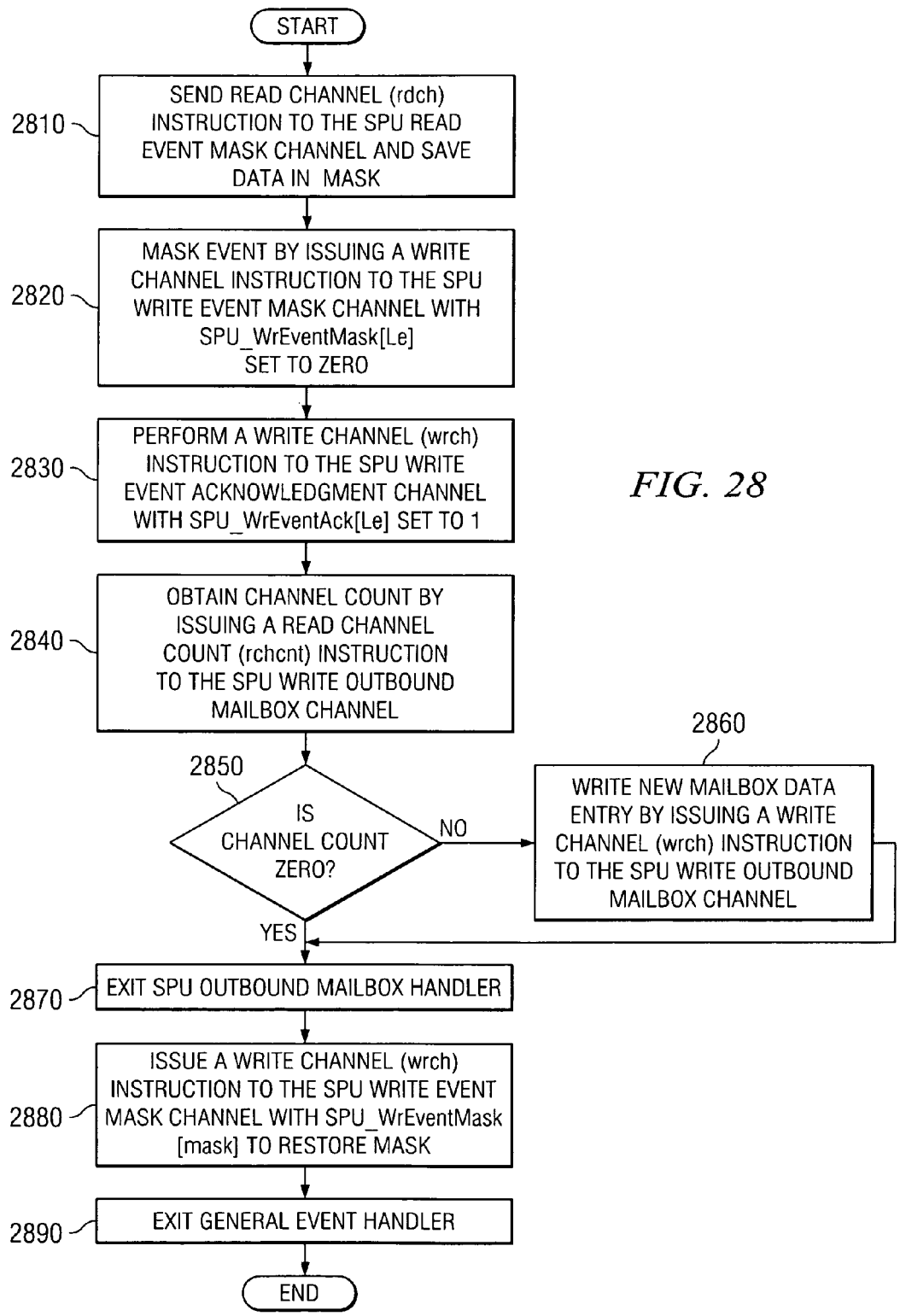
FIG. 28 is a flowchart outlining an exemplary operation for handling the SPU outbound mailbox available event in accordance with one embodiment of the present invention.

The procedure for handling the SPU outbound mailbox available event is outlined in FIG. 28. As shown in FIG. 28, the procedure starts by sending a read channel (rdch) instruction to the SPU read event mask channel and saving the data in "mask" (step 2810). The event is masked by issuing a write channel instruction to the SPU write event mask channel with SPU_WrEventMask[Le] set to '0'. The event is acknowledged by performing a write channel (wrch) instruction to the SPU write event acknowledgment channel with SPU_WrEventAck[Le] set to '1' (step 2830).

The channel count is obtained by issuing a read channel count (rchcnt) instruction to the SPU write outbound mailbox channel (step 2840). A determination is then made as to whether the channel count is '0' (step 2850). If the channel count is not '0,' a new mailbox data entry is written by issuing a write channel (wrch) instruction to the SPU write outbound mailbox channel (step 2860). If the channel count is '0' then the channel count is read again (step 2840). Thereafter, the SPU outbound mailbox handler is exited (step 2870). The "mask" is restored by issuing a write channel (wrch) instruction to the SPU write event mask channel with SPU_WrEventMask[mask] (step 2880). The general event handler is then exited (step 2890).

SPU Signal Notification 2 Available Event

The SPU signal notification 2 available event is used to notify an SPU program that another processor or device has written to an empty SPU signal notification 2 register, and that the SPU signal notification 2 channel can be read without stalling the SPU. This event occurs when the channel count for the SPU signal notification 2 channel changes from '0' (empty) to '1' (valid) value. If the event is enabled (that is, SPU_RdEventStat[S2] is '1') and the count for the SPU read event status channel is set to '1', this event sets Pend_Event [S2] to '1'. The Pend_Event[S2] bit is set to '0' when a channel write (wrch) is issued to the SPU write event acknowledgment channel with the S2 bit set to '1' (SPU_WrEventAck[S2]) or when privileged software updates the SPU pending event register using the SPU channel access facility with the corresponding bit set to '0'.

Figure 29:
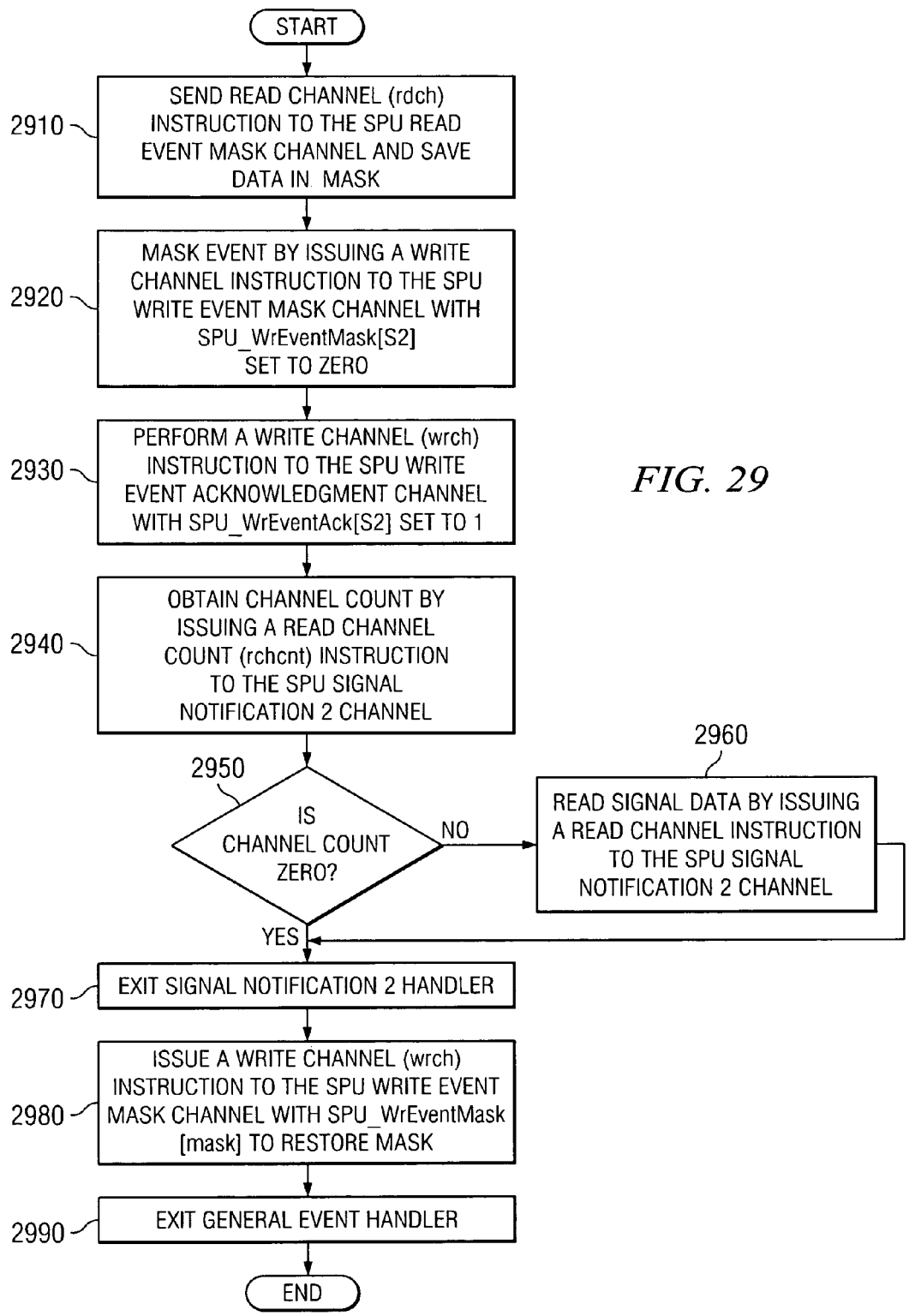
FIG. 29 is a flowchart outlining an exemplary operation for handling the SPU signal notification 2 available event in accordance with one embodiment of the present invention.

The procedure for handling the SPU signal notification 2 available event is outlined in FIG. 29. As shown in FIG. 29, the procedure starts by sending a read channel (rdch) instruction to the SPU read event mask channel and saving the data in "mask" (step 2910). The event is masked by issuing a write channel instruction to the SPU write event mask channel with SPU_WrEventMask[S2] set to '0' (step 2920). The event is acknowledged by performing a write channel (wrch) instruction to the SPU write event acknowledgment channel with SPU_WrEventAck[S2] set to a '1' (step 2930).

The channel count is obtained by issuing a read channel count (rchcnt) instruction to the SPU signal notification 2 channel (step 2940). A determination is made as to whether the channel count is '0' (step 2950). If the channel count is not '0', signal data are read by issuing a read channel instruction to the SPU signal notification 2 channel (step 2960). Thereafter, or if the channel count is '0', the signal notification 2 handler is exited (step 2970). The "mask" is restored by issuing a write channel (wrch) instruction to the SPU write event mask channel with SPU_WrEventMask[mask] (step 2980). The general event handler is then exited (step 2990).

SPU Signal Notification 1 Available Event

The SPU signal notification 1 available event is used to notify an SPU program that another processor or device has written to an empty SPU signal notification 1 register, and that the SPU signal notification 1 channel can be read without stalling the SPU. This event occurs when the channel count for the SPU signal notification 1 channel changes from '0' (empty) to '1' (valid) value. If the event is enabled (that is, SPU_RdEventStat[S1] is '1') and the count for the SPU read event status channel is set to '1', this event sets Pend_Event [S1] to '1'. The Pend_Event[S1] bit is set to '0' when a channel write (wrch) is issued to the SPU write event acknowledgment channel with the S1 bit set to '1' (SPU_WrEventAck[S1]) or when privileged software updates the SPU pending event register using the SPU channel access facility with the corresponding bit set to '0'.

Figure 30:
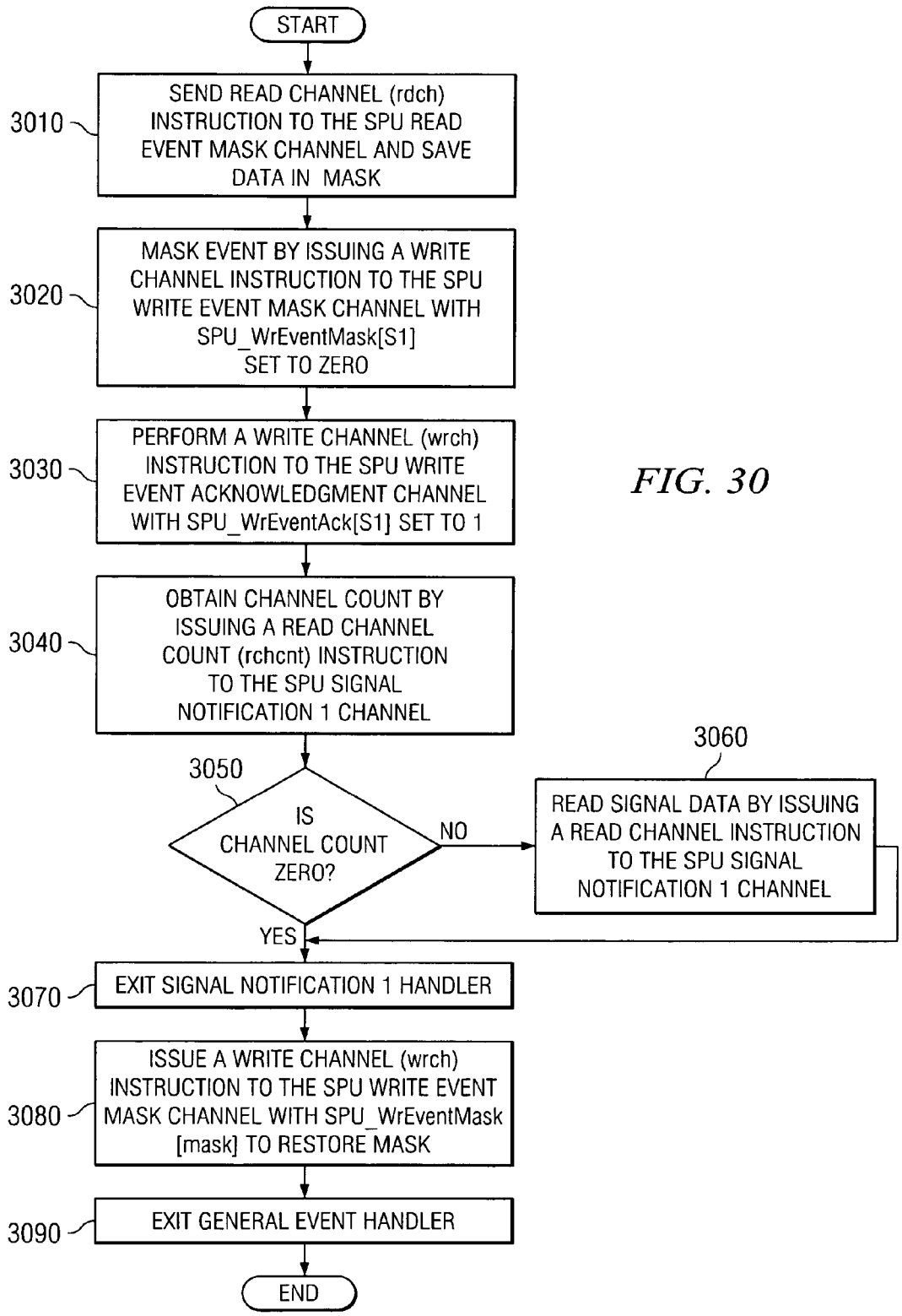
FIG. 30 is a flowchart outlining an exemplary operation for handling the SPU signal notification 1 available event in accordance with one embodiment of the present invention.

The procedure for handling the SPU signal notification 1 available event is outlined in FIG. 30. As shown in FIG. 30, the procedure starts by sending a read channel (rdch) instruction to the SPU read event mask channel and saving the data in "mask" (step 3010). The event is masked by issuing a write channel instruction to the SPU write event mask channel with SPU_WrEventMask[S1] set to '0' (step 3020). The event is acknowledged by performing a write channel (wrch) instruction to the SPU write event acknowledgment channel with SPU_WrEventAck[S1] set to a '1' (step 3030).

The channel count is obtained by issuing a read channel count (rchcnt) instruction to the SPU signal notification 1 channel (step 3040). A determination is made as to whether the channel count is '0' (step 3050).

If the channel count is not '0', signal data are read by issuing a read channel instruction to the SPU signal notification 1 channel (step 3060). Thereafter, or if the channel count is '0', the signal notification 1 handler is exited (step 3070). The "mask" is restored by issuing a write channel (wrch) instruction to the SPU write event mask channel with SPU_WrEventMask[mask] (step 3080). The general event handler is then exited (step 3090).

Lock-Line Reservation Lost Event

The lock-line reservation lost event is used to notify an SPU program that of a bus action which has resulted in the loss of the reservation on a cache line. A reservation is acquired by an SPU program by issuing a get lock line and reserve (getllar) command. The reservation is lost when another processor or device modifies the cache line with the reservation.

The reservation can also be lost if privileged software writes the flush bit in an MFC Atomic Flush register (MFC_Atomic_Flush[F] is set to '1'). The event occurs when the reservation is lost. The occurrence of this event sets Pend_Event[Lr] to '1'. If the event is enabled (that is, SPU_RdEventStat[Lr] is set to '1'), the count for the SPU read event status channel is set to '1'. The Pend_Event[Lr] bit is set to '0' when a channel write (wrch) is issued to the SPU write event acknowledgment channel with the Lr bit set to '1' (SPU_WrEventAck[Lr]) or when privileged software updates the SPU pending event register using the SPU channel access facility with the corresponding bit set to '0'.

The procedure for handling the lock line reservation lost event is outlined in FIG. 31. As shown in FIG. 31, the operation starts by issuing a read channel (rdch) instruction to the SPU read event mask channel and saving the data in "mask" (step 3110). The event is masked by issuing a write channel (wrch) instruction to the SPU write event mask channel with SPU_WrEventMask[Lr] set to '0' (step 3120). The event is acknowledged by performing a write channel (wrch) instruction to the SPU write event acknowledgment channel with SPU_WrEventAck[Lr] set to '1' (step 3130).

An application-specific function is performed in response to a system modification of data in the lock line area (step 3140). This is usually started by checking a software structure in memory to determine if a lock line is still being monitored. If it is still being "waited on," the next step would typically consist of issuing a getllar command to the same lock line area that was modified to obtain the new data and then act on that data.

The lock line reservation lost event handler is then exited (step 3150). The "mask" is restored by issuing a write channel (wrch) instruction to the SPU write event mask channel with SPU_WrEventMask[mask] (step 3160). The general event handler is then exited (step 3170) and the procedure ends.

Privileged Attention Event

The privileged attention event is used to notify an SPU program that privileged software is requesting attention from the SPU program. Privileged software requests attention by writing '1' to an attention event required bit in a SPU privileged control register (that is, SPU_PrivCntl[A] is set to '1'). If the event is enabled (that is, SPU_RdEventStat[A] is '1') and the count for the SPU read event status channel is set to '1', this event sets Pend_Event[A] to '1'. The Pend_Event[A] bit is set to '0' when a channel write (wrch) is issued to the SPU write event acknowledgment channel with the A bit set (that is, SPU_WrEventAck[A] is '1'), or when privileged software updates the SPU pending event register using the SPU channel access facility with the corresponding bit set to '0'.

The procedure for handling the privileged attention event is as outlined in FIG. 32. As shown in FIG. 32, the procedure starts by issuing a read channel (rdch) instruction to the SPU read event mask channel and saving the data in "mask" (step 3210). The event is masked by issuing a write channel instruction to the SPU write event mask channel with SPU_WrEventMask[A] set to '0' (step 3220). The event is acknowledged by performing a write channel (wrch) instruction to the SPU write event acknowledgment channel with SPU_WrEventAck[A] set to '1' (step 3230).

An application specific function is performed in response to a privileged attention event (step 3240). This can be used, for example, to signal that a yield of the SPU is being requested, or some other action. An application or operating system-specific response to the privileged attention event should be issued such as stop and signal, SPU inbound mailbox write, SPU outbound interrupt mailbox write, or an update of a status in system or I/O memory space.

The privileged attention event handler is exited (step 3250). The "mask" is restored by issuing a write channel (wrch) instruction to the SPU write event mask channel with SPU_WrEvent Mask[mask] (step 3260). The general event handler is then exited (step 3270).

Multisource Synchronization Event

The multisource synchronization event is used to notify an SPU program that a multisource synchronization request has completed. A multisource synchronization is requested by writing (wrch) to the MFC write multisource synchronization request channel (MFC_WrMSSyncReq). This event occurs when the channel count for the MFC write multisource synchronization request channel (MFC_WrMSSyncReq) changes from '0' to a '1'. If the event is enabled (that is, SPU_RdEventStat[Ms] is '1') and the count for the SPU read event status channel is set to '1', this event sets Pend_Event[Ms] to '1'. The Pend_Event[Ms] bit is set to '0' when a channel write (wrch) is issued to the SPU write event acknowledgment channel with the Ms bit set (that is, SPU_WrEventAck[Ms] is set to '1'), or when privileged software updates the SPU pending event register using the SPU channel access facility with the corresponding bit set to '0'. The multisource synchronization event must be cleared before issuing the multisource synchronization request.

Figure 33:
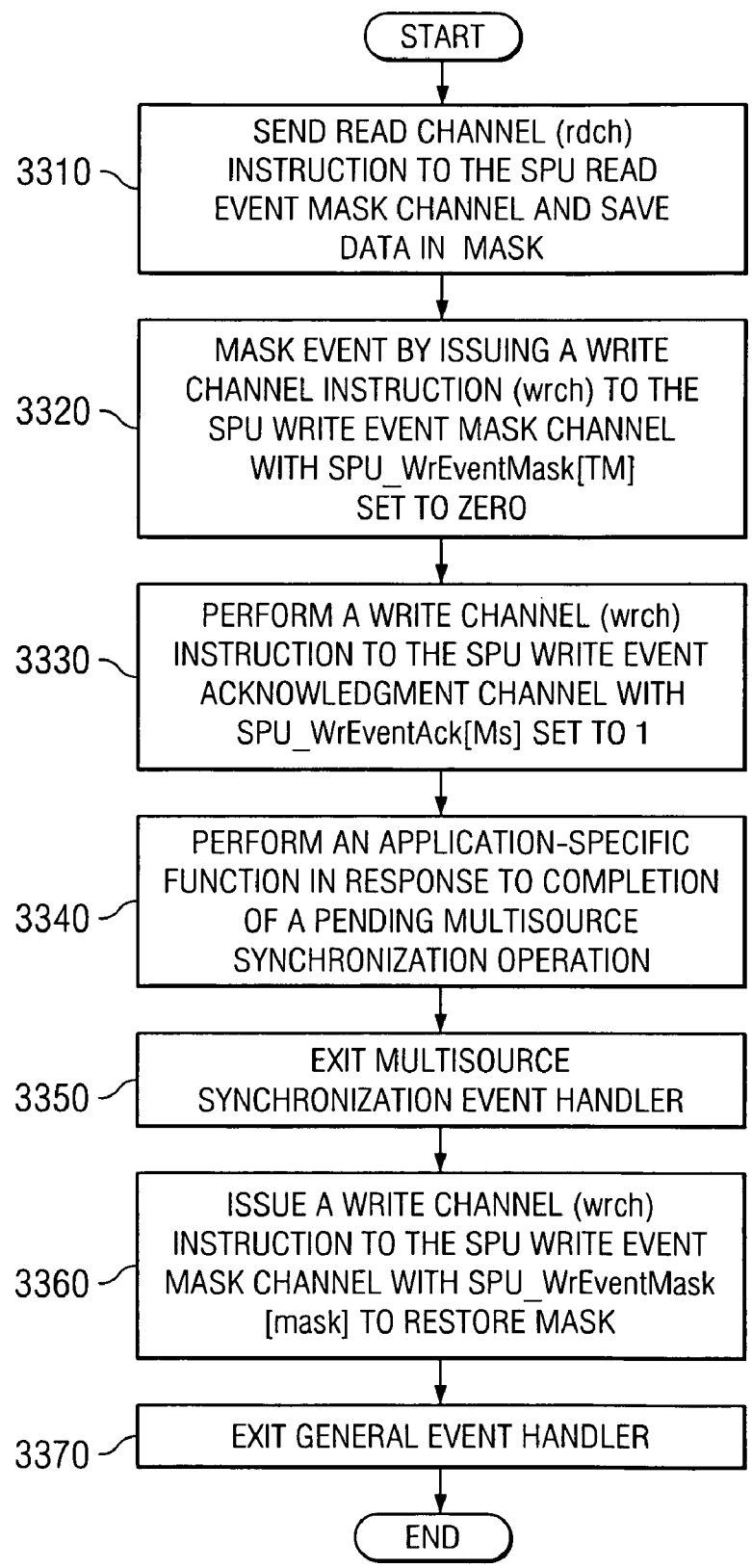
FIG. 33 is a flowchart outlining an exemplary operation for handling the multisource synchronization event in accordance with one embodiment of the present invention.

The procedure for handling the multisource synchronization event is outlined in FIG. 33. As shown in FIG. 33, the procedure starts by sending a read channel (rdch) instruction to the SPU read event mask channel and saving the data in a "mask" (step 3310). The event is masked by issuing a write channel instruction to the SPU write event mask channel with SPU_WrEventMask[Tm] set to '0' (step 3320). The event is acknowledged by performing a write channel (wrch) instruction to the SPU write event acknowledgment channel with SPU_WrEventAck[Ms] set to '1' (step 3330).

An application specific function is performed in response to the completion of a pending multisource synchronization operation (step 3340). This would typically be an indication that the data in a particular buffer has been completely updated, or that a buffer area is no longer in use, for example. The multisource synchronization event handler is exited (step 3350). The "mask" is restored by issuing a write channel (wrch) instruction to the SPU write event mask channel with SPU_WrEvent Mask[mask] (step 3360). The general event handler is then exited (step 3370).

In summary, the present invention provides a mechanism for facilitating communication between a processor and external devices that reduces the burden on local storage and permits the processor to remain in a low power state when awaiting data, free space, or an event to occur. The mechanism of the present invention provides a plurality of channels for communicating with various facilities of the processor, the memory flow controller, machine state registers, and external processor interrupt facilities. These channels may be used to provide instructions, instruction parameters, interprocessor information, signal notifications, machine isolation information, machine interrupt state information, generated events, and to perform event handling.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for communicating instructions and data between a processor and a memory flow control (MFC) unit, comprising:
    establishing one or more channels between the processor and a MFC unit for transferring data between the processor and the MFC unit;
    receiving data, in the MFC unit, via the one or more channels;
    storing the data in one or more registers associated with the one or more channels; and
    processing one or more commands in a command queue based on the data stored in the one or more registers, wherein the one or more channels comprise one or more MFC tag-group status channels for communicating with a MFC proxy tag-group completion facility, wherein the data is MFC tag-group data, and the one or more registers are MFC tag-group registers, and wherein the one or more MFC tag-group status channels comprise:
    a MFC write tag-group query mask channel, wherein the MFC tag-group data includes an identifier, received over the MFC write-tag group query mask channel, which identifies a tag group for an associated query MFC command,
    a MFC read tag-group query mask channel, wherein a read channel instruction sent to the MFC read tag-group query mask channel is used to read a current value stored in a proxy tag-group query mask register, the current value being the last data written to a MFC write tag-group query mask channel,
    a MFC write tag status update request channel, wherein a write channel instruction sent to the MFC write tag status update request channel updates a MFC tag-group status value,
    a MFC read tag-group status channel, wherein a read channel instruction sent to the MFC read tag-group status channel returns a current status of enabled tag-groups,
    a MFC read list stall-and-notify tag status channel, wherein a read channel instruction sent to the MFC read list stall-and-notify tag status channel identifies which tag-groups have commands that have stalled,
    a MFC write list stall-and-notify tag acknowledgment channel, wherein a write channel instruction sent to the MFC write list stall-and-notify tag acknowledgment channel acknowledges a tag-group as containing a command that has stalled, and
    a MFC read atomic command status channel, wherein a read channel instruction sent to the MFC read atomic command status channel returns a status of a last completed immediate MFC atomic update command.

* * * * *